US010810361B1

United States Patent
Venkatraman et al.

(10) Patent No.: US 10,810,361 B1
(45) Date of Patent: Oct. 20, 2020

(54) ROLE-AGNOSTIC INTERACTION MANAGEMENT AND REAL TIME WORKFLOW SEQUENCE GENERATION FROM A LIVE DOCUMENT

(71) Applicants: Bhaskar Mannargudi Venkatraman, Chennai (IN); Pravin Sai Chunduru, Ridgewood, NJ (US); Sivarama Subramaniam Raju, Montvale, NJ (US)

(72) Inventors: Bhaskar Mannargudi Venkatraman, Chennai (IN); Pravin Sai Chunduru, Ridgewood, NJ (US); Sivarama Subramaniam Raju, Montvale, NJ (US)

(73) Assignees: Bhaskar Mannargudi Venkatraman, Chennai (IN); Pravin Sai Chunduru NJ (US); Sivarama Subramaniam Raju NJ (US)

( * ) Notice: Subject to any disclaimer, the term of this patent is extended or adjusted under 35 U.S.C. 154(b) by 0 days.

(21) Appl. No.: 16/785,633

(22) Filed: Feb. 9, 2020

(51) Int. Cl.
*G06F 17/00* (2019.01)
*G06F 40/166* (2020.01)
(Continued)

(52) U.S. Cl.
CPC ......... *G06F 40/166* (2020.01); *G06Q 10/101* (2013.01); *G06Q 10/103* (2013.01); *H04L 63/101* (2013.01)

(58) Field of Classification Search
CPC .. G06F 40/166; G06Q 10/101; G06Q 10/103; H04L 63/101
(Continued)

(56) References Cited

U.S. PATENT DOCUMENTS 7,657,831 B2    2/2010   Donahue
9,256,753 B2    2/2016   Sawicki et al.
(Continued)

FOREIGN PATENT DOCUMENTS

WO    2018234787 A1    12/2018

OTHER PUBLICATIONS

Velikova et al., Towards Security in Decentralized Workflow, IEEE 2009, pp. 1-6. (Year: 2009).*
(Continued)

*Primary Examiner* — Cong-Lac Huynh
(74) *Attorney, Agent, or Firm* — Barry Choobin; Patent 360 LLC

(57) ABSTRACT

A method and an interaction management system (IMS) embedded into a document editor/publisher define codified decision rules associated with actions, manage interactions, and automatically sequence a workflow independent of a participant's role from a live document in real time. The IMS generates an actionable element for execution of a response action(s) to a request action, by another participant(s) invoked in the live document. Using the codified decision rules, the IMS dynamically generates a permission set for the live document, comments, and regions within the live document. The IMS contextually anonymizes the participants invoked to act on the live document based on an anonymity requirement. The IMS tracks and maps the actions performed along the interaction path of the live document in real time, while transmitting and executing the permission set, until the live document reaches an intended closure and the comments reach a resolution to generate a re-deployable workflow sequence.

35 Claims, 62 Drawing Sheets

(51) Int. Cl.
*H04L 29/06* (2006.01)
*G06Q 10/10* (2012.01)
(58) Field of Classification Search
USPC .......................................................... 715/234
See application file for complete search history.

(56) References Cited

U.S. PATENT DOCUMENTS

| | | | | |
|---|---|---|---|---|
| 9,652,121 | B2* | 5/2017 | McKenzie | G06F 3/0482 |
| 9,760,848 | B2 | 9/2017 | Farmer et al. | |
| 9,904,435 | B2 | 2/2018 | Savage | |
| 10,038,731 | B2 | 7/2018 | Pearl et al. | |
| 10,169,552 | B2 | 1/2019 | Huang et al. | |
| 10,225,291 | B2* | 3/2019 | Wilde | G06F 3/0481 |
| 10,373,090 | B2 | 8/2019 | Holm et al. | |
| 2004/0006510 | A1* | 1/2004 | Lertzman | G06Q 30/0258 |
| | | | | 705/14.52 |
| 2004/0153504 | A1* | 8/2004 | Hutchinson | G09B 5/08 |
| | | | | 709/204 |
| 2005/0055306 | A1* | 3/2005 | Miller | G06Q 10/10 |
| | | | | 705/37 |
| 2008/0215682 | A1* | 9/2008 | Vilis | H04L 63/101 |
| | | | | 709/204 |
| 2009/0070162 | A1 | 3/2009 | Leonelli et al. | |
| 2009/0125521 | A1* | 5/2009 | Petty | G06F 21/604 |
| 2009/0311658 | A1* | 12/2009 | Polivka | G09B 5/00 |
| | | | | 434/350 |
| 2011/0134806 | A1* | 6/2011 | Kagawa | H04M 3/436 |
| | | | | 370/259 |
| 2011/0153555 | A1 | 6/2011 | Falkenberg et al. | |
| 2013/0254699 | A1* | 9/2013 | Bashir | G06Q 10/10 |
| | | | | 715/772 |
| 2013/0325923 | A1 | 12/2013 | Jin | |
| 2014/0172456 | A1* | 6/2014 | Qian | G06F 16/345 |
| | | | | 705/3 |
| 2014/0214938 | A1* | 7/2014 | Bhatt | H04L 63/20 |
| | | | | 709/204 |
| 2015/0269499 | A1 | 9/2015 | B et al. | |
| 2015/0356650 | A1* | 12/2015 | Vasyutynskyy | G06Q 30/0605 |
| | | | | 705/26.2 |
| 2016/0162819 | A1 | 6/2016 | Hakman et al. | |
| 2017/0249533 | A1* | 8/2017 | Honour | G06K 17/00 |
| 2017/0277905 | A1* | 9/2017 | Bjorg | G06F 3/0486 |
| 2017/0337287 | A1* | 11/2017 | Gill | G06F 16/9537 |
| 2018/0041457 | A1 | 2/2018 | Piira et al. | |
| 2018/0189733 | A1 | 7/2018 | Newhouse et al. | |
| 2018/0300304 | A1 | 10/2018 | Mullins et al. | |
| 2019/0108114 | A1* | 4/2019 | De Vansa Vikramaratne | |
| | | | | G06F 16/9024 |
| 2019/0108271 | A1 | 4/2019 | Vikramaratne | |
| 2019/0129973 | A1 | 5/2019 | Truong et al. | |
| 2019/0179501 | A1* | 6/2019 | Seeley | G06F 16/178 |
| 2019/0179876 | A1* | 6/2019 | Zhang | G06F 16/1794 |
| 2019/0265821 | A1 | 8/2019 | Pearl et al. | |

OTHER PUBLICATIONS

Wombacher et al., Requirements for Workflows Modeling in P2P Workflows Derived from Collaboration Establishment, IEEE 2004, pp. 1-6. (Year: 2004).*

* cited by examiner

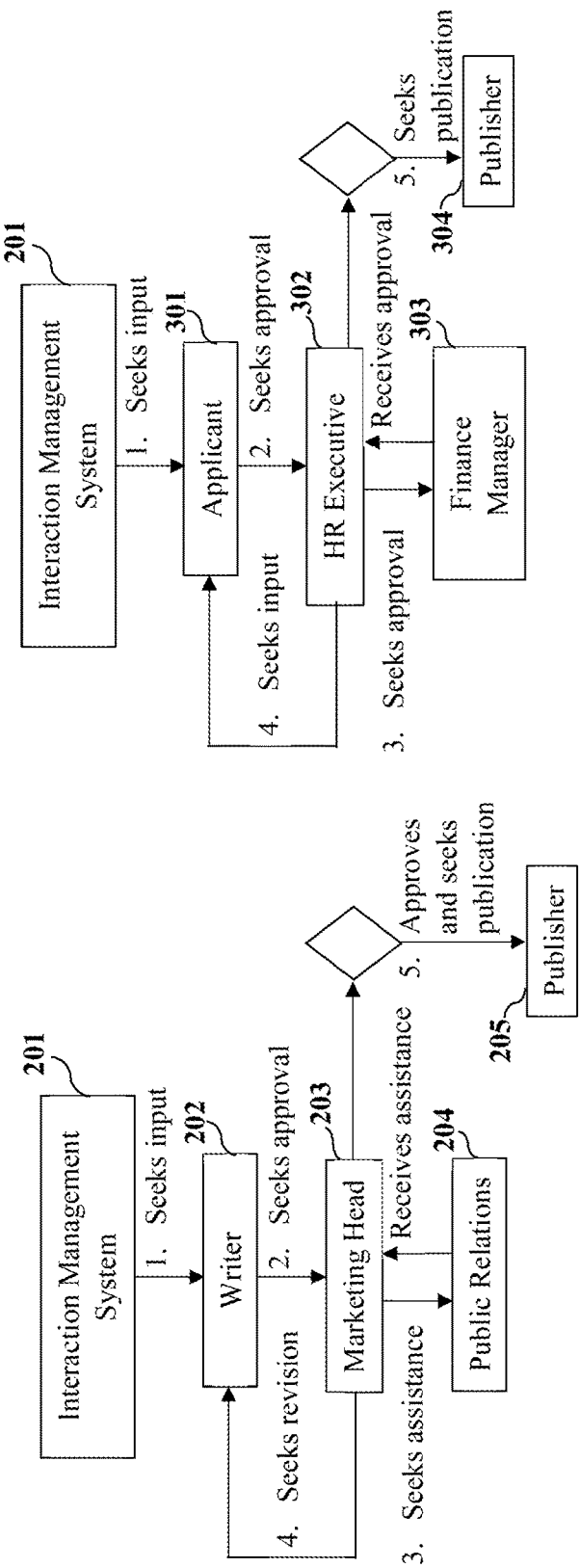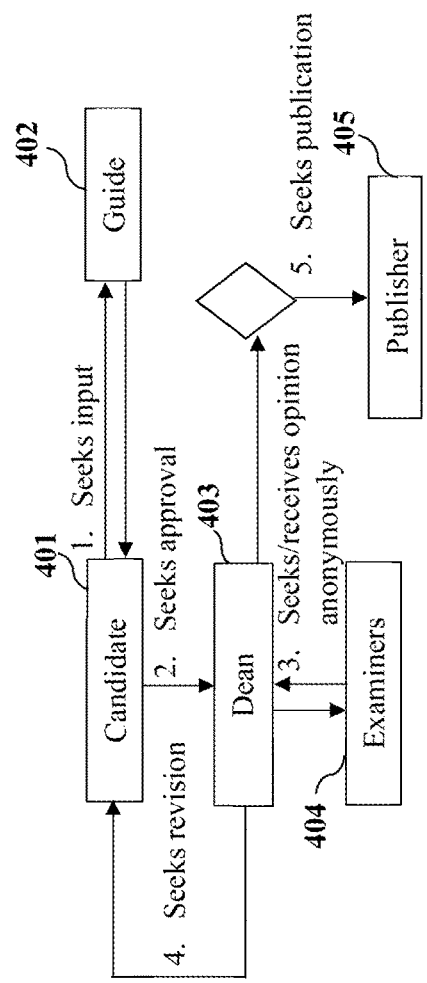
FIG. 2
FIG. 3
FIG. 4

| Actions | Edit_Doc | Comment_Doc | PartialEdit_Doc | Dashboard_Status | DefaultGiveAction | IsComplete | IsUpdateStepID | CreateStep | IsLockReqd | IsCascadeReqd | WaterMark | Doc_State |
|---|---|---|---|---|---|---|---|---|---|---|---|---|
| Initial | Yes | Yes | No | New Initiative | | | Yes | Yes | | | <null> | <null> |
| ReInitial | Yes | Yes | No | Seeking Action from You | | | Yes | | | | <null> | <null> |
| Locked | No | No | No | Seeking Action from Others | | Yes | | | | | <null> | <null> |
| Remove_User | Yes | Yes | No | Seeking Action from You | Removed | Yes | | Yes | | | <null> | <null> |
| Removed | No | No | No | | | Yes | | | | | <null> | <null> |
| Seek_Input | Yes | Yes | No | Seeking Action from Others | Give_Input | | | Yes | | Yes | <null> | <null> |
| Give_Input | Yes | Yes | No | Seeking Action from You | | | Yes | | | | <null> | <null> |
| Input_Given | No | No | No | Seeking Action from Others | | Yes | | | | | <null> | <null> |

FIG. 14A

| Actions | Edit_Doc | Comment_Doc | PartialEdit_Doc | Dashboard_Status | DefaultGiveAction | IsComplete | IsUpdateStepID | CreateStep | IsLockReqd | IsCascadeReqd | WaterMark | Doc_State |
|---|---|---|---|---|---|---|---|---|---|---|---|---|
| Seek_Approval | No | No | No | Seeking Action from Others | Give_Approval | | | Yes | Yes | Yes | Pending Approval | Seeking Approval |
| Give_Master_Approval | Yes | Yes | No | Seeking Action from You | | | Yes | | | | Pending Approval | Seeking Approval |
| Give_Approval | Yes | Yes | No | Seeking Action from You | | | Yes | | | | Pending Approval | Seeking Approval |
| Approved | No | No | No | Seeking Action from Others | | Yes | | | Yes | Yes | Pending Approval | Seeking Approval |
| Approved_Cascade | No | No | No | Seeking Action from Others | | Yes | | | | Yes | Pending Approval | Seeking Approval |
| Approval_Received | Yes | Yes | No | Seeking Action from You | | | | | | | Approved | Approved |
| Seek_Opinion | No | No | No | Seeking Action from Others | Give_Opinion | | | Yes | Yes | Yes | In Review | Seeking Opinion |

FIG. 14B

| Actions | Edit_Doc | Comment_Doc | Partial Edit_Doc | Dashboard_Status | DefaultGiveAction | IsComplete | IsUpdateStepID | IsCreateStep | IsLockReqd | IsCascadeReqd | WaterMark | Doc_State |
|---|---|---|---|---|---|---|---|---|---|---|---|---|
| Seek_Opinion_Optional | Yes | Yes | No | Seeking Action from Others | Give_Opinion_Optional | | | Yes | | Yes | In Review | Seeking Opinion |
| Give_Opinion | No | Yes | No | Seeking Action from You | | | Yes | | | | Comment Only | <null> |
| Give_Opinion_Optional | No | Yes | No | Seeking Action from You | | | Yes | | | | Comment Only | <null> |
| Opinion_Given | No | No | No | Seeking Action from Others | | Yes | | | | | <null> | <null> |
| Rejected | No | No | No | Seeking Action from Others | | Yes | | | | | Read Only | Seeking Approval |
| Rejected_Cascade | No | No | No | Seeking Action from Others | | Yes | | | | Yes | Read Only | Seeking Approval |
| Rejected_Final | No | No | No | Recent Doc | | Yes | | | | | Read Only | Rejected |

FIG. 14C

| Actions | Edit_Doc | Comment_Doc | Partial Edit_Doc | Dashboard_Status | DefaultGiveAction | IsComplete | IsUpdateStepID | CreateStep | IsLockReqd | IsCascadeReqd | WaterMark | Doc_State |
|---|---|---|---|---|---|---|---|---|---|---|---|---|
| Request_Revision | Yes | Yes | No | Seeking Action from Others | | Yes | | | | | In Revision | In Revision |
| Request_Revision_Cascade | Yes | Yes | No | Seeking Action from Others | | Yes | | | | | In Revision | In Revision |
| Seek_Assistance | No | Yes | Yes | Seeking Action from Others | | | | Yes | | Yes | <null> | Seeking Assistance |
| Give_Assistance | Yes | Yes | No | Seeking Action from You | | | Yes | | | | <null> | <null> |
| Assistance_Given | No | No | No | Seeking Action from Others | | Yes | | | | | <null> | <null> |
| Publish | No | No | No | Recent Doc | | Yes | | | | | Read Only | Published |

FIG. 14D

| | Initial | ReInitial | Locked | Remove_User | Removed | Seek_Input | Give_Input | Input_Given | Seek_Approval | Give_Master_Approval | Give_Approval | Approved | Approved_Cascade | Approval_Received |
|---|---|---|---|---|---|---|---|---|---|---|---|---|---|---|
| Initial | N | N | N | Y | N | Y | N | N | Y | N | N | N | N | N |
| ReInitial | N | N | N | Y | N | Y | N | N | Y | N | N | N | N | N |
| Locked | N | N | N | N | Y | N | N | N | N | N | N | N | N | N |
| Remove_User | N | N | N | Y | N | Y | N | N | Y | N | Y | Y | Y | N |
| Removed | N | N | N | N | N | N | N | N | N | N | N | N | N | N |
| Seek_Input | N | N | N | Y | N | Y | N | N | Y | N | Y | Y | N | N |
| Give_Input | N | N | Y | N | Y | N | N | Y | N | N | N | N | N | N |
| Input_Given | N | N | N | N | N | N | N | Y | N | N | Y | N | N | Y |
| Seek_Approval | N | N | N | Y | N | Y | N | N | N | N | N | Y | N | N |
| Give_Master_Approval | N | N | N | N | N | N | N | N | N | Y | N | Y | N | N |
| Give_Approval | N | N | N | Y | N | Y | N | N | Y | N | N | Y | Y | N |
| Approved | N | N | N | N | N | N | N | N | N | N | N | N | N | N |
| Approved_Cascade | N | N | N | N | N | N | N | N | N | N | N | N | N | N |
| Approval_Received | N | N | N | N | N | N | N | N | N | N | N | N | N | N |
| Seek_Opinion | N | N | N | Y | N | Y | N | N | N | N | N | Y | N | N |
| Seek_Opinion_Optional | N | N | N | Y | N | Y | N | N | N | N | N | Y | N | N |
| Give_Opinion | N | N | N | N | Y | N | N | N | N | N | N | N | N | N |
| Give_Opinion_Optional | N | N | Y | N | Y | N | N | N | N | N | N | N | N | N |
| Opinion_Given | N | N | N | N | N | N | N | N | Y | N | N | N | N | N |
| Rejected | N | N | N | N | N | N | N | N | N | N | N | N | N | N |
| Rejected_Cascade | N | N | N | N | N | N | N | N | N | N | N | N | N | N |
| Rejected_Final | N | N | N | N | N | N | N | N | N | N | N | N | N | N |
| Request_Revision | N | N | N | N | N | N | N | N | N | N | N | N | N | N |
| Request_Revision_Cascade | N | N | N | N | Y | N | N | N | N | N | N | Y | N | N |
| Seek_Assistance | N | N | N | Y | N | Y | N | N | N | N | N | N | N | N |
| Give_Assistance | N | N | N | N | Y | N | N | N | N | N | N | N | N | N |
| Assistance_Given | N | N | N | N | N | N | N | N | N | N | N | N | N | N |
| Publish | N | N | N | N | N | N | N | N | N | N | N | N | N | N |

FIG. 15A

| | Seek_Opinion | Seek_Opinion_Optional | Give_Opinion | Give_Opinion_Optional | Opinion_Given | Rejected | Rejected_Cascade | Rejected_Final | Request_Revision | Request_Revision_Cascade | Revision_Requested | Seek_Assistance | Give_Assistance | Assistance_Given | Publish |
|---|---|---|---|---|---|---|---|---|---|---|---|---|---|---|---|
| Initial | Y | Y | N | N | N | N | N | Y | N | N | N | N | N | N | Y |
| Rebuttal | Y | Y | N | N | N | N | N | Y | N | N | N | N | N | N | Y |
| Locked | N | N | N | N | N | N | N | N | N | N | N | N | N | N | N |
| Remove_User | Y | Y | N | N | N | Y | Y | N | Y | Y | N | N | N | N | N |
| Removed | N | N | N | N | N | N | N | N | N | N | N | N | N | N | N |
| Seek_Input | Y | Y | N | N | N | Y | N | N | Y | N | Y | N | N | N | Y |
| Give_Input | N | N | N | N | N | N | N | N | N | N | N | N | N | N | N |
| Input_Given | N | N | N | N | N | N | N | N | N | N | N | N | N | N | N |
| Seek_Approval | N | N | N | N | N | N | N | N | Y | N | N | N | N | N | N |
| Give_Master_Approval | Y | Y | N | N | N | Y | Y | N | Y | Y | N | N | N | N | Y |
| Give_Approval | Y | Y | N | N | N | Y | N | N | Y | N | N | N | N | N | N |
| Approved | N | N | N | N | N | N | N | N | N | N | N | N | N | N | N |
| Approved_Cascade | N | N | N | N | N | N | N | N | N | N | N | N | N | N | N |
| Approval_Received | N | N | N | N | N | N | N | N | N | N | N | N | N | N | N |
| Seek_Opinion | N | Y | N | N | N | N | N | N | N | N | N | N | N | N | N |
| Seek_Opinion_Optional | Y | Y | N | N | N | N | N | N | N | N | N | N | N | N | N |
| Give_Opinion | N | N | N | N | Y | N | N | N | N | N | N | N | N | N | N |
| Give_Opinion_Optional | N | N | N | N | Y | N | N | N | N | N | N | N | N | N | N |
| Opinion_Given | N | N | N | N | N | N | N | N | N | N | N | N | N | N | N |
| Rejected | N | N | N | N | N | N | N | N | N | N | N | N | N | N | N |
| Rejected_Cascade | N | N | N | N | N | N | N | N | N | N | N | N | N | N | N |
| Rejected_Final | N | N | N | N | N | N | N | N | N | N | N | N | N | N | N |
| Request_Revision | N | N | N | N | N | N | N | N | N | N | Y | N | N | N | N |
| Request_Revision_Cascade | N | N | N | N | N | N | N | N | N | N | Y | N | N | N | N |
| Seek_Assistance | Y | Y | N | N | N | N | N | N | N | N | N | Y | N | N | N |
| Give_Assistance | N | N | N | N | N | N | N | N | N | N | N | N | N | Y | N |
| Assistance_Given | N | N | N | N | N | N | N | N | N | N | N | N | N | N | N |
| Publish | N | N | N | N | N | N | N | N | N | N | N | N | N | N | N |

FIG. 15B

| ToBeLocked_Actions | Give_Input | Give_Opinion_Optional | Give_Assistance |
|---|---|---|---|
| Seek_Opinion | Locked | | Locked |
| Seek_Approval | Locked | Locked | Locked |
| Approved | Locked | Locked | Locked |
| Rejected | Locked | Locked | Locked |
| Request_Revision | Locked | Locked | Locked |
| Publish | Locked | Locked | Locked |

FIG. 16

| Cascade_Actions | Initial | ReInitial | Give_Approval |
|---|---|---|---|
| Seek_Input | ReInitial | | |
| Seek_Approval | ReInitial | | |
| Approved | Approval_Received | Approval_Received | Approved_Cascade |
| Approved_Cascade | Approval_Received | Approval_Received | Approved_Cascade |
| Seek_Opinion | ReInitial | | |
| Seek_Opinion_optional | ReInitial | | |
| Rejected | Rejected_Final | Rejected_Final | Rejected_Cascade |
| Rejected_Cascade | Rejected_Final | Rejected_Final | Rejected_Cascade |
| Request_Revision | | | Request_Revision_Cascade |
| Request_Revision_Cascade | | | Request_Revision_Cascade |
| Seek_Assistance | ReInitial | | |
| Publish | Publish | Publish | Publish |

Untitled 1

File | View | Tools | Assets

2501

Seek Input 2602

Project Team: You + 1

Name: Bob
Activity: CoAuthoring
Status:
● Pending
◎ In Progress
◎ Completed.

Add user

Email

Set deadline

Include a message

SEND

Give Input ▽

Edit this project, add content, respond to or leave comments and send project back to Alice.

*Your response needed before:*
Jan 30, 2019
*Schedule a co-authoring session:*
Set time:
Set Date:

Send Calendar Invite

Include a message here

Send Completion Notice

File | View | Tools | Assets

2501

Untitled 1

Give Approval 2607

*Alice seeks your approval: you can edit, comment, reject, or approve the project, delegate it to someone else, or seek anonymous opinion. As the approver, only you can resolve conversations.*

*Your decision/action*
◎ Approve
⦿ Request Revision
◎ Reject
◎ Forward
◎ Seek opinion

*Include a message*

Send

2501

File | View | Tools | Assets

Untitled 1

Takeover Approval — 2609

Zoe has requested you to take over the approval of this project. See below for available permissions. The project will go to Zoe for final approval.

Act before ____

*Your decision/action*
◎ Approve
◎ Request Revision
◎ Reject
◎ Forward
● Seek opinion ☑ Reveal user
☑ Reveal comments Email ____ +

*Include a message*

Send

2501

File | View | Tools | Assets

Untitled 1

File | View | Tools | Assets

Untitled 1

2501

Publish

*Previous* | Next

2612

Publish to
◉ Template center
○ Internet
◉ Intranet
◉ Private archive

Schedule publication: _____

Choose Channels
☐ Website
☐ Blog
☐ YouTube
☐ Facebook
☐ Twitter
☐ Email

Publish

FIG. 26Q

← Progress so far with 'Untitled 1'.                                    2613

| Stage | Login | First Name | Last Name | Employee ID | Expertise |
|---|---|---|---|---|---|
| Authoring | alice@abc.com | Alice | Ho | 1001 | MarComm, Chinese language, |
|  | bob@abc.com | Bob | Fisher | 1301 | Product, Strategy, |
| Input (Co-authoring ) | chris@abc.com |  |  |  |  |
|  | dave@abc.com |  |  |  |  |
| Opinion (Review) | ed@abc.com |  |  |  |  |
| Approval | zoe@abc.com |  |  |  |  |
| Master Approval | yo@abc.com |  |  |  |  |

FIG. 26R

← Progress so far with 'Untitled 2'.  2613

| Stage | Login | First Name | Last Name | Employee ID | Expertise |
|---|---|---|---|---|---|
| Authoring | alice@abc.com | Alice | Ho | 1001 | MarComm, Chinese language, |
| Input (Co-authoring) | bob@abc.com | Bob | Fisher | 1301 | Product, Strategy, |
| | chris@abc.com | | | | |
| Approval | zoe@abc.com | | | | |
| Opinion (Review) | dave@abc.com | | | | |
| | ed@abc.com | | | | |
| Master Approval | yo@abc.com | | | | |
| Publishing | xia@abc.com | | | | |

FIG. 26S

← The sequence for this published project 'Untitled 1' is available for capture  2614

| Stage | Login | First Name | Last Name | Employee ID | Expertise |
|---|---|---|---|---|---|
| Authoring | alice@abc.com | Alice | Ho | 1001 | MarComm, Chinese language. |
| Input (Co-authoring) | bob@abc.com | Bob | Fisher | 1301 | Product, Strategy. |
| | chris@abc.com | | | | |
| Opinion (Review) | dave@abc.com | | | | |
| | ed@abc.com | | | | |
| Approval | zoe@abc.com | | | | |
| Master Approval | yo@abc.com | | | | |
| Publishing | xia@abc.com | | | | |

Capture Sequence

FIG. 26T

← The sequence for this published project 'Untitled 1' is now captured, and is now ready to be deployed. 2615

Name your sequence:

Enter description:

Assign tags:

| Stage | Login | First Name | Last Name | Employee ID | Expertise |
|---|---|---|---|---|---|
| Authoring | alice@abc.com | Alice | Ho | 1001 | MarComm, Chinese language, |
| Input (Co-authoring) | bob@abc.com | Bob | Fisher | 1301 | Product, Strategy, |
| | chris@abc.com | | | | |
| Opinion (Review) | dave@abc.com | | | | |
| | ed@abc.com | | | | |
| Approval | zoe@abc.com | | | | |
| Master Approval | yo@abc.com | | | | Deploy Sequence |
| Publishing | xia@abc.com | | | | |

FIG. 26U

← Announce the deployment of this sequence 'Untitled Sequence 1' to the intended users (20 users added for authoring) 2617

Name: Untitled Sequence 1

*Subject:*

*Compose a message*

☑ This is a recurring assignment. Announce periodically. Set calendar: 🗓  Set frequency: ○ Daily ● Weekly ○ Monthly

Announce Sequence

FIG. 26W

ROLE-AGNOSTIC INTERACTION MANAGEMENT AND REAL TIME WORKFLOW SEQUENCE GENERATION FROM A LIVE DOCUMENT

BACKGROUND

Technical Field

The embodiments herein, in general, relate to document collaboration. More particularly, the embodiments herein relate to role-agnostic interaction management and real-time workflow sequence generation from a live document.

Description of the Related Art

With the advent and evolution of the Internet, document processing has evolved from a task performed typically by a single user into a collaborative effort by multiple users, for example, peers, collaborators, participants, etc. In an academic environment, for example, a student works with a guide to submit a thesis. A dean receives the thesis and allocates a committee of reviewers or assistants to review, edit, and approve the thesis. Because the origin of document processing typically involved a single user working on a single document, conventional document creation and processing applications do not contain optimal tools that allow multiple users to collaborate optimally during the creation, review, editing, commenting, approval, and publication of the document in a single application environment. As a result, conventional solutions make it very difficult for groups of users to effectively work together to create, review, edit, comment, approve, and publish documents.

In a digital context, a first action is a user-to-machine action that creates a digital asset, for example, a document, over which a reaction is requested. Most conventional collaboration tools consider the document as a frozen asset that is open only for commenting and approval. When the document is open for editing, mechanisms for approval and permissions-calibrated commenting are unavailable. A document enters a workflow as soon as the document is shared. Sharing is typically confined to granting edit or comment only permissions to a recipient of the document. Additional permissions that users need are often enabled through external workflows. The creation and deployment of a workflow are typically back-end tasks that involve coding or applications and multiple external tools that require expensive and time-consuming tool development, customization, integration, and continuing maintenance and support. The creation of a workflow includes a definition of steps and parameters of a process and a development of customized computer software to execute the process. This method of creation of a workflow is burdensome and requires substantial effort from a user as it is difficult to abstractly consider a sequence of steps that should be executed. Moreover, this method of creation of a workflow typically takes weeks, if not months, and requires a non-technical user to depend on multiple external applications to capture and define the workflow sequence as applicable to a taskset that represents a standard operating procedure, and deploy the captured workflow sequence to a number of users. Therefore, there is a need for capturing a workflow sequence in real time and re-deploying the captured workflow sequence.

Document collaboration applications such as text editors typically embed default share permissions comprising, for example, a read permission, a review permission, and a write permission in a document. The read permission throws the document out of a program context. The review permission allows a recipient of the document to enter comments in the document. The write permission allows the recipient to edit the document in an edit-tracking mode that can be switched on and off. Meaningful user exchange on a document requires other permissions of different types. For example, an absence of permissions for tasks such as approval and delegation, throws collaboration into a state of anarchy. Conventional collaborative systems manage permissions or restrictions on a document based on one or a combination of interactions, for example, user-to-user or login-to-login; user-type-to-user-type or role-to-role; action-to-reaction; stage-to-stage of a workflow; anonymous-action-to-anonymous-reaction; and application-to-application. These collaborative systems typically apply permissions to the entire document, while applying limited and rudimentary reaction-type permissions, for example, reply or respond and delete, to the comments entered in the document. There is a need for a framework that anticipates and accommodates every conceivable type of action request into a set of actionable permissions. Some collaborative systems grant and distribute permissions on regions, for example, paragraphs, in the document. However, these systems enforce compliance by imposing the controls on the regions of the document and forcing collaborators to respond within the confines of the controls, without allowing the collaborators to modify the controls in a pre-publication stage of the document.

Moreover, conventional systems are configured to control actions that a user is allowed to perform on a document according to the user's permissions. These conventional systems store and apply permissions on the document in accordance with the user's role, for example, author, editor, mentor, publisher, etc., that is predefined or hardcoded for the user. Workflows are also typically designed around users who are assigned to collaborate on the document, their designations, their roles, and business permissions the users have based on their roles. The recognition and execution of permissions and the articulation of a workflow in conventional solutions are role-based, that is dependent on the user's predefined role. Role-based articulation of a workflow requires a user to be hardcoded to a particular role and the entitlement of that role. There is a need for generating a workflow sequence independent of a user's role, thereby fluidizing workflow sequencing and allowing a user to play different roles in different workflow sequences.

Furthermore, conventional solutions may not consider controlled anonymity in a peer review process. A lack of anonymity introduces a bias into a collaboration. These requirements force document tool vendors to develop external tools for assigning and managing these additional permissions and then route documents through multiple different file sharing platforms leading to convolutions that are typically referred to as a "workflow". Such workflows operate in an intra-organizational context or an inter-organizational context or a mixed context. Most cases demand that a client-vendor permission is assigned and managed.

Some document tool vendors allow storage of content and data generated from document collaboration into a universal repository with permissions to manage conditions for storage and retrieval. Conventional solutions provide a host of channel-specific tools and platforms to drive content and data to a designated destination, for example, the internet via a website, a blog, social media, online repositories, search engines, etc., a private or quarantined file vault, an enterprise intranet, etc. Moreover, conventional solutions transit a document from application to application or from one application instance to another application instance, often as an object file that is uploaded or downloaded for the object file to attain a set of interactions deemed necessary for task completion, which increases versioning, version-tracking, and storage overheads.

Furthermore, users involved in document collaboration typically need to view a comprehensive and consolidated dashboard of their document interactions and detailed information of each document. A user is typically required to perform several clicks and manoeuvre through multiple applications to obtain a detailed view of this information. Several notifications are sent out from each application that demand and divide the user's attention. To mitigate the overload of notifications, applications allow the notifications to be filtered and switched off. However, the utility of filtering notifications is questionable as operating systems have begun to control the notifications with "Do not Disturb" features. There is a need for consolidating, focusing, and managing the attention of a user through a single dashboard in a document collaboration environment.

Hence, there is a long-felt need for a role-agnostic, universal method and system for managing interactions and automatically sequencing a workflow from a live document in real time, while addressing the above-recited problems associated with the related art.

SUMMARY

This summary is provided to introduce a selection of concepts in a simplified form that are further disclosed in the detailed description. This summary is not intended to determine the scope of the claimed subject matter.

The embodiments disclosed herein address the above-recited needs for a role-agnostic, universal method and system for managing interactions and automatically sequencing a workflow from a live document in real time. The embodiments disclosed herein manage permissions based on one or a combination of interactions, for example, user-to-user or login-to-login and action-to-reaction, and implements stage-to-stage workflow interactions as a consequence of the action-to-reaction interactions for an economical solution. Moreover, the embodiments disclosed herein manage interactions and automatically sequence a workflow from a live document in real time in a single application environment. Furthermore, the embodiments disclosed herein automatically derive an anonymous action to an anonymous reaction from a combination of actions to reactions and stage-to-stage workflow interactions. The embodiments herein provide a rich-text-cum-data editor with a native framework and a method for approval, delegation of approval and anonymous participation, with the ability to capture a generalized workflow sequence.

The embodiments disclosed herein embed an interaction management system into a document editor. The interaction management system defines codified decision rules associated with multiple actions to be performed on the live document by multiple participants for generating a workflow sequence independent of a role of each of the participants. The interaction management system stores the codified decision rules in a database. The actions comprise request actions that anticipate any potential scenario in an interaction path of the live document and response actions performed by the participants invoked in the live document within the document editor. In an embodiment, the request actions comprise seeking an input, seeking an opinion, seeking an approval, and seeking an assistance. In an embodiment, the response actions comprise providing an input, providing an opinion, providing an approval, and providing an assistance. In an embodiment, the interaction management system automatically derives consequential actions from the request actions and the response actions for selection by the participants via the display interface. In an embodiment, the interaction path comprises one or more of multiple stages comprising, for example, an edit stage, an approval stage, a revision stage, an opinion stage, and a subsequent approval stage.

On receiving one of the request actions from one of the participants from within the live document, the interaction management system generates an actionable element for execution of one or more of the response actions corresponding to one of the request actions, by another one or more of the participants. In an embodiment, the actionable element comprises the live document and handles configured to invoke the request actions and accommodate the response actions. The actionable element is, for example, a uniform resource locator (URL). The interaction management system simultaneously aggregates and records request action data and potential response action data through the actionable element. Based on a correlation between the actions extracted from the request action data and the potential response action data and the codified decision rules in the database, the interaction management system dynamically generates a permission set comprising permissible actions on the live document and on comments and regions within the live document. The interaction management system transmits the dynamically generated permission set comprising the permissible actions for each stage along the interaction path of the live document. The interaction management system anticipates and accommodates every conceivable type of the request actions into the permission set. Based on a correlation between the actions extracted from the request action data and the potential response action data and the codified decision rules in the database, the interaction management system also automatically determines an anonymity requirement from the request action data and the potential response action data and contextually anonymizes the participants invoked to act on the live document based on the anonymity requirement. In an embodiment, the interaction management system automatically differentiates between multiple anonymity levels comprising a user-to-user anonymity level and a user input-to-user input anonymity level, while allowing selective de-anonymization of the participants addressed to act on the live document based on preferences of the participants. In an embodiment, the anonymity requirement is based on a type of the request actions comprising seeking an opinion extracted from the request action data.

The interaction management system tracks and maps the actions performed along the interaction path of the live document in real time, while transmitting and executing the dynamically generated permission set on the live document, until the live document reaches an intended closure and the comments reach a resolution to generate a re-deployable workflow sequence in real time. In an embodiment, the interaction management system prompts the participants to enter a response time via a calendar interface rendered by the interaction management system during the tracking of the actions performed along the interaction path of the live document in real time. The interaction management system generates and renders a representation of the re-deployable workflow sequence on a display interface. The interaction management system operably communicates with at least one database for storing the re-deployable workflow sequence.

In an embodiment, the interaction management system selectively displays the comments in the live document to other one or more of the participants based on a type of each of the actions. In another embodiment, the interaction management system continuously tracks and displays a status and a progress of the live document on a dashboard through the actionable element. The actionable element is configured to render the live document in a conference mode on the dashboard by integrating multiple communication components within the document editor in a single application environment. In another embodiment, the interaction management system determines and renders workflow sequences analogous to the re-deployable workflow sequence in communication with at least one database for deployment by users. In another embodiment, the interaction management system distributes multiple controls on the regions of the live document in a suggest mode in a pre-publication stage of the live document and in a consumption mode in a post-publication stage of the document. The controls comprise, for example, a visibility control, an editability control, mandatory response options, a word limit control in accordance with the editability control, etc. The suggest mode is configured to allow fellow participants to modify the controls. The consumption mode is configured to allow subordinate participants to perform one of the response actions corresponding to one of the request actions within the confines of the controls.

In an embodiment, the interaction management system generates and renders a unified dashboard configured to chronologically display document information, the request actions, and the response actions on a priority basis on the display interface. The unified dashboard consolidates the user's attention, thereby making incessant broadcasts of notifications redundant. The document information comprises, for example, a title, a participant identifier, a type of each of the request actions, a deadline for each of the response actions, number of comments that remain open for resolution, a word count, a potential involvement time based on the word count, a total engagement based on a prior involvement of time and resource, a duplicated document, a docket of a group of documents, etc. The unified dashboard is configured to focus the attention of each of the participants. In an embodiment, the interaction management system integrates multiple publication gateways within the document editor for publishing the live document. The publication gateways comprise, for example, a template center, a quarantined private archive, a public network, and a private network.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or component shown by that same numeral in any subsequent drawing herein.

FIGS. 2-4 illustrate flow diagrams showing different workflow sequences, according to an embodiment herein.

FIGS. 14A-14D illustrate a database schema comprising metadata that defines what needs to be done for each action performed by a user, according to an embodiment herein.

FIGS. 15A-15B illustrate a database schema comprising decision rules associated with multiple actions to be performed by a user, according to an embodiment herein.

FIG. 16 illustrates a database schema comprising post-processing decision rules for locking a document, according to an embodiment herein.

FIG. 17 illustrates a database schema comprising post-processing decision rules for cascaded actions, according to an embodiment herein.

DETAILED DESCRIPTION

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". Various embodiments herein provide a method, a system, and subsystems that implement a role-agnostic, interaction management system for simulating and automatically sequencing a workflow from a live document in real time. As used herein, the term "workflow" refers to a repeatable and re-deployable pattern of processes that a live document undergoes from a creation of the live document to a completion or an intended closure of the live document and a resolution of comments in the live document. Also, as used herein, "live document" refers to an electronic document that is created by a user and remains active or open within a document editor for performing multiple interactions, for example, editing, commenting, revising, reviewing, approving, cascading approval, anonymizing, etc., throughout a course or a workflow of the electronic document. The live document is a live asset that is open for editing and other interactions within the document editor. In an embodiment, the live document may also be a dummy document that is replaced by another document, a set of documents, or a uniform resource locator (URL). Also, as used herein, "document editor" refers to an online editing and publishing application or platform, for example, an integrated rich content and form editor/publisher that allows real-time collaboration on a live document. The document editor is selected, for example, from a class of rich text editors that allow editing of text and different styles of text, styles of paragraphs, and other embedded multipurpose internet mail extension (MIME) types. In an embodiment, the document editor is a browser-based rich text and form editor.

Figure 1:
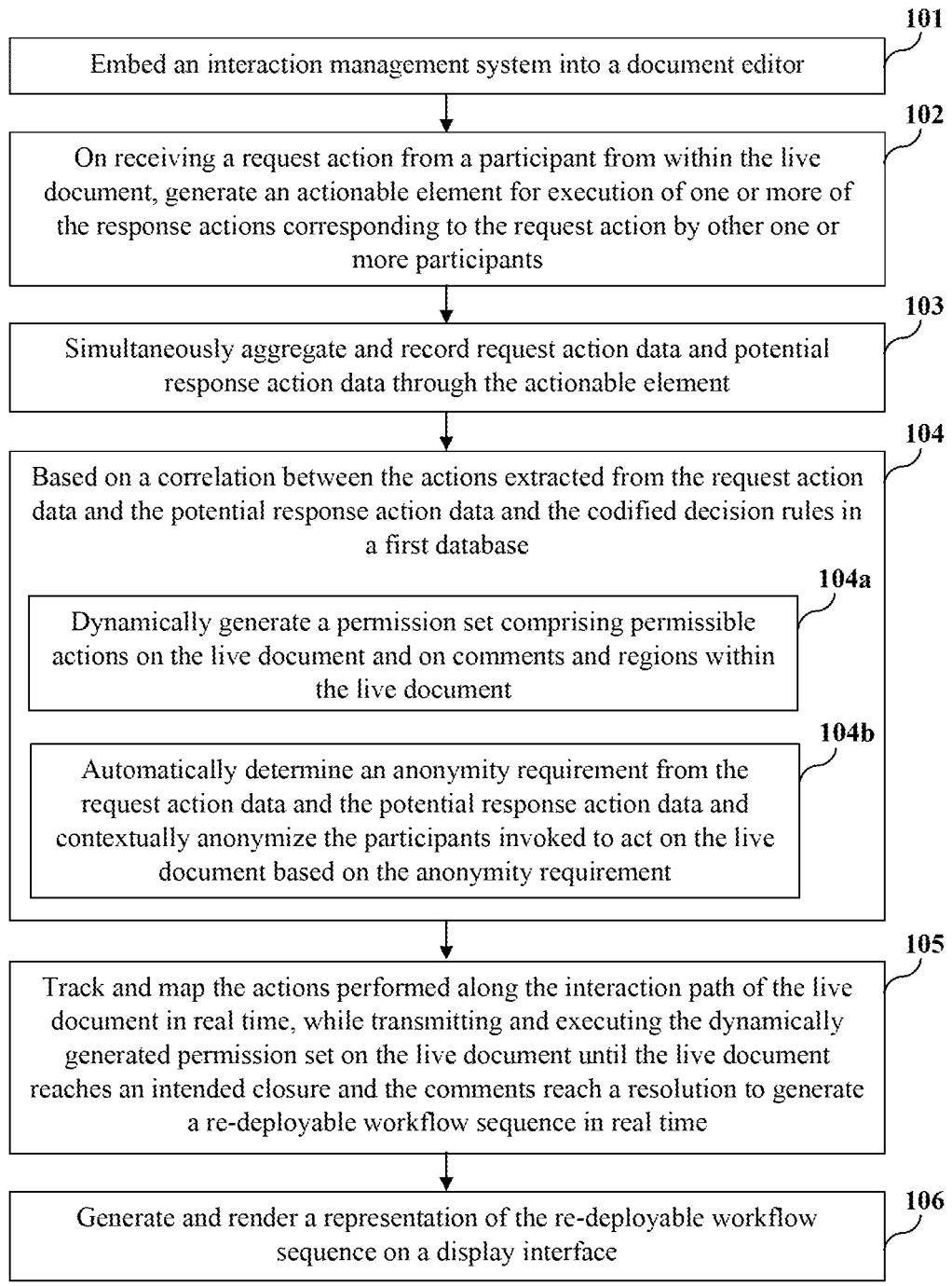
FIG. 1 illustrates a computer-implemented method for managing interactions and automatically sequencing a workflow from a live document in real time, according to an embodiment herein.

FIG. 1 illustrates a computer-implemented method for managing interactions and automatically sequencing a workflow from a live document in real time, according to an embodiment herein. In the computer-implemented method disclosed herein, a role-agnostic interaction management system is embedded 101 into a document editor, thereby allowing the document editor to simultaneously operate as a universal workflow sequence generator or a universal workflow sequencer. In an embodiment, the interaction management system is a framework executed within the document editor for sharing a live document that transforms into a workflow sequence in real time. In an embodiment, the interaction management system is implemented as a collaborative system that manages interactions and permissions. The universality of the interaction management system arises from the ability of the framework to anticipate and accommodate every conceivable type of request action and express every conceivable type of request action as a set of actionable permissions. In an embodiment, the document editor, for example, an integrated rich content and form editor, embedded with the interaction management system, creates a browser-based content nucleus that advances permission-embedding. Being role-agnostic, the interaction management system has an innate potential to allow a user to assume different positions in each workflow sequence in which the user participates. Users who participate in and perform various interactions on the live document are herein referred to as "participants". The participants comprise, for example, content creators, collaborators, reviewers, assistants, approvers, editors, publishers, etc. In the computer-implemented method disclosed herein, each of the participants login to a user account using minimum credentials, for example, an electronic mail (email) address, a phone number, etc., to access the document editor embedded with the interaction management system. A type of request action sought from the participants determines their response action, regardless of their roles.

The interaction management system integrates a set of functionalities in the document editor that allows a participant to perform a seek action, for example, seek an approval, in addition to performing a read action, a review action, and a write action. The interaction management system allows the participants to perform any action, for example, seek an input, seek an opinion, seek an approval, seek an assistance, provide an input, provide an opinion, provide an approval, provide an assistance, etc., regardless of their role or designation in an enterprise or an organization or other application. Independence of a participant's role fluidizes workflow sequencing and allows the participant to play different roles in different workflow sequences as disclosed below. The aggregate of the set of functionalities transforms the live document into an application (app) deployable on a user device with which intended participants can interact when distributed. In an embodiment, the output of the interaction management system is an interactive, live document or an application that participants interact with in a pre-publication scenario and a post-publication scenario. In an embodiment, the interaction management system implements workflow sequencing at the front-end and allows participants to perform and iterate an action across a user base. In an embodiment, the interaction management system is implemented as an embedded, universal approval management framework for real-time workflow sequencing, capture, and deployment to scale.

The interaction management system defines and stores codified decision rules associated with multiple actions to be performed on the live document by multiple participants in at least one database for generating a workflow sequence independent of a role of each of the participants. In an embodiment, the interaction management system operably communicates with at least one database for storing the defined codified decision rules. The actions comprise request actions that anticipate any potential scenario in an interaction path of the live document and response actions performed by the participants invoked in the live document within the document editor. In an embodiment, the interaction path comprises one or more of multiple stages comprising, for example, an edit stage, an approval stage, a revision stage, an opinion stage, and a subsequent approval stage of the live document. As used herein, "request actions" refer to actions on the live document that a participant seeks from another participant. In an embodiment, the request actions comprise seeking an input, seeking an opinion, seeking an approval, and seeking an assistance. Also, as used herein, "response actions" refer to actions that another participant addressed by a requesting participant from within the document editor, performs in response to the request actions sought by the requesting participant. In an embodiment, the response actions comprise giving or providing an input, giving or providing an opinion, giving or providing an approval, and giving or providing an assistance.

In an embodiment, the interaction management system defines the codified decision rules based on an interpretation of intentions on a live document being of the following action types: seek/give input, seek/give opinion, seek/give approval, seek/give assistance, and seek/give revision. These action types form the framework of the interaction management system and the entire gamut of interactions possible on the live document. These action types facilitate the codification of the decision rules based on which permissions are generated for the document, regardless of the roles, hierarchy, designations, etc., of the participants. The codified decision rules infer the permissions that another participant needs and lock out the permissions that the other participant does not need, thereby implementing permission and document state sensitivity. The initial actions set up downstream actions. The seek/give opinion is a peer action where only mandatory or voluntary commenting is allowed. In an embodiment, the interaction management system generates a source file, for example, a file in a docx format, for expressing and distributing the seek/give input, the seek/give approval, the seek/give assistance, and the seek/give revision intentions digitally within the document editor. In another embodiment, the interaction management system generates a distribution file, for example, in a portable document format, for expressing and distributing the seek/give opinion digitally within the document editor. In an embodiment, the interaction management system allows distribution of an edit request natively from within the document editor along the interaction path. The interaction management system defines a complete taxonomy of user actions necessary for a correspondingly appropriate set of machine actions to formulate the codified decision rules. In an embodiment, the interaction management system comprises a universal rules engine for codifying decision rules configured to anticipate any interaction path in any use case scenario as disclosed in the table below:

| User action | Corresponding machine action for a participating recipient | |
| --- | --- | --- |
| | Permissions | Restrictions |
| Seek Input | Edit, (Targeted) Comment/Respond | No seek action |
| Seek Opinion | Comment/Respond | |
| Mark as optional | Comment/Skip | |
| Targeted comment/s | Respond (as targeted) | |
| Seek Approval | Edit, Comment/Respond/Resolve, Seek Revision, Approve, Seek Opinion, Reveal Comment/s, Forward, Pass on Master Approval, Reject | |
| Seek Assistance | Edit, Comment/Reply | No seek action, delete/resolve |
| Publish | Edit, Comment/Reply, Publish to Select Channel, and Set Access Criteria | |

In the above table, the actions, for example, "seek input", "seek opinion", "seek approval", "seek assistance", "publish", "reveal comment/s", and "pass on master approval" denote user input necessary for generating and delivering a permission set for a succeeding action. In an embodiment, the interaction management system restricts the type of actions to one of four types, that is, "seek input", "seek opinion", "seek approval", and "seek assistance" based on an insight that all request actions are classifiable into one of these four types. In an embodiment, the interaction management system automatically derives consequential actions from the request actions and the response actions for selection by the participants via a display interface rendered by the interaction management system. For example, the interaction management system automatically derives a "request revision" action or a forward action to another participant for approval, from one of the request actions, for example, the "seek approval" action. Each of the first four action types, for example, "seek input", "seek opinion", "seek approval", and "seek assistance" determines the nature of the succeeding, consequential action types. The interaction management system interfaces these four request actions for selection by a participant and generates a permission set as a consequence of the selection of one of the four request actions. The interaction management system requires no other user input type to determine the types of subsequent actions, also referred to as "response actions". In an embodiment, the request actions comprise sub-request actions. For example, the interaction management system renders a "seek approval" action with a permission set that allows a recipient or a responding participant to edit, approve, reject, request revision, seek an opinion with or without conditions of anonymity, or forward an approval to another participant. In an embodiment, when an approval action is forwarded for an additional approval action, the interaction management system distinguishes a single action of approval as a master approval action. In an embodiment, when an approval action is forwarded, the interaction management system also forwards the master approval action by default in accordance with the codified decision rules defined by the rules engine. In an embodiment, the interaction management system allows a participant to override the action of forwarding the master approval action by selecting an option to not pass on the master approval via a display interface. From this action, the interaction management system learns to allocate the appropriate permissions.

In an embodiment, the interaction management system allows user-moderation of a "seek opinion" action to be marked as an optional opinion. In this embodiment, the interaction management system learns to not wait for the request action to be completed when the corresponding response action is advanced. In another example, the interaction management system derives the "seek assistance" action from the "seek input" action, for example, for managing vendor interactions or for publishing the content of the live document to a publication gateway, for example, the internet, an intranet, a private archive, a template center, etc. In another example, the interaction management system derives a "publish" action from the "seek assistance" action.

In the computer-implemented method disclosed herein, on receiving one of the request actions from one of the participants from within the live document, the interaction management system generates 102 an actionable element for execution of one or more of the response actions corresponding to one of the request actions, by another one or more of the participants. In an embodiment, the actionable element comprises the live document and handles configured to invoke the request actions and accommodate the response actions. The actionable element is, for example, a uniform resource locator (URL). In another embodiment, the actionable element acts as the live document. The interaction management system simultaneously aggregates and records 103 request action data and potential response action data through the actionable element. Instead of moving the live document from user to user, milestone to milestone, stage to stage, the actionable element aggregates all the data. Based on a correlation 104 between the actions extracted from the request action data and the potential response action data and the codified decision rules in the database, the interaction management system dynamically generates 104a a permission set comprising permissible actions on the live document and on comments and regions, for example, paragraphs, within the live document. As used herein, "permission set" refers to a package of permissions or permissible actions generated by the interaction management system for an action sought by a participant. The permissible actions comprise, for example, edit, comment, etc., on the live document, and respond, resolve, etc., on the comments entered in the live document. As soon as the participant selects a seek action, the interaction management system generates and executes the permission set on the live document, without requiring the participant to define or describe any requirement. The interaction management system packages the permissible actions as a consequence of the action sought based on the codified decision rules. The interaction management system does not restrict the permission set to the live document but extrapolates the permission set to the comments and the regions of the live document, thereby invoking permissions at a document level, a comment level, and a region level.

The interaction management system generates the permission set as a consequence of one of the request actions, for example, "seek input", "seek opinion", "seek approval", and "seek assistance" selected by a participant via the display interface. The codified decision rules of the interaction management system anticipate and accommodate every conceivable type of the request actions into the permission set. In an example, if a participant selects the "seek input" request action on the display interface, the interaction management system, in communication with the database that stores the codified decision rules, dynamically generates a permission set comprising permissible actions such as edit and comment/respond on the live document. In this example, the interaction management system restricts the responding participant from seeking any action. In another example, if a participant selects the "seek opinion" request action on the display interface, the interaction management system, in communication with the database that stores the codified decision rules, dynamically generates a permission set comprising permissible actions such as comment/respond on the live document. In another example, if a participant selects the "seek approval" request action on the display interface, the interaction management system, in communication with the database that stores the codified decision rules, dynamically generates a permission set comprising permissible actions such as edit, comment/respond/resolve, seek revision, approve, seek opinion, reveal comments, forward, pass on master approval, and reject on the live document. In an embodiment, the interaction management system contextualizes the permission to resolve or a lack of the permission based on the type of action, stage-sensitive actionability, and a dynamic transfer of this actionability along with anonymity controls. In another example, if a participant selects the "seek assistance" request action on the display interface, the interaction management system, in communication with the database that stores the codified decision rules, dynamically generates a permission set comprising permissible actions such as edit and comment/reply on the live document. In another example, if a participant selects the "publish" request action on the display interface, the interaction management system, in communication with the database that stores the codified decision rules, dynamically generates a permission set comprising permissible actions such as edit, comment/reply, publish to a select channel, and set access criteria on the live document. The interaction management system transmits the dynamically generated permission set comprising the permissible actions for each stage along the interaction path of the live document.

As disclosed in the table above, the interaction management system executes the permission set on the live document and the comments within the live document. In an embodiment, the interaction management system executes the permission set on regions, for example, paragraphs within the live document. The interaction management system grants and distributes permissions by region, for example, a paragraph within the live document, thereby allowing a participant to seek a master action set over specified regions, for example, paragraphs, contents, etc., of the live document.

Based on a correlation 104 between the actions extracted from the request action data and the potential response action data and the codified decision rules in the database, the interaction management system also automatically determines 104b an anonymity requirement from the request action data and the potential response action data and contextually anonymizes the participants invoked to act on the live document based on the anonymity requirement. In an embodiment, the interaction management system determines the anonymity requirement for a user based on the action assigned to the user. When a user is marked anonymous, the interaction management system does not permit the user to view any other user's User identifier (ID) other than that of the user, that is, the inviter, who invited them to perform an action on a live document. The interaction management system also does not permit other users to view the anonymous user's User ID. The interaction management system allows the inviter to explicitly de-anonymize the invited user based on the inviter's preference. In an embodiment, the interaction management system automatically differentiates between multiple anonymity levels comprising a user-to-user anonymity level and a user input-to-user input anonymity level, while allowing selective de-anonymization of the participants addressed to act on the live document based on preferences of the participants. At the user-to-user anonymity level, the interaction management system contextually anonymizes the identities of the participants. At the user input-to-user input anonymity level the interaction management system contextually anonymizes the inputs, for example, opinions and comments of the participants.

In an embodiment, the anonymity requirement is based on a type of the request actions comprising seeking an opinion extracted from the request action data. When an opinion is sought from multiple participants by selection of the "seek opinion" request action on the display interface, the interaction management system determines an anonymity requirement, that is, a requirement to conceal the participants and/or their opinions and comments from one another. This parallel request leads to mutual automatic anonymization. The interaction management system allows selective de-anonymization for the requesting participant or seeker. If the requesting participant inserts comments ahead of seeking an opinion, the interaction management system targets such comments for display to one or more addressees or responding participants and conceals such comments from the others. The interaction management system automatically anonymizes the "seek opinion" request action that follows the "seek approval" request action to conceal an identity of the requesting participant or seeker from the responding participant or reviewer and also identities of participants positioned on either side of an approver. The interaction management system implements controlled anonymity in a peer review process and encodes anonymity to all subsequent actions when an approval request action is cascaded. In this linear distribution, the anonymity is reciprocal, bidirectional, and inclusive of parallel distribution, if any. Through contextual anonymization comprising identity masking and filtering for anonymous participation, the interaction management system eliminates bias, especially in reviews, thereby allowing for a bias free participation in the live document.

Consider an example where a participant A seeks approval from a participant B who in turn, seeks an opinion from a participant C. When the "seek opinion" action is selected by participant B, the interaction management system automatically anonymizes participant A and participant C from each other to implement a user identity level anonymity. In another example, when participant A simultaneously seeks opinion from participant B and participant C, the interaction management system makes participant B and participant C mutually anonymous to each other at a user level and a user comment level. In an embodiment, the interaction management system allows the comments to be viewed by participant B and participant C, but not the identities of participant B and participant C. In an embodiment, the interaction management system enforces anonymity when an opinion is sought as a default condition to ensure a bias-free participation in the live document. The interaction management system provides permissions to respond to, resolve, and de-anonymize such comment threads to the approver.

In an embodiment, the interaction management system implements permissions-restricted comments, where a response to a comment is set as mandatory or voluntary. In an embodiment, the interaction management system selectively displays comments on a live document by hiding them from some participants and making them visible to other participants. The interaction management system also maintains anonymity of some participants who entered the comments, for example, when a request action type is seek opinion. In another embodiment, the interaction management system implements permissions-restricted comment resolution as assigned initially or transferred subsequently, where a resolution of the comment is set as mandatory or voluntary.

The interaction management system tracks and maps 105 the actions performed along the interaction path of the live document in real time, while transmitting and executing the dynamically generated permission set on the live document, until the live document reaches an intended closure and the comments reach a resolution to generate a re-deployable workflow sequence in real time. In an embodiment, an action of publication triggers the intended closure of the document. The interaction management system captures each exchange, for example, input, opinion, approval, revision, assistance, etc., as a milestone and maps the overall exchange as a sequence of milestones in real time, which is then expressed as a standard operating procedure in minimal runtime. The interaction management system advances permission-embedding by natively enabling a set of functionalities that allow a participant to seek, in addition to read, review, and write, an approval action.

Consider an example where a first participant initiates a collaboration on a live document, performs a "seek approval" request action via the display interface, and shares the live document from within the document editor to a second participant. The interaction management system allows the second participant to approve or reject the content of the live document from within the document editor. The interaction management system also allows the second participant to forward or delegate and allow a third participant, for example, an assistant, to take over the approval process from within the document editor. The interaction management system also allows the third participants, in turn, to call upon other fourth participants, for example, sub-assistants, for review and editing actions such as proof-reading the live document from within the document editor. The interaction management system automatically determines an anonymity requirement and contextually anonymizes the participants, for example, the third participant and the fourth participants, invoked to act on the live document. The interaction management system, therefore, renders the reviewing assistants as anonymous to the first participant and/or vice versa. The interaction management system assigns or de-assigns anonymity to the participants. The interaction management system also allows the second participant to intervene and perform a "seek revision" request action from the first participant until the live document is approved or rejected. The interaction management system records a route map of every sequence disclosed in the example above. That is, the interaction management system automatically captures the following workflow sequence: the first participant seeking approval from the second participant; the second participant forwarding or delegating the approval process to the third participant; the third participant seeking assistance from the fourth participants; and the second participant seeking revision from the first participant. When a participant seeks an action or gives an action in response to a seek action, the participant is not only acting on a particular request action, but also acting on behalf of the interaction management system to simulate a particular workflow sequence that can be universally deployed.

The interaction management system stores and distributes the captured workflow sequence to scale. In an embodiment, the interaction management system restricts the capture and deployment of the workflow sequence to an administrator or other authoritative entity. In an embodiment, the interaction management system assigns a unique identifier to each captured workflow sequence and stores the captured workflow sequence with the associated unique identifier in a database. In an embodiment, the interaction management system does not permit modification of the captured workflow sequence, thereby disallowing an abstract initiation of workflow sequences and ensuring a storage and a re-deployment of only workflow sequences that have undergone one or more verified rounds. The interaction management system captures intra-organizational workflow sequences and inter-organizational workflow sequences. The interaction management system allows dynamic generation of permission sets comprising permissible actions on the live document on the go and relays the permission sets forward in the workflow sequence in real time with anonymity-embedding. The interaction management system captures the shared sequence of actions, generalizes the sequence into a workflow sequence, and deploys the workflow sequence to scale. The interaction management system embedded in the document editor, therefore, allows anonymous sharing of a live document with a built-in approval management framework where a workflow sequence, once routed through, is captured as a formal scenario that is then deployable to scale and viewable on the display interface.

In the computer-implemented method disclosed herein, seeking an action of a particular type, for example, an input, an opinion, an approval, and an assistance, by a participant from another participant is independent of a role or designation of the other participant. In an embodiment, the interaction management system utilizes the underlying framework of codified decision rules to execute actions performed on the live document as a series of tasks, herein referred to as a taskset, independent of the roles of the participants. In an embodiment, the interaction management system automatically interprets directionality and implements direction mapping and sets a taskset to move along the same plane, from a left direction to a right direction, or from a right direction to a left direction, when a participant seeks a revision action, until the taskset reaches an intended closure. The interaction management system sets the taskset to move in an upward direction to a superior plane when a participant seeks an approval action. Correspondingly, the interaction management system sets the taskset to move in a downward direction to an inferior plane when a participant seeks an assistance action. In this embodiment, the interaction management system provides potential for a left-right movement within the superior plane or the inferior plane. The interaction management system extends a logic to move the taskset further in an upward direction or a downward direction. The taskset resolves or reaches its desired goal in the original middle plane. This embodiment of interpreting a taskset in directional terms abstracts the taskset and makes the taskset agnostic to actors, roles, and designations.

In the computer-implemented method disclosed herein, the request action-response action routine implemented by the interaction management system is native to the document editor. The interaction management system allows the participants to select the type of action and address the action to an appropriate participant and pass on the actions. The interaction management system views a live document as a process or a workflow sequence that is unfolding and records or captures the workflow sequence. In the above example, the interaction management system captures the workflow sequence as moving the live document in an upward direction first, in a downward direction next, back to the middle plane next, then in a right direction, then all the way in a left direction to the originator of the workflow sequence, then through the same way in the upward direction, etc., until completion. The interaction management system allows the first participant to assign a unique name to the captured workflow sequence, define the captured workflow sequence as applicable to a taskset that represents a standard operating procedure, and deploy the captured workflow sequence to a number of users. The interaction management system embedded in the document editor allows the capture of the workflow sequence by a nontechnical user from within a single document editor without dependencies on software or information technology (IT), entirely from the front-end, and natively, without the involvement of any external tool, thereby substantially reducing the time required to capture, store, and deploy a workflow sequence to a few minutes. In an embodiment, directionality of tasksets and their native implementation in the interaction management system universalizes a specific workflow sequence, thereby making the computer-implemented method disclosed herein role-agnostic. In the computer-implemented method disclosed herein, a designation is merely an alias and is no longer intrinsic to the program semantic. The universality is valid within the limitation that a workflow sequence has no more than one master approver. In an embodiment, the interaction management system allows re-deployment of previously coded workflow sequences. In an embodiment, the interaction management system provides directionality tags and a route map to task-segregated databases via integration mechanisms, for example, application programming interfaces (APIs). Furthermore, the interaction management system implements application integration to validate the workflow sequences from databases.

As disclosed above, the interaction management system automatically extracts a workflow sequence from a live document in real time. In the computer-implemented method disclosed herein, a seek action, for example, seeking an input, seeking an opinion, seeking an approval, or seeking an assistance denotes an inflection point. The workflow sequence is a collection of these inflection points, where the collection occurs in real time. As a participant triggers a seek action, the interaction management system simultaneously interprets and records the seek actions as workflow signals. The interaction management system automatically captures these workflow signals into a workflow sequence, generalizes the workflow sequence, and reruns the workflow sequence for similar use cases. In the computer-implemented method disclosed herein, there is no document flow, only a flow of actions. All the actions flow into the live document in a specified sequence, until the live document is published. The interaction management system provides an articulated framework of a finite set of request actions that anticipates infinite collaborative and sequencing potential. In an embodiment, when a participant invokes a request action from within the live document, the rules engine of the interaction management system activates or switches on the permission set dynamically generated for a target usage, for example, provide an input, an opinion, an approval, or an assistance. Each request action and response action effects a state change. The collection of all request actions in the order invoked constitutes the workflow sequence. The interaction management system recognizes the workflow sequence as complete when the request action type is "seek publication" derived from the "seek assistance" request action. The action of publishing doubles up as an action of capturing the workflow sequence where a user names, describes, and tags the workflow sequence. Once the live document is published and the workflow sequence is captured, the interaction management system stores the captured workflow sequence. In an embodiment, the interaction management system substitutes prior logins, that is, participants who logged into the document editor to perform an action, associated with the workflow sequence with new logins for each usage covered in the captured workflow sequence. Enumerated below are exemplary re-deployable workflow sequences captured by the interaction management system.

Example 1

Create document→Seek/Receive input from "n" participants→Seek/Receive approval→Seek/Receive (publication) assistance.

Example 2

Create document→Seek/Receive input from "n" participants→Seek/Receive approval→Seek/Receive (additional) approval→Seek/Receive (publication) assistance.

Example 3

Create document→Seek/Receive input from "n" participants→Seek/Receive approval→Forward for and Receive additional approval→Seek/Receive revision→Seek/Receive (publication) assistance

Example 4

Create document→Seek/Receive input from "n" participants→Seek/Receive approval→Seek/Receive opinion from "n" users under default conditions of anonymity-→Seek/Receive revision→Seek/Receive (publication) assistance.

Example 5

Create document→SeekReceive input from "n" participants→Seek/Receive approval→Seek/Receive opinion from "n" de-anonymized participants under conditions of selective anonymity→Seek/Receive revision→Seek/Receive (publication) assistance.

As disclosed in the examples above, the interaction management system permits parallel distribution of the request actions to many participants when the request action type is "seek input" or "seek opinion". In an embodiment, the interaction management system also permits parallel distribution of the request actions for the request action type "seek assistance". In an embodiment, the request action type "seek approval" is linear and the interaction management system distributes the "seek approval" request action to only one user at a time. When multiple participants are addressed to perform response actions as permitted in parallel distribution, the interaction management system captures the number of addressed participants. At deployment, the interaction management system renders this number as a variable that is editable. In an embodiment, the interaction management system does not capture a "seek revision" request action, but only provides for its potential to a participant who is in charge of approval. In an embodiment, the interaction management system captures the workflow sequence only from a real exchange between the participants. In the computer-implemented method disclosed herein, the capture of the workflow sequence by the interaction management system is contingent upon a prior simulation, and therefore, the interaction management system renders the captured workflow sequence as non-editable after the capture.

In an embodiment, the interaction management system prompts the participants to enter a response time via a calendar interface rendered by the interaction management system during the tracking of the actions performed along the interaction path of the live document in real time. To track the actions in time, the interaction management system prompts a calendar input in the form of a desired response time. The interaction management system generates and renders 106 a representation of the re-deployable workflow sequence on a display interface. In an embodiment, the interaction management system generates and renders a stepwise representation of the re-deployable workflow sequence on the display interface. In another embodiment, the interaction management system generates and renders a graphical representation of the re-deployable workflow sequence on the display interface. The interaction management system operably communicates with at least one database for storing the re-deployable workflow sequence. As disclosed above, the workflow sequence originates inside a live document. Therefore, at least one live document is always a part of a workflow sequence. In an embodiment, the interaction management system stores the live document as a document template with or without region controls. In this embodiment, the interaction management system delivers the document template along with the deployed workflow sequence for re-use. If the live document is not stored as a document template, the interaction management system delivers the workflow sequence with a blank document. In an embodiment, the interaction management system anchors participants in the simulation of the workflow sequence to an action they seek or provide. The interaction management system abstracts identities of the participants to User X, User Y, etc., which are replaceable with User A, User B, etc. At deployment, as many instances of the live document are produced as there are first participants that need to be inducted into the workflow sequence.

In an embodiment, the interaction management system continuously tracks and displays a status and a progress of the live document on a dashboard through the actionable element. The interaction management system provides awareness of the status of the live document with regard to the captured workflow sequence or a workflow sequence in progress. In cases where the live document follows a deployed workflow sequence, the interaction management system displays the status as 1 of n, 2 of n, etc., juxtaposed with participants that have partaken in prior stages of the interaction path, and participants queued up to partake in the upcoming stages of the interaction path. When the live document is not following a deployed workflow sequence, the interaction management system displays a view of the workflow sequence up to its current state, which can be invoked from the dashboard or by selecting a "View→Progress" option displayed on the display interface. In an embodiment, the interaction management system reflects each state by an appropriate watermark on the live document. The watermark is a hybrid expression of status and permissions. For example, the interaction management system represents the status of the live document as "review copy" to a reviewer to indicate "comment only"; "in review" to a submitter to indicate "view comment" and "respond"; "awaiting approval" or "read only" to all the participants other than the approver; "published" or "read only" to all; etc. The interaction management system also utilizes watermarks to reflect other states of the live document, for example, approved, rejected, etc., along with a number of comments pending a resolution. In the computer-implemented method disclosed herein, the interaction management system implements status marking or watermarking in combination with displaying the progress of the live document for providing a process-level awareness simultaneously with an awareness of the live document's present state.

The actionable element is configured to render the live document in a conference mode on the dashboard by integrating multiple communication components within the document editor in a single application environment. In an embodiment, the interaction management system creates the document in the conference mode by subsuming multiple communication components, for example, an in-built calendar, reminders, a mail composer, a notifications generator, message queueing, file exchange networks, attachments, communication tools for managing tasks, decisions, deadlines, attention, and recognition, and other file resources within the document editor and making them native. The interaction management system is based on a single application that executes a creative document collaboration and rules of collaboration. A live document created within the document editor embedded with the interaction management system is not moved to different locations and resides as a single actionable element, that is, as a single URL. The interaction management system sets up the URL to aggregate all actions. The aggregation renders the URL which embodies and represents the live document in a conference mode with its own calendar, status, progress, reminder, interaction statistics for comments and notifications, gateways to specific regions in the document, etc. The live document is status-aware. In this embodiment, the interaction management system implements the live document as its own dashboard.

In another embodiment, the interaction management system generates and renders a unified dashboard configured to chronologically display document information, the request actions, and the response actions on a priority basis on the display interface. The document information comprises, for example, a title, a participant identifier, a type of each of the request actions, a deadline for each of the response actions, number of comments that remain open for resolution, a word count, a potential involvement time based on the word count, total engagement based on prior involvement of time and resource, a duplicated document, a docket of a group of documents, etc. That is, the interaction management system generates and renders an enhanced dashboard of an action queue that juxtaposes multiple live documents or mini dashboards in a master dashboard. The unified dashboard displays, for example, documents pending with the user, documents pending with other users, private projects, published documents, etc. The interaction management system displays document thumbnails on the dashboard and embeds, for example, the title, a sender id, a requested action type, the deadline for the action requested, the number of comments that remain open for resolution, a word count, potential involvement time based on the word count, the total engagement based on a prior involvement of time and resource, and if the document is a single document, a duplicated document and/or a docket of a group of documents into the document thumbnails. This unified dashboard reduces the number of clicks and manoeuvres through multiple applications required to view the document information. In an embodiment, the interaction management system positions each document in an immediacy queue in the master or unified dashboard. The unified dashboard displays the queues to allow the participants to view documents that are pending with them, documents that are pending with others, and documents that are contained within private projects of the participants.

In an embodiment, each document thumbnail on the dashboard contains a clickable region that allows a participant to obtain and view a summary of comments pending resolution with a short-cut click to where each comment is anchored in the document. In the queue related to documents that are pending with others, each document thumbnail bears a click handle to create and schedule reminders for action. In an embodiment, the unified dashboard is configured to focus the attention of each of the participants. For example, the master or unified dashboard implements an inbox for notifications that is judiciously filtered to manage and focus a participant's attention or distraction. The unified dashboard is configured to focus the attention and attention span of an individual participant and a group of participants. Each notification contains a clickable handle for a direct entry into a project of its origin and its anchor within that project In an embodiment, the interaction management system generates task-justified dashboards, provides automated reminders for actions, and implements a calendar-driven interaction path.

As information and communication technology (ICT) environments adopted by knowledge enterprises create information overloads and demand multi-tasking from users, which requires substantial effort, the interaction management system implements a uni-tasked, serialized feeding of document information and status to engage users for their benefit and for the realization of organizational objectives. The interaction management system is a content nucleus that dashboards tasks or actions in a single view and in a way that focuses the attention of participants rather than dissipating their attention. In an embodiment, the interaction management system creates exceptions regarding notification, when a participant is awaiting approval. In an embodiment, the interaction management system calibrates document status broadcasts to be delivered to other programs via APIs.

In an embodiment, the interaction management system selectively displays comments in the live document to one or more of the other participants based on a type of each of the actions. For example, when the action type is "seek opinion", the interaction management system allows the participant to reveal or hide the identity of another participant from whom an opinion is sought, and his or her comments.

In an embodiment, the interaction management system distributes multiple controls on the regions of the live document in a suggest mode in a pre-publication stage of the live document and in a consumption mode in a post-publication stage of the document. The controls comprise, for example, a visibility control, an editability control, mandatory response options, and a word limit control in accordance with the editability control. The suggest mode is configured to allow fellow participants to modify the controls for an eventual input by other participants. The consumption mode is configured to allow subordinate participants to perform one of the response actions corresponding to one of the request actions within the confines of the set controls to enforce compliance. In an embodiment, the interaction management system implements native interaction control in a single application environment. Ahead of sharing, the interaction management system allows an intended participant to control every region of the live document, for example, every paragraph, for interaction. For example, the interaction management system, in communication with the document editor, allows an intended participant to render one or more paragraphs in a live document as editable or not editable, and if editable, control the scope and extent of editing such as assigning a word limit, control the nature of editing such as a freestyle interaction, a structured interaction, etc. The document editor treats forms and content interchangeably as both reside natively within a single application.

In another embodiment, the interaction management system determines and renders workflow sequences analogous to the re-deployable workflow sequence in communication with at least one database, for deployment by users. The interaction management system stores all captured workflow sequences in at least one database. To detect or recognize workflow sequence analogues in the database of captured workflow sequences, the interaction management system performs a structural interpretation to identify a relationship or a lack thereof between stored workflow sequences. At capture, the interaction management system allows a user to name, describe, and tag a workflow sequence for storage and search and/or retrieval. In an embodiment, upon search, the interaction management system scans and renders results at two levels. At a first level, the interaction management system renders results of semantic relevance to a search string entered by the user on the display interface. At a second level, the interaction management system renders similar and/or related results of structural affinity with the results obtained through the semantic relevance. The structural interpretation used for recognizing similar or analogous workflow sequences by the interaction management system reduces natural language processing and programming overheads incurred in de-noising and disambiguating the results that are rendered in a clutter, which is typical of storage and/or retrieval based on keywords and their synonyms. Even if a workflow sequence is unnamed, the interaction management system is capable of identifying the relationship among stored workflow sequences.

In an embodiment, the interaction management system performs data analytics for natively aggregating comparative intelligence between active workflow sequences. The interaction management system associates metrics, for example, how many users are using a particular workflow sequence, average time for publication, etc., with workflow sequences to aggregate the comparative intelligence. Consider an example of a workflow sequence A that a document undergoes after solitary creation. Workflow sequence A comprises (1) Seek input from one or more participants followed by (2) Seek approval from one participant, then (3) Seek (anonymous) opinion from one or more participants, initiated by the one giving the approval, and then (4) Give approval along with some comments to revise the content of the document, succeeded by (5) Seek publication from the author to a designated publisher, and culminating in (6) Publication of the document. The interaction management system records this workflow sequence A and makes the workflow sequence A reusable for any standard operating procedure that needs an analogous process.

Consider another workflow sequence B that varies from the workflow sequence A by a first action of "seek approval" followed by another action of "seek (further) approval". Workflow sequence B comprises seven steps instead of 6 steps as in the case of workflow sequence A, and hence workflow sequence B is not an analogue of workflow sequence A. On comparing workflow sequence A and workflow sequence B against each other, where workflow sequence A is prior to workflow sequence B, as the user captures the workflow sequence B, the interaction management system cannot show the user any precedence. However, if workflow sequence B happens to be identical in its flow in comparison to workflow sequence A, then the interaction management system indicates and identifies the precedence, for example, by name, type, description, ownership, history of its use, the statistics of its use, records of re-deployment, if any, etc. As the number of archived records of workflow sequences increases, the data for data analytics is further enhanced.

In an embodiment, the interaction management system allows users to enhance search-retrievability through naming, type-labelling, keyword/phrase-tagging, etc., of each workflow sequence. The interaction management system renders search results along with related results for every workflow sequence that is viewed up close. The interaction management system ensures the relevancy of the related results is unambiguous. Each search result displays usage information, for example, context, department, location, history, ownership, ideal suitability, etc., and statistics, for example, user base, popularity, re-use history, etc.

Every application that produces a digital asset, for example, a live document, is capable of producing a copy of the digital asset. Duplication results in a child file. In an embodiment, once a parent file produces a child file, the interaction management system makes the parent file read-only and freezes and preserves all history, edit tracks, and comments and their resolutions to a timestamp of creation of the child file. The child file is a clean copy, that is, a redacted version of the parent file with no history, no tracks, no comments, etc. The interaction management system implements this method when a document becomes crowded with too many tracks, or when a user wants to recover the document to a particular timestamp in its history, on the understanding that the document was previously in a better condition. In an embodiment, the interaction management system pairs the parent and child files of the live document together on the dashboard for viewing by the user.

In an embodiment, the interaction management system aggregates and renders all actions in an artificial intelligence (AI)/machine learning (ML)-driven contribution summary, also referred to as a "recognition summary". In an embodiment, the interaction management system automatically generates a contribution summary by performing data analytics on quantitative contributions by the participants, for example, time spent, bytes entered, response time, assets brought in, types of participation, etc., that are deduced and summarized. In an embodiment, the contribution summary is user-editable. The interaction management system tracks the editing performed on the contribution summary. The interaction management system aggregates and records a participant's contribution to a collective effort, that is, the document. In an embodiment, the interaction management system displays the contribution summary on a user's profile page, if any. In an embodiment, the interaction management system implements a rating system that allows workgroup inputs, graded and/or descriptive, to enhance the contribution summary. Graded inputs feature a rating mechanism for attributes such as originality, influence on the group, influence on the outcome, or a star rating. The interaction management system generates a rating for influence, responsiveness, impact, and other expressions of peer group validation. Beyond standard metrics such as time given and bytes produced, the interaction management system declares the given inputs, opinions, approvals, and assistance, and anchors individual contributions to respective timestamps and location coordinates in the live document. In an embodiment, the interaction management system communicates with an enterprise resource profile database for storing the contribution summary to reflect recognition and appreciation, which allows expertise-tagged, contribution-based resource profiling for availability recommendations. Consider an example where a user introduces an asset, for example, an image or a document into a project. When such an asset or an excerpt from the asset is found in the current project, the interaction management system automatically cites a source of the asset. The interaction management system contribution-tags the excerpt, for example, a phrase and/or a sentence, that is found copy-pasted into the current project, in the source. When the excerpt is modified in the current project, the nature of the relationship between the source and its quotation is no longer straightforward. The interaction management system employs sense-comparing natural language processing (NLP) algorithms to deduce the nature of the relationship, that is, sense changed or sense retained, and counts or discounts the contribution. For example, if the sense of the content between copies of a document/excerpt is retained between the copies, the interaction management system accounts for a positive contribution; and if the sense of the content changes substantially between the copies, the interaction management system accounts for a neutral contribution.

In an embodiment, the interaction management system is implemented as a knowledge management platform. In addition to storing content to metadata standards intended to enhance discoverability, the interaction management system archives the collaborative workflow sequences. In an embodiment, the interaction management system integrates multiple publication gateways within the document editor for publishing the live document. The publication gateways comprise, for example, a template center, a quarantined private archive, a public network, and a private network.

The interaction management system delivers content to channels that involve, for example, the public, employees of an enterprise, a workgroup, and process owners via the publication gateways, that is, the internet, an intranet, private archives, and a template center respectively. In an embodiment, the interaction management system delivers full text with or without commenting to the public via the internet. In another embodiment, the interaction management system delivers full text with or without commenting and a title and excerpt only with a permission request for access to the full text to the employees via the intranet. In another embodiment, the interaction management system delivers content to the workgroup via private archives. In another embodiment, the interaction management system delivers content to the process owners via the template center for use by the rest of the enterprise. In another embodiment, the interaction management system allows each publishing event to trigger a set of broadcast events, for example, tweets, posts, electronic mail (email), etc. The interaction management system allows information to be radiated from a single point, that is, from within the document editor in a single application environment.

The automatic capture of a re-deployable workflow sequence by the interaction management system embedded in the document editor allows for creation of multiple applications. For example, in an academic environment, a doctoral degree or Doctor of Philosophy (PhD) student works with a guide and submits a thesis. The dean receives and allocates the thesis to a committee of anonymous reviewers. In this example, the interaction management system is implemented as a thesis management system that automatically captures the workflow sequence and allows re-deployment of the workflow sequence to multiple PhD students. The captured workflow sequence is then re-deployable by other students in one go. In another example, in an academic environment, an instructor sets a lesson plan with a question and answer (Q & A) assignment. The instructor distributes the assignment to students or assistants. The students complete and submit the assignment. The instructor assesses the completed assignment and publishes results. In this example, the interaction management system is implemented as an assignment management system that automatically captures the workflow sequence and allows re-deployment of the workflow sequence to multiple instructors.

In another example, in an academic publishing context, an author submits a paper to a journal. A chief editor receives the submission of the paper. The chief editor delegates the submission to a corresponding editor. The corresponding editor seeks a blind peer review from assistants. The corresponding editor intervenes and seeks a revision from the author, until the submission is approved or rejected. In this example, the interaction management system is implemented as an end-to-end publishing pipeline that automatically captures the workflow sequence and allows re-deployment of the workflow sequence to multiple authors. This implementation of the interaction management system is applicable to other publishing processes, for example, book publishing, magazine publishing, daily press publishing, etc. In another example, in a banking and finance environment, a clerk creates a loan application on behalf of a customer. A compliance team member or assistant checks and iterates the loan application. The compliance team member forwards the loan application for approval to an authority. In the finance environment, this sequence is referred to as maker-checker-approver. In this example, the interaction management system is implemented as a financial instrument processing system that automatically captures the workflow sequence and allows re-deployment of the workflow sequence to multiple clerks.

In another example, in a healthcare environment comprising at least three departments, for example, hospital management, general practice, and a specialty department such as oncology or cardiology, each department would have its own actor-authority-assistant combinations. The hospital management department synthesizes a discharge summary, which in turn, has its own actor-authority-assistant combination. In this example, the interaction management system is implemented as a discharge summary management system that allows configuration of the micro-processes and the macro process of the departments as a sequence of workflows. In another example, in a human resources (HR) department, the interaction management system is implemented as a job application management system that allows an applicant to create an application and submit the application to an HR executive, who then invites an opinion from department heads, that is, assistants, before an applicant is rejected or accepted. Inviting an opinion from department heads leads to a subsequent process which in turn can be sequenced as an independent process and interlinked to the former process of reviewing the application submitted by the applicant.

FIGS. 2-4 illustrate flow diagrams showing different workflow sequences, according to an embodiment herein. In an embodiment, the interaction management system 201 embedded in a browser-based word-form-data processing platform, for example, a document editor such as a rich text editor, advances permission-embedding by natively enabling a set of functionalities that allow a user to seek, in addition to read, review, and write actions, approval. Users login to the document editor, create live documents, seek actions and decisions over the live documents created, provide decisions and response actions, and seek next steps using the embedded interaction management system 201. In an embodiment, the actions occur over a purpose-generated uniform resource locator (URL) in a representational state transfer (REST) mechanism, for example, a RESTful cloud. The URL aggregates and encodes all actions and decisions in a scripted hypertext markup language 5 (HTML5) document type (Doctype) declaration. The interaction management system 201 links the live documents in the HTML5 Doctype declaration to databases, application programming interfaces (APIs), and other resources; generates a permission set comprising permissible actions allowed on the live documents, the comments entered in the live documents, and the regions within the live documents; and verifies and secures the URL for continued interaction as a single instance of a browser application in real time. The interaction management system 201 maps decision rules to the actions, captures the decision maps, and stores the decision maps in at least one database, creating a single instance for every unit record in the database in minimal runtime.

The interaction management system 201 generates the workflow sequence in real time. When a user seeks an input, then an opinion, followed by an approval, followed by a transfer of an approval, and then onto final action post revisions, the interaction management system 201 captures the workflow sequence. For example, the interaction management system 201 captures the following workflow sequence illustrated in FIG. 2: For a marketing communications blogpost, the interaction management system 201 seeks input from a writer 202; the writer 202 seeks approval from a marketing head 203; the marketing head 203 seeks and receives assistance from a public relations (PR) agency 204; the marketing head 203 seeks revision from the writer 202; the writer 202 seeks approval on the revision from the marketing head 203; and if approved, the marketing head 203 seeks publication from a publisher 205.

In another example, the interaction management system 201 captures the following workflow sequence illustrated in FIG. 3: For a job application process, the interaction management system 201 provide a link with a job application to an applicant 301 and seeks input from the applicant 301; the applicant 301 submits the job application and seeks approval from a human resources (HR) executive 302; the HR executive 302 seeks and receives additional approval from a finance manager (FM) 303; the HR executive 302 seeks input from the applicant 301; the applicant 301 seeks approval from the HR executive 302; and if approved, the HR executive 302 seeks publication from a publisher 304, for example, by issuing an offer letter to the applicant 301.

In another example, the interaction management system 201 captures the following workflow sequence illustrated in FIG. 4: For thesis management, a PhD candidate 401 seeks and receives input from a guide 402; the candidate 401 then seeks approval from a dean 403; the dean 403 allocates the candidate's 401 thesis to a committee of examiners 404 and seeks and receives opinions anonymously from the examiners 404; the dean 403 moderates the reviews from the examiners 404 and seeks a revision of the thesis from the candidate 401; the candidate 401 revises and seeks approval on the thesis from the dean 403 who may approve, reject or send the thesis for further review; and if approved, the dean 403 seeks publication of the thesis from a publisher 405.

Figure 5:
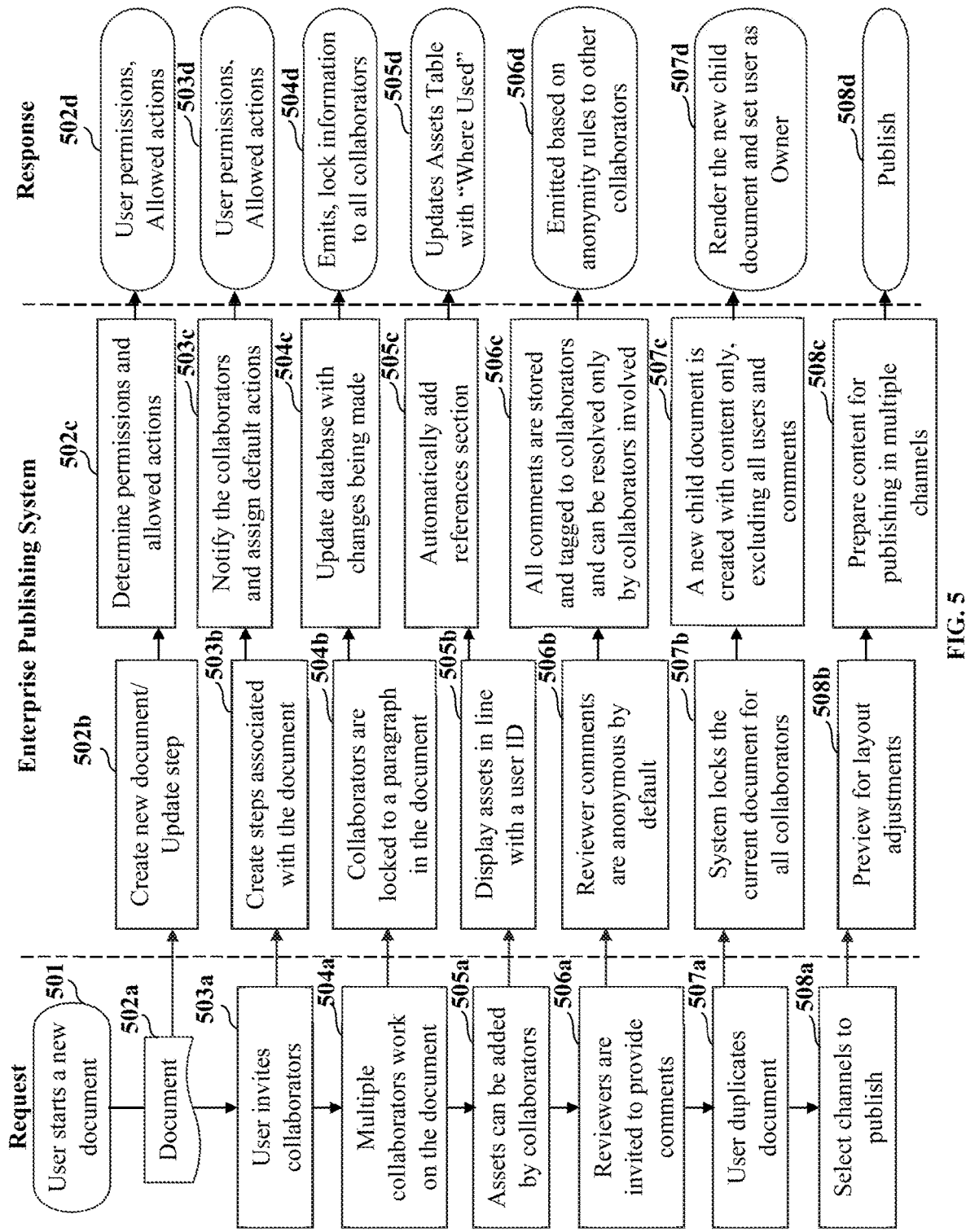
FIG. 5 illustrates a high-level flowchart comprising the steps executed by an interaction management system for managing interactions from a live document, according to an embodiment herein.

FIG. 5 illustrates a high-level flowchart comprising the steps executed by the interaction management system for managing interactions from a live document, according to an embodiment herein. The document editor embedded with the interaction management system is implemented in an enterprise publishing system as illustrated in FIG. 5. Consider an example where a user logs into the enterprise publishing system and starts 501 a new document 502*a*. The interaction management system allows the user to create 502*b* a new document and updates the step of creating the new document in a database table, for example, a Step table as disclosed below. The interaction management system also determines 502*c* permissions for generation of the permission set, determines allowed actions associated with the step of creating the document, and responds 502*d* with the user's permissions and allowed actions. The permission set comprises permissible actions, for example, edit, comment, etc., allowed on the document, the comments within the document, and regions within the document. The allowed actions comprise, for example, seeking an input, seeking an opinion, seeking an approval, seeking an assistance, and seeking a revision. The user then invites 503*a* collaborators to work on the document. The interaction management system creates 503*b* steps associated with the allowed actions in the document. The interaction management system notifies 503*c* the collaborators and provides access of the document and handles configured to invoke the request actions and the response actions to each of the collaborators. The interaction management system also assigns default actions to the collaborators and responds 503*d* with the permissions and allowed actions.

The collaborators work 504*a* on the document with their assigned permissions and allowed actions and are locked 504*b* to their respective paragraphs within the document. The interaction management system updates 504*c* a database with the changes being made to the document. The interaction management system emits or transmits 504*d* lock information to the collaborators. The interaction management system allows the collaborators to add 505*a* one or more assets to the document. The interaction management system displays 505*b* the assets in the document in line with a user identifier of the collaborator who added the assets. The interaction management system automatically adds 505*c* a references section in the document and updates 505*d* an assets table with locations of the document where the assets are used.

The interaction management system allows the user and/or the collaborators to invite 506*a* reviewers to provide comments. The interaction management system anonymizes 506*b* the reviewers and their comments by default. The interaction management system stores and tags 506*c* all comments to particular collaborators. The interaction management system allows only the particular collaborators to resolve the comments. The interaction management system emits or transmits 506*d* the comments to other collaborators based on the anonymity requirement or rules.

The permitted user duplicates 507*a* a parent document by making a copy of the parent document. On duplicating the parent document, the interaction management system locks 507*b* the parent document for all collaborators and creates 507*c* a new child document with content only, excluding all deletions and comments, hitherto available only in the parent document. The interaction management system then renders 507*d* the new child document to the user and sets the user as an owner of the document. The user may then proceed to select 508*a* channels for publishing the document. The interaction management system allows the user to compose a document in a single universal or target-neutral style and then preview the document through a preview function and adjust the previewed content to a style that automatically transforms and approximates to a house style. The interaction management system renders a preview 508*b* for layout adjustments, prepares 508*c* the content for publishing in multiple channels, and proceeds to publish 508*d* the document. In an embodiment, through a smart transformation, the preview function leads the user from the target-neutral style to a house style that represents a pre-calibrated stylesheet with rendering criteria for print or screen usage, covering paper-sized pagination, and in the latter case, previews for a host of user devices such as desktop computers, laptops, tablets, and smart phones on multiple browsers and operating systems. In an embodiment, previews thus rendered for print usage with pagination contains handles to adjust the positions of the elements of the document for a content flow that the user intends. In an embodiment, the interaction management system allows for an export of the previews, for example, in a docx format, a portable document format (PDF), a JavaScript Object Notation (JSON) file format, or a hypertext markup language (HTML) format. In an embodiment, in an export scenario, the interaction management system delivers a dataset to a permitted storage destination.

Figure 6A:
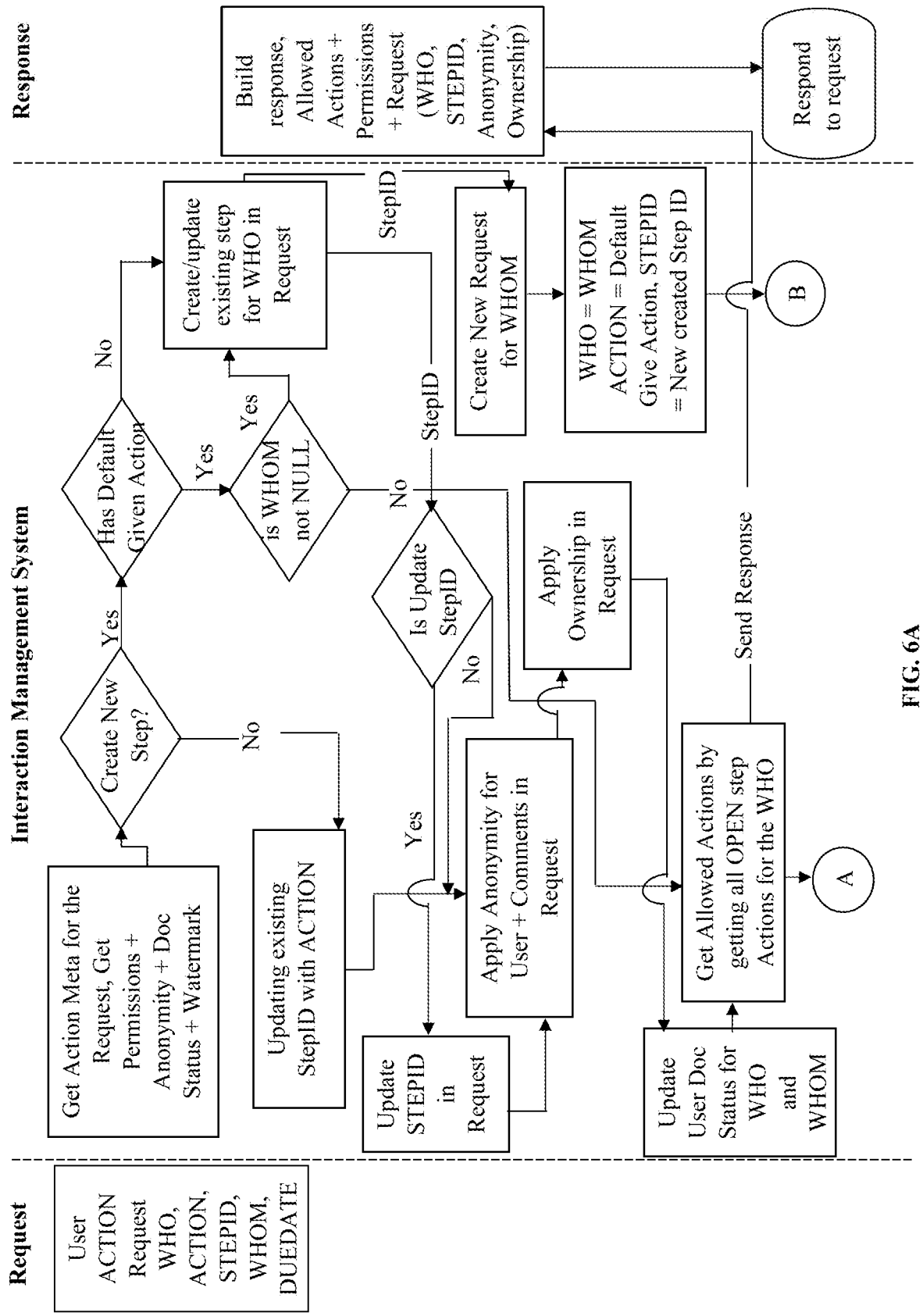
FIGS. 6A-6B illustrate a representation of an algorithm comprising the steps executed by the interaction management system for managing interactions associated with any request action and automatically sequencing a workflow from a live document in real time, according to an embodiment herein.
Figure 6B:
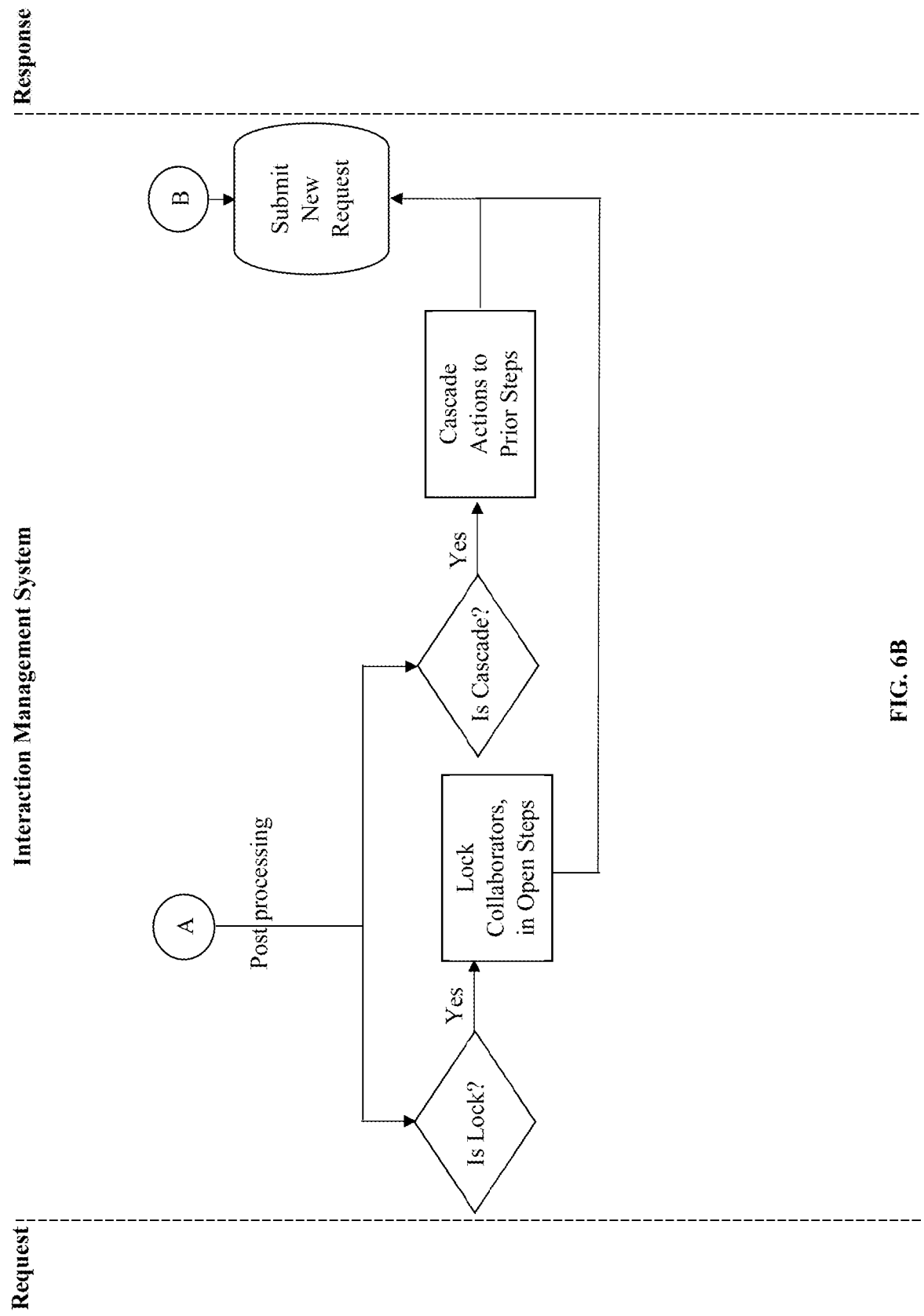

FIGS. 6A-6B illustrate a representation of an algorithm comprising the steps executed by the interaction management system for managing interactions associated with any request action and automatically sequencing a workflow from a live document in real time, according to an embodiment herein. When a user initiates a request action or a seek action, the interaction management system receives metadata of the action, for example, identifiers (IDs) of the user who initiated the request action and the user from whom a response action is requested. The interaction management system also generates the permission set and determines the anonymity requirement as disclosed in the detailed description of FIG. 1. The algorithm executed by the interaction management system and represented by the flowchart illustrated in FIGS. 6A-6B is disclosed below:

Request from the Front End Contains the Following Fields: {WHO: <UserID> (Not Nullable), DOCID: (can be Null), STEPID: (can be Null), ACTION: (not Nullable), WHOM: (can be Null), DUEDATE: (Can be Null), IsANONYMOUS: false by default}

The interaction management system is configured to execute the same set of processing steps for any request action. The processing steps executed by the interaction management system are disclosed below:

1) For all request actions, the Action attributes stored in an Action_Meta table determine whether a new workflow step needs to be created along with any required pre- and post-processing for the Action in the request.
2) For all request actions, the response structure is the same. The response includes the request with updates, along with the user permissions on the document, further allowed actions a user can take, and anonymity conditions.
3) A request with no Document ID or Document Template ID results in creation of a new workflow sequence. A request with a Document Template ID but no Document ID results in a new document following the previously saved workflow sequence.
4) For some of the request actions, there is pre-action step processing or post action step processing. Such rules are codified in the Action_Meta Table.
5) A request action determines whether a new workflow step needs to be created as per Action attributes in the Action_Meta table. Before creating a new workflow step, any pre-processing required for the action is carried out. When a new workflow step is created, as part of post-processing, an invited user's initial actions are assigned. If an invited user is anonymous based on the request action, an anonymity condition is also set. As per the post-processing attributes, if the action requires cascading to prior workflow steps, a new request is formed internally for the prior workflow step, which goes through all the listed processing steps.
6) While processing the request action, the workflow step status is also updated based on the Action attribute in the Action_Meta table. The request action is also updated with the workflow step if the request action is dictated by the Action attribute from the Action_Meta table.
7) All the actions from the open workflow steps as well as the next workflow step in case a workflow is being followed are used to determine the list of allowed actions the user can take. The open workflow steps also determine the permission the user has on the document. The users who are anonymous for this user are also added to the response such that the users can be suppressed and masked, if needed.
8) Thus, based on the Action attributes in the Action_Meta table and the users' open workflow steps and an Allowed_Actions table, the user's permissions on the document and the next allowed action as well as anonymity is controlled.
9) Further with the Action_Meta table, more actions for example, allowing only partial edits in some portions of the document are also added by using a combination of content-level locking in the document and a mention of a User ID.

Figure 7:
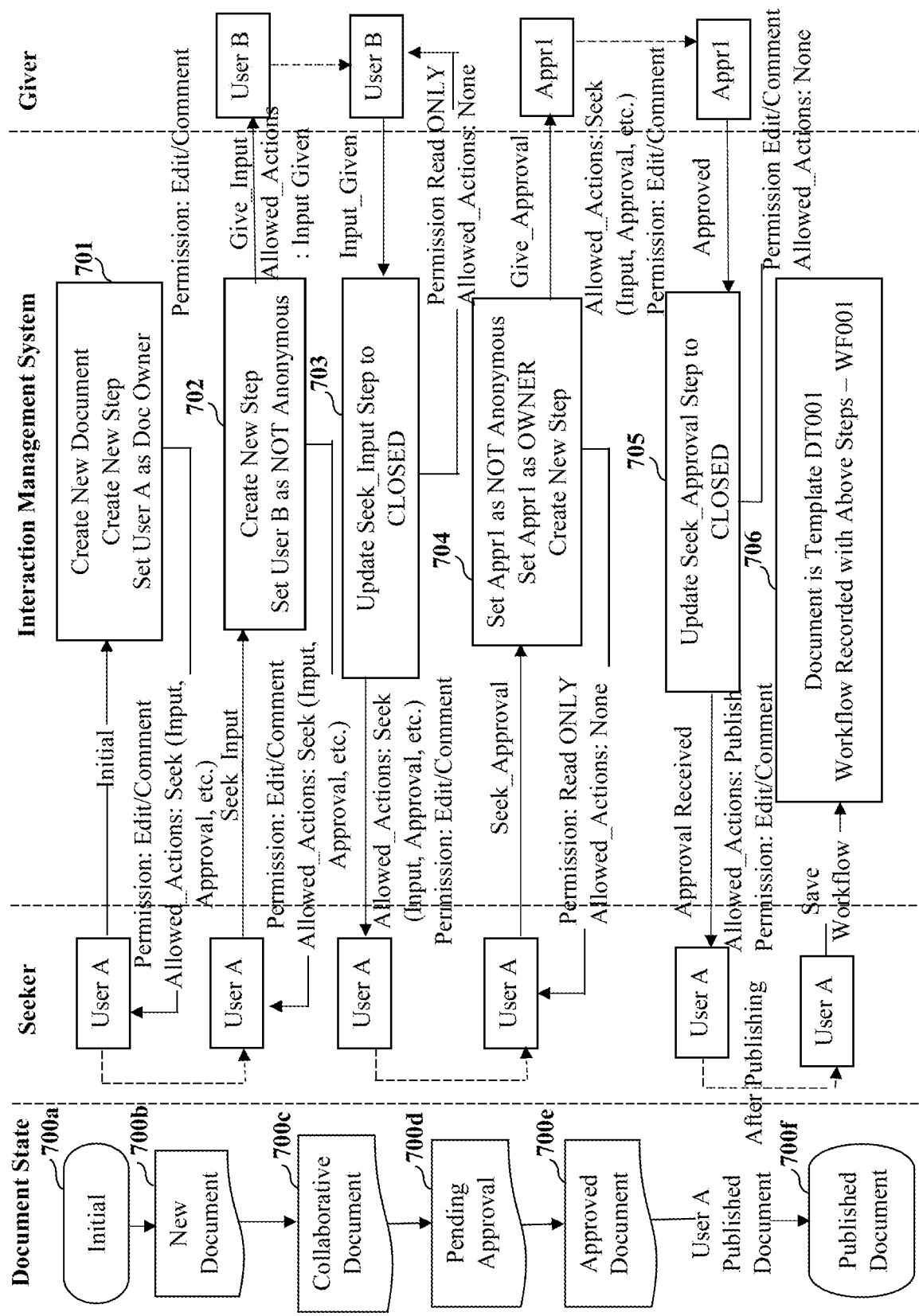
FIG. 7 illustrates a flowchart comprising the steps executed by the interaction management system for automatically simulating and sequencing a workflow involving one collaborator and one approver from a live document in real time, according to an embodiment herein.

FIG. 7 illustrates a flowchart comprising the steps executed by the interaction management system for automatically simulating and sequencing a workflow involving one collaborator and one approver from a live document in real time, according to an embodiment herein. Consider an example where the interaction management system simulates a workflow WF001 from a live document with one collaborator and one approver. In this example, User A is a seeker who seeks actions from givers, for example, a collaborator User B and an approver Appr1. In the initial state 700a of the live document, the interaction management system creates 701 a new document 700b, creates a new step for capturing a workflow sequence, and sets User A as an owner of the document. Based on the codified decision rules, the interaction management system retrieves and displays the request actions, for example, seek input, seek approval, etc., on a display interface in the document editor for selection by User A. The interaction management system also generates and executes a permission set comprising permissible actions, for example, edit and comment, for User A. After creating the new document, when User A selects a "seek input" option from the display interface to seek input from User B, the interaction management system creates 702 a new step for capturing a workflow sequence and sets User B as not anonymous.

When User A seeks an input from User B, the interaction management system transforms the new document 700b into a collaborative document 700c. In this document state, User A has the same permissible actions, for example, edit and comment, and is allowed request actions, for example, seek input, seek approval, etc. The interaction management system generates and executes a permission set comprising permissible actions, for example, edit and comment, for User B. The interaction management system allows User B to perform only a complete input action in the form of "input given". When User B provides or gives input on the collaborative document, the interaction management system updates 703 the "seek input" step to "closed" in the database and generates a new permission set comprising a permissible action, for example, a read only action for User B. The interaction management system does not permit User B to perform further actions on the collaborative document. At this step, User A has the same permissible actions and allowed actions as per the prior open step.

User A then selects a "seek approval" option from the display interface to seek approval from the approver Appr1. The interaction management system sets 704 Appr1 as not anonymous, sets Appr1 as an owner of the document, and creates a new step for capturing the workflow sequence. In this "pending approval" document state 700d, the interaction management system generates and executes a permission set comprising a permissible action, for example, a read only, for User A. In this example, the interaction management system does not permit User A to perform further actions based on the codified decision rules. The interaction management system generates and executes a permission set comprising permissible actions, for example, edit and comment, for Appr1. The interaction management system further allows Appr1 to perform actions, for example, seek input, seek approval, etc. When Appr1 gives approval on the collaborative document, the interaction management system updates 705 the "seek approval" step to "closed" in the database and generates a new permission set comprising permissible actions, for example, edit and comment, for Appr1. In this "approved document" state 700e, the interaction management system does not permit Appr1 to perform further actions on the document. Moreover, the interaction management system generates a permission set comprising permissible actions, for example, edit and comment, for User A, and allows User A to perform a publish action. When User A performs a publish action from the document editor, the interaction management system publishes the document to enter a "published document" state 700f, automatically captures the workflow sequence, and allows User A to name and save the workflow sequence in a database and add more users. The interaction management system templates 706 the published document as DT001 and stores the workflow sequence WF001 in a database. The captured workflow sequence comprises the steps of seek input—give input→seek approval—give approval→publish.

Figure 8:
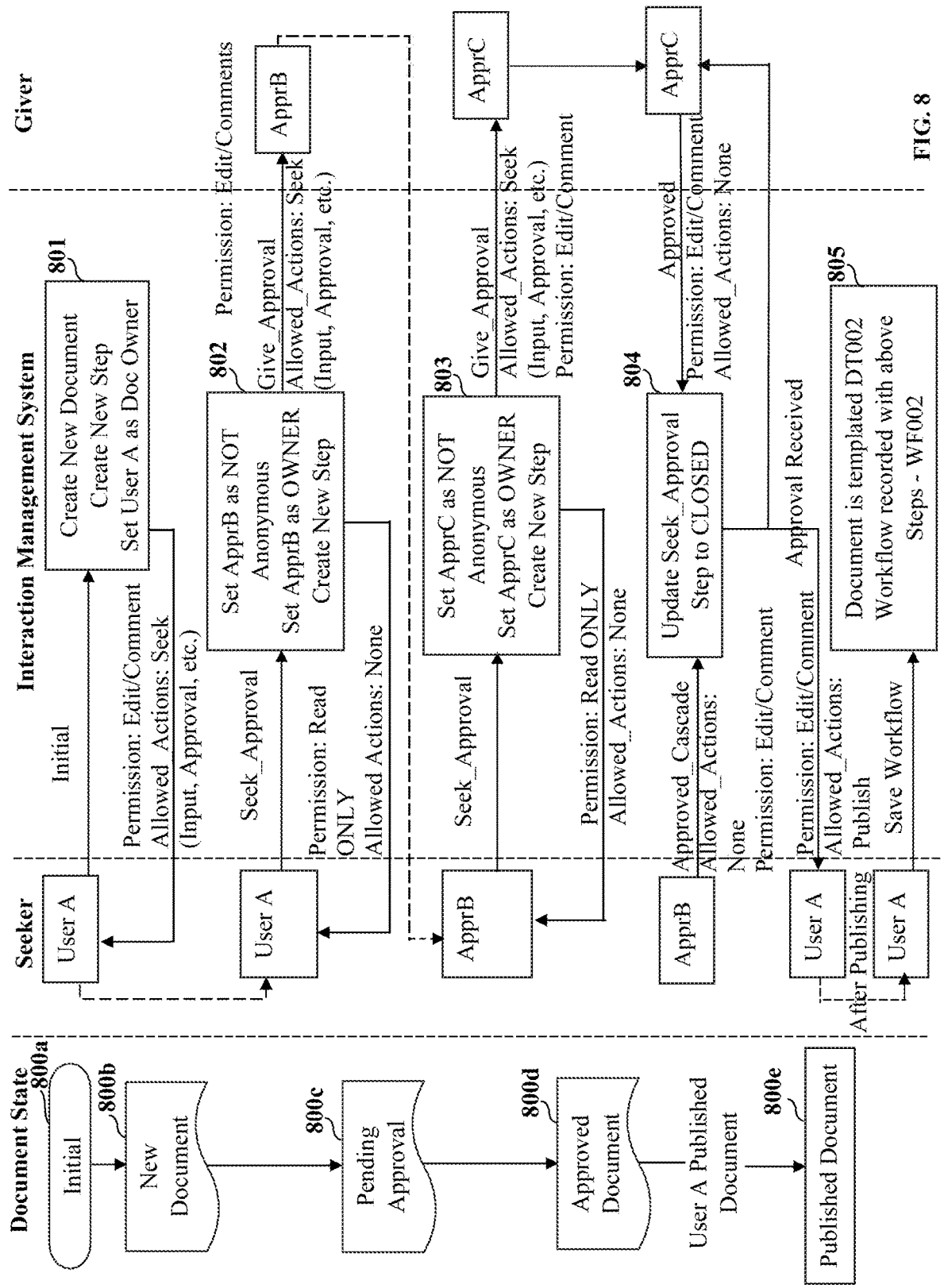
FIG. 8 illustrates a flowchart comprising the steps executed by the interaction management system for automatically simulating and sequencing a workflow involving two approvers from a live document in real time, according to an embodiment herein.

FIG. 8 illustrates a flowchart comprising the steps executed by the interaction management system for automatically simulating and sequencing a workflow involving two approvers from a live document in real time, according to an embodiment herein. Consider an example where the interaction management system simulates a workflow WF002 from a live document with two approvers. In this example, User A is a seeker who seeks actions from givers, for example, approvers ApprB and ApprC. In the initial state 800a of the live document, the interaction management system creates 801 a new document 800b, creates a new step for capturing a workflow sequence, and sets User A as an owner of the document. Based on the codified decision rules, the interaction management system retrieves and displays the request actions, for example, seek input, seek approval, etc., on a display interface in the document editor for selection by User A. The interaction management system also generates and executes a permission set comprising permissible actions, for example, edit and comment, for User A. After creating the new document, when User A selects a "seek approval" option from the display interface to seek approval from ApprB, the interaction management system sets 802 ApprB as not anonymous, sets ApprB as the owner of the document, and creates a new step for capturing the workflow sequence. In this "pending approval" document state 800c, the interaction management system generates and executes a permission set comprising a permissible action, for example, a read only action, for User A and does not permit User A to perform further actions. The interaction management system generates and executes a permission set comprising permissible actions, for example, edit and comment, for ApprB. The interaction management system also allows ApprB to perform seek actions, for example, seek input, seek approval, etc. In this example, when ApprB selects a "seek approval" option from the display interface to seek approval from ApprC, the interaction management system sets 803 ApprC as not anonymous, sets ApprC as the owner of the document, and creates a new step for capturing a workflow sequence. In this "pending approval" document state 800c, the interaction management system generates and executes a permission set comprising a permissible action, for example, a read only action, for ApprB and does not permit ApprB to perform further actions.

When ApprC provides or gives approval, the interaction management system updates 804 the existing "seek approval" step to "approved" and "closed" in the database, sets an action field for ApprB as "Approved_Cascade", and sets an action field for User A as "approval received" in the database. In this document state, ApprC has the same permissible actions, for example, edit and comment, but the interaction management system does not permit ApprC to perform further actions. Furthermore, in this "approved document" state 800d, ApprB has the permissible actions, for example, edit and comment, but no further actions. Furthermore, in this document state, User A has the permissible actions, for example, edit and comment, and the interaction management system permits User A to perform a publish action. When User A performs the publish action from the document editor, the interaction management system publishes the document to enter a "published document" state 800e, automatically captures the workflow sequence, and allows User A to name and save the workflow sequence in a database and add more users. The interaction management system templates 805 the published document as DT002 and stores the workflow sequence WF002 in a database. The captured workflow sequence comprises the steps of seek approval→seek a further approval—give approval followed by a cascading approval from a first approver→publish.

Figure 9:
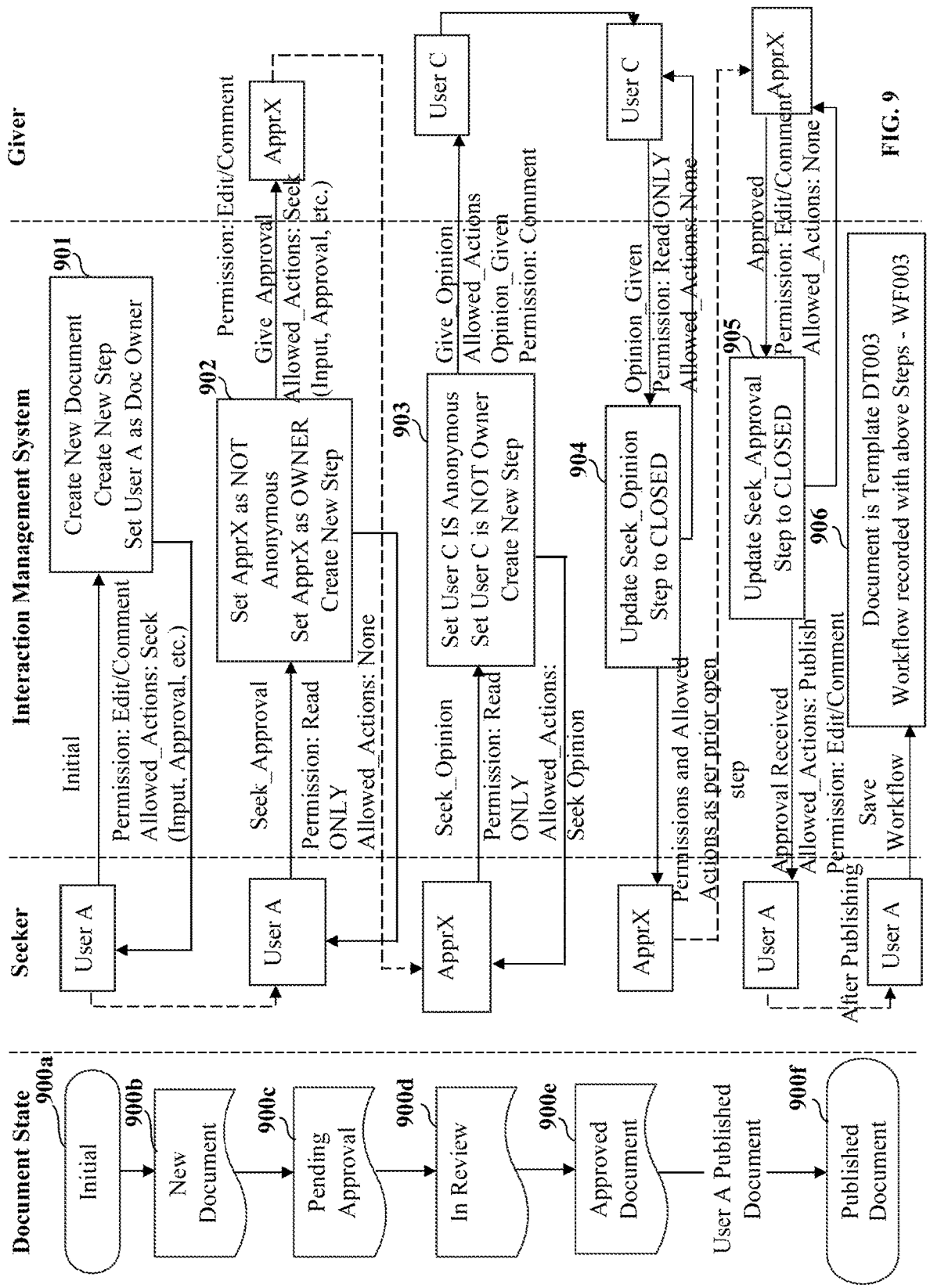
FIG. 9 illustrates a flowchart comprising the steps executed by the interaction management system for automatically simulating and sequencing a workflow involving one approver and one reviewer from a live document in real time, according to an embodiment herein.

FIG. 9 illustrates a flowchart comprising the steps executed by the interaction management system for automatically simulating and sequencing a workflow involving one approver and one reviewer from a live document in real time, according to an embodiment herein. Consider an example where the interaction management system simulates a workflow WF003 from a live document with one approver and one reviewer. In this example, User A is a seeker who seeks actions from givers, for example, an approver ApprX and a reviewer User C. In the initial state 900a of the live document, the interaction management system creates 901 a new document 900b, creates a new step for capturing a workflow sequence, and sets User A as an owner of the document. Based on the codified decision rules, the interaction management system retrieves and displays the request actions, for example, seek input, seek approval, etc., on a display interface in the document editor for selection by User A. The interaction management system also generates and executes a permission set comprising permissible actions, for example, edit and comment, for User A. After creating the new document, when User A selects a "seek approval" option from the display interface to seek approval from ApprX, the interaction management system sets 902 ApprX as not anonymous, sets ApprX as the owner of the document, and creates a new step for capturing the workflow sequence. In this "pending approval" document state 900c, the interaction management system generates and executes a permission set comprising a permissible action, for example, a read only action, for User A and does not permit User A to perform further actions. The interaction management system generates and executes a permission set comprising permissible actions, for example, edit and comment, for ApprX. The interaction management system also allows ApprX to perform actions, for example, seek input, seek approval, etc.

When ApprX seeks an opinion from User C, the interaction management system sets 903 User C as anonymous, sets User C as not an owner of the document, and creates a new step for capturing a workflow sequence. In this "in review" document state 900d, the interaction management system generates a new permission set comprising a permissible action, for example, a read only action for ApprX and allows ApprX to perform only a seek opinion action. The interaction management system generates and executes a permission set comprising a permissible action, for example, comment only for User C and permits User C to perform only a complete opinion action in the form of "opinion given". User C and User A are mutually anonymous. When User C provides or gives an opinion on the document, the interaction management system updates 904 the "seek opinion" step to "closed" in the database and generates a new permission set comprising a permissible action, for example, a read only action for User C. The interaction management system also does not permit User C to perform further actions. At this step, ApprX has the same permissible actions based on a prior open step, that is, edit or comment on the document, and had allowed actions of seek input, seek opinion, seek assistance, approve, etc. When ApprX gives approval on the document, the interaction management system updates 905 the "seek approval" step to "closed" in the database and sets an action field for User A as "approval received" in the database. In this "approved document" state 900e, the interaction management system generates a permission set comprising permissible actions, for example, edit and comment, for ApprX, but does not permit ApprX to perform further actions. The interaction management system generates a new permission set comprising permissible actions, for example, edit and comment, for User A and allows User A to perform a publish action. When User A performs a publish action from the document editor, the interaction management system publishes the document to enter a "published document" state 900f, automatically captures the workflow sequence, and allows User A to name and save the workflow sequence in a database and add more users. The interaction management system templates 906 the published document as DT003 and stores the workflow sequence WF003 in a database. The captured workflow sequence comprises the steps of seek approval→seek opinion—give opinion→give approval for the open seek approval→publish.

Figure 10:
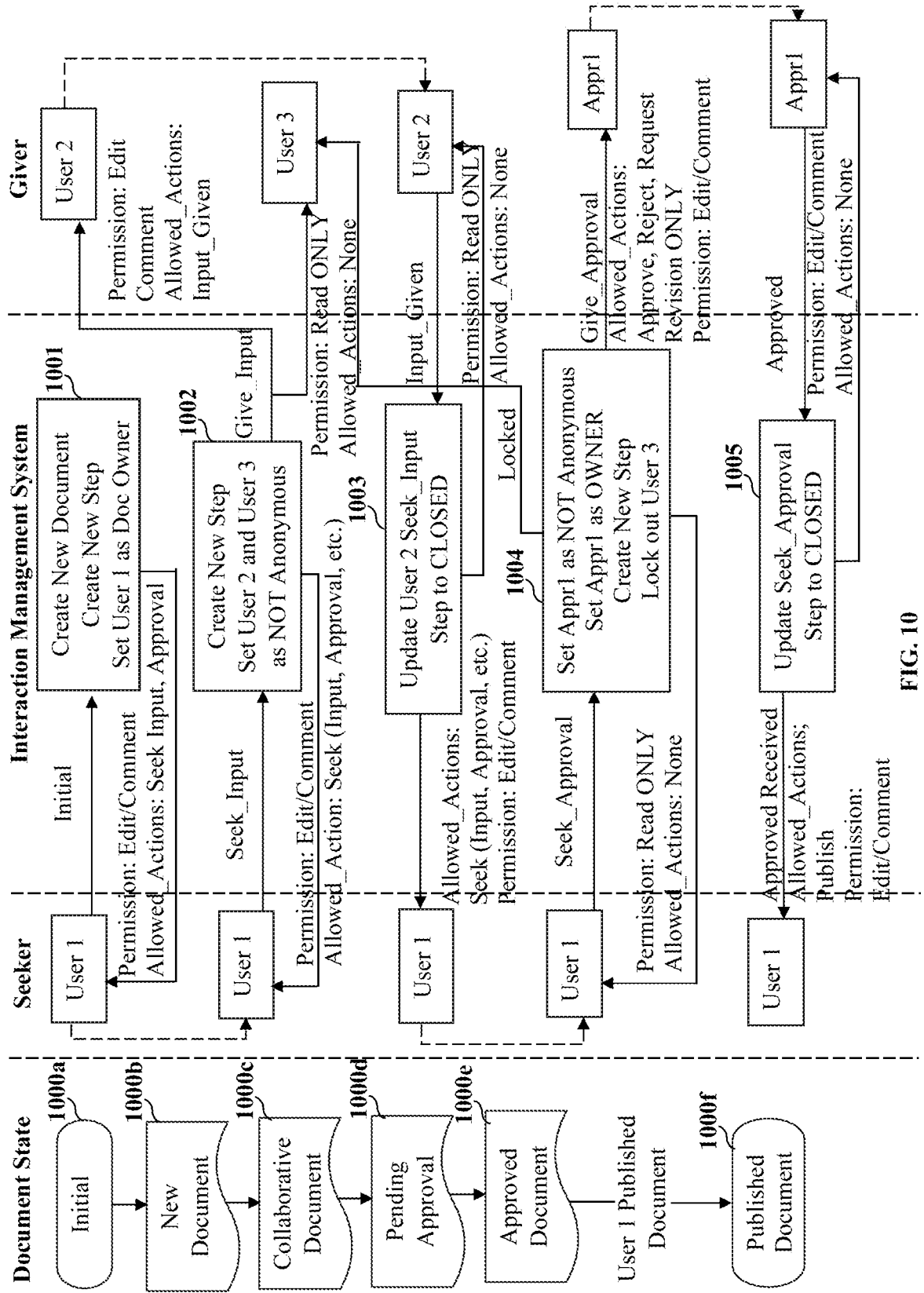
FIG. 10 illustrates a flowchart comprising the steps of following the workflow sequence simulated in FIG. 7, according to an embodiment herein.

FIG. 10 illustrates a flowchart comprising the steps of following the workflow sequence WF001 simulated in FIG. 7, according to an embodiment herein. Consider an example where a user wishes to follow the workflow sequence WF001 from a document template DT001 generated and stored in the database by the interaction management system. In this example, User 1 is a seeker who seeks actions from givers, for example, collaborators User 2 and User 3 and an approver Appr1. In the initial state 1000a of the live document, the interaction management system creates 1001 a new document 1000b from DT001, creates a new step, and sets User 1 as an owner of the document. Based on the codified decision rules, the interaction management system retrieves and displays the request actions, for example, seek input and seek approval as the only allowed actions as per the stored workflow sequence WF001 on a display interface in the document editor for selection by User 1. The interaction management system also generates and executes a permission set comprising permissible actions, for example, edit and comment, for User 1. After creating the new document, when User 1 selects a "seek input" option from the display interface to seek input from two collaborators User 2 and User 3, the interaction management system creates 1002 a new step and sets User 2 and User 3 as not anonymous. In an embodiment, the interaction management system does not restrict the number of users from whom a user can seek input.

When User 1 seeks input from User 2 and User 3, the interaction management system transforms the new document 1000b into a collaborative document 1000c. In this document state, User 1 has the same permissible actions, for example, edit and comment, and is allowed seek input and seek approval actions only. The interaction management system generates and executes a permission set comprising permissible actions, for example, edit and comment for User 2 and User 3. When User 2 provides or gives input on the collaborative document, the interaction management system updates 1003 the "seek input" step associated with User 2 to "closed" and retains the "seek input" step associated with User 3 as "open" in the database. The interaction management system generates a new permission set comprising a permissible action, for example, a read only action, for User 2 and does not permit User 2 to perform any further actions. At this step, User 1 has the same permissible actions and allowed actions as per the prior open step.

User 1 then selects a "seek approval" option from the display interface to seek approval from the approver Appr1 who was the approver while simulating the workflow sequence WF001. The interaction management system does not permit a change in approvers while following a workflow sequence. The interaction management system sets 1004 Appr1 as not anonymous, sets Appr1 as the owner of the document, creates a new step, and locks out User 3. The interaction management system generates and executes a new permission set comprising a permissible action, for example, a read only action for User 3 and does not permit User 3 to perform any further actions. In this "pending approval" document state 1000d, User 1 has the permissible action of read only. In this example, the interaction management system generates and executes a new permission set comprising a permissible action, for example, a read only action for User 1 and does not permit User 1 to perform further actions based on the codified decision rules. The interaction management system generates and executes a permission set comprising permissible actions, for example, edit and comment, for Appr1. The interaction management system further allows Appr1 to perform actions, for example, approve, reject, and request revision only. When Appr1 gives approval on the collaborative document, the interaction management system updates 1005 the "seek approval" step to "closed" in the database, sets an action field for User 1 as "approval received" in the database, generates a new permission set comprising permissible actions, for example, edit and comment, for Appr1. In this "approved document" state 1000e, the interaction management system does not permit Appr1 to perform further actions. Moreover, the interaction management system generates a permission set comprising permissible actions, for example, edit and comment for User 1, and allows User 1 to perform a publish action to enter a "published document" state 1000f. In this example, the publish action is an archival process and User 1 does not have an option to save and deploy the workflow sequence. In this embodiment, the approver cannot be changed when following a re-deployable workflow sequence.

Figure 11:
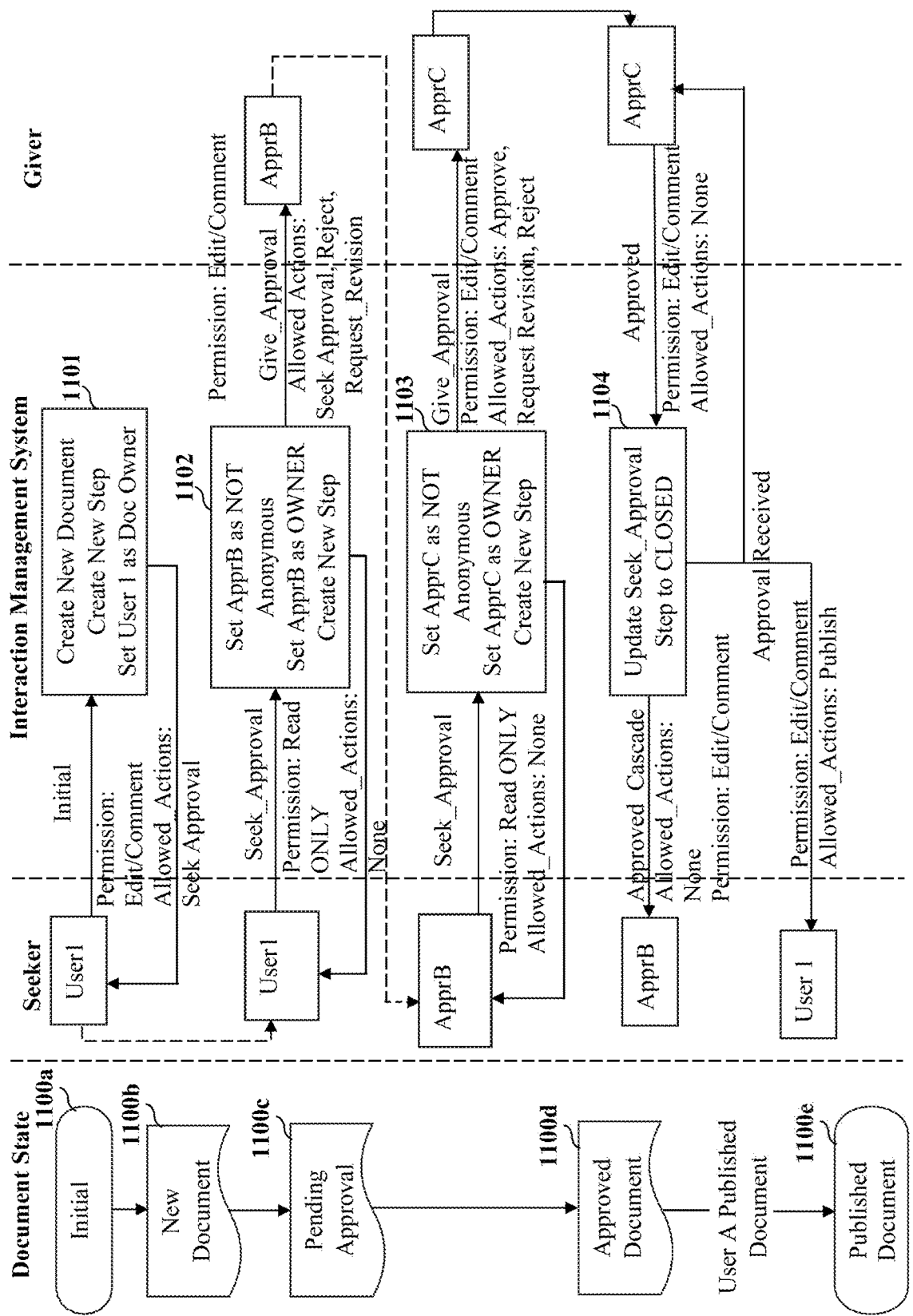
FIG. 11 illustrates a flowchart comprising the steps of following the workflow sequence simulated in FIG. 8, according to an embodiment herein.

FIG. 11 illustrates a flowchart comprising the steps of following the workflow sequence simulated in FIG. 8, according to an embodiment herein. Consider an example where a user wishes to follow the workflow sequence WF002 from a document template DT002 generated and stored in the database by the interaction management system. In this example, User 1 is a seeker who seeks actions from givers, for example, approvers ApprB and ApprC. In the initial state 1100a of the live document, the interaction management system creates 1101 a new document 1100b from DT002, creates a new step, and sets User 1 as an owner of the document. Based on the codified decision rules, the interaction management system retrieves and displays a request action, for example, seek approval only on a display interface in the document editor for selection by User 1. The interaction management system also generates and executes a permission set comprising permissible actions, for example, edit and comment for User 1. After creating the new document, when User 1 selects a "seek approval" option from the display interface to seek approval from ApprB, the interaction management system sets 1102 ApprB as not anonymous, sets ApprB as the owner of the document, and creates a new step. In this document state, User 1 has the permissible action of read only and is not permitted to perform any further actions. The interaction management system generates and executes a permission set comprising permissible actions, for example, edit and comment for ApprB. The interaction management system also allows ApprB to perform actions, for example, seek approval, reject, and request revision. In this example, when ApprB selects a "seek approval" option from the display interface to seek approval from ApprC, the interaction management system sets 1103 ApprC as not anonymous, sets ApprC as the owner of the document, and creates a new step. In this "pending approval" document state 1100c, the interaction management system generates and executes a new permission set comprising a permissible action, for example, a read only action for ApprB and does not permit ApprB to perform any further actions. The interaction management system generates and executes a permission set comprising permissible actions, for example, edit and comment for ApprC and permits ApprC to perform actions, for example, approve, reject, and request revision.

When ApprC provides or gives approval, the interaction management system updates 1104 the existing "seek approval" step to "approved" and "closed" in the database, sets an action field for ApprB as "Approved_Cascade", and sets an action field for User 1 as "approval received" in the database. In this "approved document" state 1100d, ApprC has the same permissible actions, for example, edit and comment, but the interaction management system does not permit ApprC to perform further actions. Furthermore, in this "approved document" state 1100d, the interaction management system generates and executes a new permission set comprising permissible actions, for example, edit and comment, for ApprB and does not permit ApprB to perform further actions. Furthermore, in this "approved document" state 1100d, the interaction management system generates and executes a new permission set comprising permissible actions, for example, edit and comment, for User 1 and permits User 1 to perform a publish action to enter a published document state 1100e. In this example, the publish action is an archival process and User 1 does not have an option to save and deploy the workflow sequence. In this embodiment, the approver cannot be changed when following a re-deployable workflow sequence.

Figure 12A:
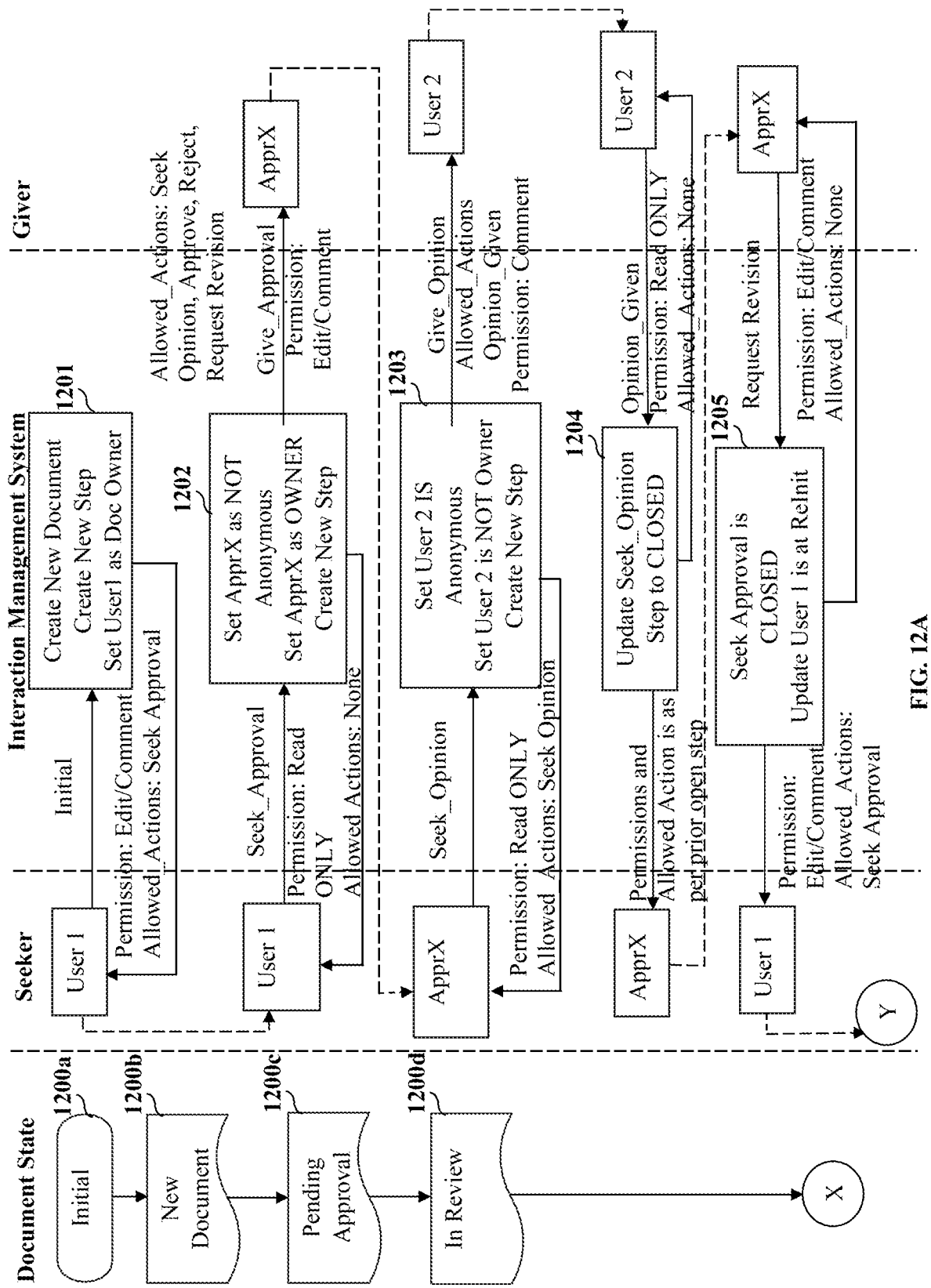
FIGS. 12A-12B illustrate a flowchart comprising the steps of following the workflow sequence simulated in FIG. 9 with an additional consequential action, according to an embodiment herein.
Figure 12B:
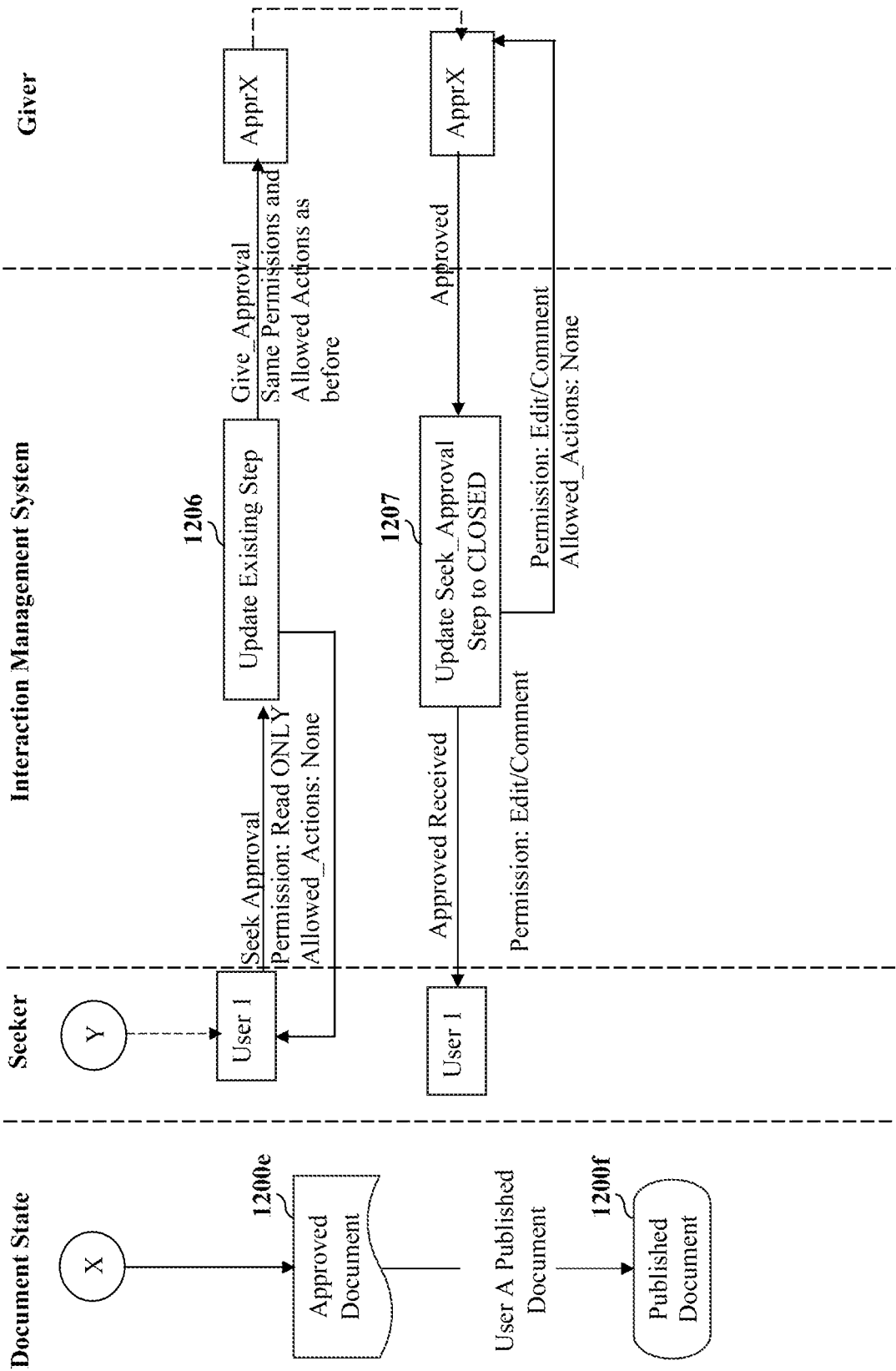

FIGS. 12A-12B illustrate a flowchart comprising the steps of following the workflow sequence simulated in FIG. 9 with an additional consequential action, according to an embodiment herein. Consider an example where a user wishes to follow the workflow sequence WF003 from a document template DT003 generated and stored in the database by the interaction management system and undergo a cycle of requesting a revision. In this example, User 1 is a seeker who seeks actions from givers, for example, an approver ApprX and a reviewer User 2. In the initial state 1200a of the live document, the interaction management system creates 1201 a new document 1200b, creates a new step, and sets User 1 as an owner of the document. Based on the codified decision rules, the interaction management system retrieves and displays a request action, for example, seek approval only on a display interface in the document editor for selection by User 1. The interaction management system also generates and executes a permission set comprising permissible actions, for example, edit and comment, for User 1. After creating the new document, when User 1 selects a "seek approval" option from the display interface to seek approval from ApprX, the interaction management system sets 1202 ApprX as not anonymous, sets ApprX as the owner of the document, and creates a new step. In this "pending approval" document state 1200c, the interaction management system generates and executes a new permission set comprising a permissible action, for example, a read only action, and does not permit User 1 to perform any further actions. The interaction management system generates and executes a permission set comprising permissible actions, for example, edit and comment, for ApprX. The interaction management system also allows ApprX to perform actions, for example, seek opinion, approve, reject, and request revision.

When ApprX seeks an opinion from User 2, the interaction management system sets 1203 User 2 as anonymous, sets User 2 as not an owner of the document, and creates a new step. In this "in review" document state 1200d, the interaction management system generates a new permission set comprising a permissible action, for example, a read only action, for ApprX and allows ApprX to perform only a seek opinion action. The interaction management system generates and executes a permission set comprising a permissible action, for example, comment only for User 2 and permits User 2 to perform only a complete opinion action in the form of "opinion given". User 1 and User 2 are mutually anonymous. When User 2 provides or gives an opinion on the document, the interaction management system updates 1204 the "seek opinion" step to "closed" in the database and generates a new permission set comprising a permissible action, for example, a read only action for User 2. The interaction management system also does not permit User 2 to perform any further actions. At this step, ApprX has the same permissible actions as per the prior open step of "seek approval" and therefore is permitted to edit or comment and take actions to "seek opinion", "request revision", "reject", or "approve". When ApprX selects a "request revision" option from the display interface to request a revision from User 1, the interaction management system updates 1205 the "seek approval" step to "closed" in the database and updates an action field associated with User 1 to "reinitialize" in the database. The interaction management system generates a new permission set comprising permissible actions, for example, edit and comment, for ApprX and does not permit ApprX to perform any further actions. In this document state, the interaction management system generates a new permission set comprising permissible actions, for example, edit and comment, for User 1 and permits User 1 to perform a seek approval action only.

When User 1 selects a "seek approval" option from the display interface to seek approval from ApprX, the interaction management system updates 1206 the "seek approval" step. In this document state, the interaction management system generates and executes a new permission set comprising a permissible action, for example, a read only action, for User 1 and does not permit User 1 to perform any further actions. The interaction management system generates and executes a permission set comprising permissible actions, for example, edit and comment, for ApprX. The interaction management system also allows ApprX to perform actions, for example, seek opinion, approve, reject, and request revision. When ApprX gives approval on the document, the interaction management system updates 1207 the "seek approval" step to "closed" in the database and sets an action field for User 1 as "approval received" in the database. In this "approved document" state 1200e, the interaction management system generates a new permission set comprising permissible actions, for example, edit and comment, for ApprX and does not permit ApprX to perform further actions. The interaction management system generates a new permission set comprising edit and comment actions for User 1 and allows User 1 to perform a publish action to enter a published document state 1200f. In this example, the publish action is an archival process and User 1 does not have an option to save and deploy the workflow sequence.

Figure 13:
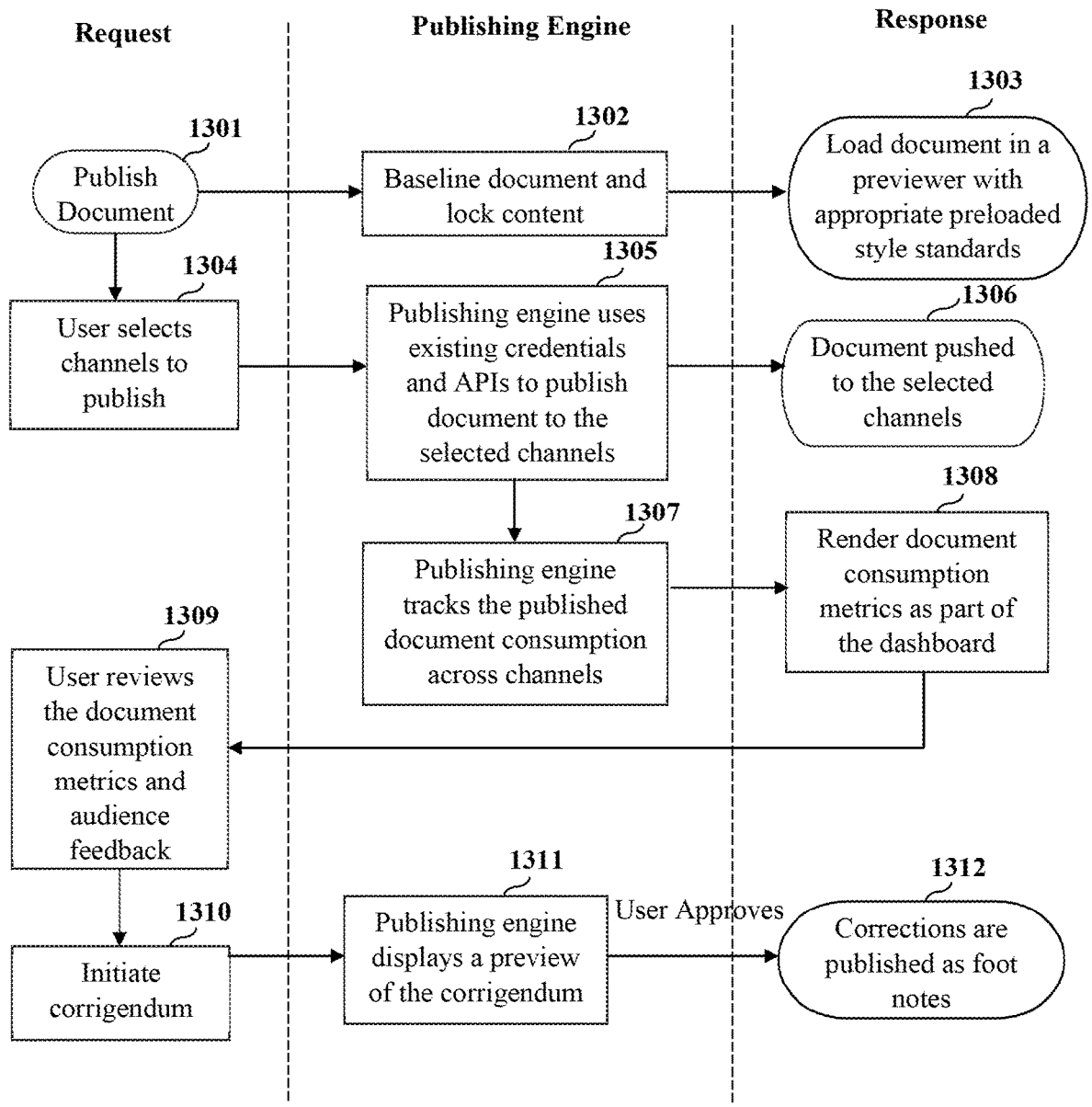
FIG. 13 illustrates a flowchart comprising the steps executed by the interaction management system for publishing a live document when a user seeks a publication action, according to an embodiment herein.

FIG. 13 illustrates a flowchart comprising the steps executed by the interaction management system for publishing a live document when a user seeks a publication action, according to an embodiment herein. In an embodiment, the interaction management system comprises a publishing engine configured to execute computer program instructions for publishing the live document. When a user selects a "publish" option from the display interface provided by the interaction management system to publish 1301 the document, the publishing engine retrieves 1302 a baseline document and locks content of the baseline document. The publishing engine then loads 1303 the document in a pre-viewer of the document editor with appropriate preloaded style standards. The publishing engine prompts the user to select 1304 one or more channels for publishing the document. The publishing engine then uses 1305 credentials and application programming interfaces (APIs) to publish the document to the selected channels. The publishing engine pushes 1306 the document to the selected channels. The publishing engine tracks 1307 consumption of the published document across the selected channels and renders 1308 document consumption metrics on the display interface as part of the dashboard. The user then reviews 1309 the document consumption metrics and audience feedback on the dashboard and may potentially initiate 1310 a corrigendum. The publishing engine displays 1311 a preview of the corrigendum on the display interface and if the user approves the preview, the publishing engine publishes 1312 the corrections as foot notes in the document.

Consider an example of the computer-implemented method for managing interactions and automatically sequencing a workflow from a live document in real time. In a marketing communications environment, a content team member, herein referred to as a "writer", is commissioned to write a blogpost. In this example, the interaction management system manages interactions and automatically sequences a workflow from a live document created for the marketing communications blogpost in real time. The live document undergoes the following sequence of actions. A writer seeks input from peer writers. One peer writer provides input. The writer seeks approval from a marketing head. The marketing head seeks/receives assistance from a public relations (PR) agency. The marketing head seeks/receives opinion from a law agency. The marketing head seeks revision from the writer and the writer seeks approval after revision. The marketing head approves the live document and seeks publication. The marketing head may also reject the live document.

When a writer creates a live document within the document editor, the interaction management system aggregates and records request action data and potential response action data in database tables as follows:

Request{WHO:Author_01, DOCID:null, STEPID:null, PARALLELSTEPID:null, ACTION: Initial)
Response {WHO:Author_01, DOCID:D001, STEPID: S000, PARALLELSTEPID:null, ACTION:Initial, Edit_doc:Yes, Comment_Doc:Yes,
Allowed_ActionsSeek_Input:Yes, Seek_Approval:Yes, Seek_Opinon:Yes,
Seek_Opinon_optional:Yes, Seek_Assistance:Yes}}

In the initial stage of creating the live document, the interaction management system allows the writer to seek an input, seek an opinion, seek an approval, and seek assistance. The interaction management system further generates and executes a permission set comprising permissible actions, for example, edit and comment, on the live document. Furthermore, the interaction management system stores a step status and an action to be performed by a participant in a given step in a database table, for example, the Step table, of the database as follows:

Step [{StepID: S000, isComplete: false, PriorStepID: < >, ParallelStepID: < >,
Actions[(Who:Author_01,Action: Initial, DueDate: < >}]}]

The Step table drives the workflow for the document. The Step table provides a status of a step in the workflow sequence and an action for a participant in the given step. In an embodiment, the Step table comprises the following columns, namely, DocID, StepID, PriorStepID, ParallelStepID, isComplete, UserID, Action, and DueDate, for storing a document identifier, a step identifier, a prior step identifier, a parallel step identifier, a status of completion, a user or participant identifier, and a due date for completion respectively. Furthermore, the interaction management system stores metadata of the live document in a database table, for example, a Doc_Meta table of the database as follows: Doc_Id:D001, Doc_Status:null, WaterMark: null.

The Doc_Meta table is main document table comprising document metadata columns that drive a watermark, comment count, etc. In an embodiment, the Doc_Meta table comprises the following columns, namely, DocID, Doc_Title, Doc_Status, WaterMark, Last_Opened_Date, Last_Modified Date, Create_Date, Total_Comments, Total_UnResolved_Comments, Doc_Size, Doc_Content, etc., for storing the document identifier, a title of the live document, a status of the live document, a watermark of the live document, a date of last opening, a data of last modification, a creation date, total number of comments in the live document, total number of unresolved comments in the live document, a size of the live document, content of the live document, etc., respectively. The interaction management system adds columns to the Doc_Meta table based on the requirements of the live document. Furthermore, the interaction management system stores the following data of the live document in a database table, for example, a User_Doc_Status table, to determine where the live document is to be displayed on a dashboard and implement alerts based on due dates, in communication with the Doc_Meta table.

UserID:Author_01, Doc_Id:D001, StepID: < > Dashboard: New Initiative,
DueDate: < >, IsAnonymous:False, Action:Initial The User_Doc_Status table along with the Doc_Meta table drives the dashboard and determines where the document appears in the dashboard. The interaction management system implements alerting based on due dates stored in the User_Doc_Status table. In an embodiment, the User_Doc_Status table comprises the following columns, namely, UserID, isAnonymous, DocID, StepID, Dashboard_Status, Action, and DueDate for storing the participant identifier, an anonymity requirement, the document identifier, a step identifier, a dashboard status, an action performed, and the due date respectively. When the writer seeks input from peer writers by selecting a "seek input" option provided on a display interface of the document editor by the interaction management system, the interaction management system simultaneously aggregates and records request action data and potential response action data in database tables as follows:

Request{WHO:Author_01, DOCID:D001, STEPID: S000, PARALLELSTEPID:null,
ACTION: Seek_Input, WHOM:Writer_01; Writer_02, DueDate:Dec. 15 2019, IsAnonymous:False}
Response{WHO:Author_01, DOCID:D001, STEPID: S000, PARALLELSTEPID:null
ACTION: Seek_Input. Edit_doc:Yes, Comment_Doc: Yes,
Allowed_Actions{Seek_Input:Yes, Seek_Approval:Yes, Seek_Opinon:Yes, Seek_Opinon_optional:Yes, Seek_Assistance:Yes}}

Furthermore, the interaction management system updates the Step table as follows:
Step [
{StepID: S000, isComplete: false, PriorStepID: < >, ParallelStepID: < >,
Actions[{Who:Author_01,Whom: < >,Action: ReInitial}]},
{StepID: S000, isComplete: false, PriorStepID: S000, ParallelStepID: P001. Actions[
{Who:Author_01, Action: Seek_Input},
{Who:Writer_01, Action: Give_Input, DueDate: Dec. 15 2019}]},
{StepID: S000, isComplete: false. PriorStepID: S000, ParallelStepID: P002, Actions[
{Who:Author_01, Action: Seek_Input}.
{Who:Writer_02. Action: Give_Input, DueDate: Dec. 15 2019}]},
]

Furthermore, the interaction management system updates the Doc_Meta table as follows:
Doc_Id:D001, Doc_Status:null, WaterMark: null
Furthermore, the interaction management system updates the User_Doc_Status table as follows:
UserID:Author_01, Doc_Id:D001, StepID: S000, ParallelStepID:null, Dashboard: Seek from Others,
DueDate:< >, IsAnonymous:False, Action: Seek_Input
UserID:Writer_01, Doc_Id:D001, StepID: S000, ParallelStepID:P001, Dashboard: Seek from YOU,
DueDate: Dec. 15 2019, IsAnonymous:False, Action: Give_Input
UserID:Writer_02, Doc_Id:D001, StepID: S000, ParallelStepID:P002. Dashboard: Seek from YOU,
DueDate: Dec. 15 2019, IsAnonymous:False, Action: Give_Input When one peer writer logs into the document editor to work on the live document and opens the live document from the dashboard, the interaction management system transmits the data stored in the User_Doc_Status table to a backend database, for example, a rule database, to fetch the permission set. Moreover, the interaction management system simultaneously aggregates and records request action data and potential response action data in database tables as follows:
Request{WHO:Writer_01, DOCID:D001, STEPID:S000, PARALLELSTEPID:P001, ACTION:Give_Input}
Response {WHO:Writer_01, DOCID:D001, STEPID: S000, PARALLELSTEPID:P001, ACTION: Input_Given, Edit_doc:Yes, Comment_Doc:Yes, Allowed_Actions {Input_Given, Locked}}

At this stage, the Step table comprises the following data:
Step [
{StepID: S000, isComplete: false, PriorStepID: <. ParallelStepID: null, Actions[{Who:Author_01,Whom: < >,Action: ReInitial}]},
{StepID: S000, isComplete: false, PriorStepID: S000, ParallelStepID: P001, Actions[{Who:Author_01, Action: Seek_Input},
{Who:Writer_01, Action: Give_Input, DueDate: Dec. 15 2019}]},
{StepID: S000, isComplete: false, PriorStepID: S000, ParallelStepID: P002, Actions[
{Who:Author_01, Action: Seek_Input),
(Who:Writer_02, Action: Give_Input, DueDate: Dec. 15 2019}]},
]

At this stage, the Doc_Meta table comprises the following data: Doc_Id:D001, Doc_Status:null, WaterMark: null
At this stage, the User_Doc_Status table comprises the following data:
UserID:Author_01, Doc_Id:D001, StepID: S000, ParallelStepID:null, Dashboard: Seek from Others,
DueDate:< >, IsAnonymous:False, Action: ReInitial
UserID:Writer_01, Doc_Id:D001, StepID: S000, ParallelStepID:P001, Dashboard: Seek from YOU
DueDate: Dec. 15 2019, IsAnonymous:False, Action: Give_Input
UserID:Writer_02, Doc_Id:D001, StepID: S000, ParallelStepID:P001, Dashboard: Seek from YOU,
DueDate: Dec. 15 2019, IsAnonymous:False, Action: Give_Input When one peer writer provides input on the live document, the interaction management system simultaneously aggregates and records request action data and potential response action data in database tables as follows:
Request{WHO:Writer_01. DOCID:D001, STEPID:S000, PARALLELSTEPID:P001, ACTION:Input_Given}
Response{WHO:Writer_01, DOCID:D001, STEPID: S000, PARALLELSTEPID:P001, ACTION: Input_Given, Edit_doc:No, Comment_Doc:No, Allowed_Actions{ }}

Furthermore, the interaction management system updates the Step table as follows:
Step [
{StepID: S000, isComplete: false, PriorStepID: < >, ParallelStepID: null, Actions[{Who:Author_01,Whom: < >,Action: ReInitial}]},
{StepID: S000, isComplete: true, PriorStepID: S000, ParallelStepID: P001, Actions[
{Who:Author_01, Action: Seek_Input},
{Who:Writer_01, Action: Input_Given, DueDate: Dec. 15 2019}]},
{StepID: S000, isComplete: false, PriorStepID: S000, ParallelStepID: P002, Actions[
{Who:Author_01, Action: Seek_Input},
{Who:Writer_02, Action: Give_Input, DueDate: Dec. 15 2019}]},
]

Furthermore, the interaction management system updates the Doc_Meta table as follows:
Doc_Id:D001, Doc_Status:null, WaterMark: null
Furthermore, the interaction management system updates the User_Doc_Status table as follows:
UserID:Author_01, Doc_Id:D001, StepID: S000, ParallelStepID:null, Dashboard: Seek from Others, DueDate:< >, IsAnonymous:False, Action: Seek_Input
UserID:Writer_01, Doc_Id:D001, StepID: S000, ParallelStepID:P001. Dashboard: Seek from Others,
DueDate: Dec. 15 2019, IsAnonymous:False, Action: Input_Given
UserID:Writer_02, Doc_Id:D001, StepID: S000, ParallelStepID:P002, Dashboard: Seek from YOU,
DueDate: Dec. 15 2019, IsAnonymous:False, Action: Give_Input When the writer seeks approval from a marketing head, the interaction management system simultaneously aggregates and records request action data and potential response action data in database tables as follows:

Request{WHO:Author_01, DOCID:D001, STEPID: S000, PARALLELSTEPID:null, ACTION:
Seek_Approval, WHOM:MarkHd_01, DueDate:Dec. 28 2019, IsAnonymous:False}
Response{WHO:Author_01, DOCID:D001, STEPID: S000, PARALLELSTEPID:null
ACTION: Seek_Approval, Edit_doc:No, Comment_Doc: No, Allowed_Actions{ }}

Furthermore, the interaction management system updates the Step table as follows:
Step [
{StepID: S000, isComplete: false, PriorStepID: < >, ParallelStepID: null, Actions[{Who:Author_01,Whom: < >,Action: ReInitial}]},
{StepID: S000, . . . }]},
{StepID: S000, isComplete: true, PriorStepID: S000, ParallelStepID: P002, Actions[
{Who:Author_01,Whom: Writer_02, Action: Seek_Input},
{Who:Writer_02,Whom: Author_01, Action: Locked, DueDate: Dec. 15 2019}]},
{StepID: S001, isComplete: false, PriorStepID: S000, ParallelStepID: null, Actions[
{Who:Author_01,Whom: MarkHd_01, Action: Seek_Approval},
{Who: MarkHd_01,Whom: Author_01, Action: Give_Approval, DueDate: Dec. 28 2019}]},
]

Furthermore, the interaction management system updates the Doc_Meta table as follows:
Doc_Id:D001, Doc_Status:Pending_Approval, WaterMark: Pending_Approval Furthermore, the interaction management system updates the User_Doc_Status table as follows:
UserID:Author_01, Doc_Id:D001, StepID: S000, ParallelStepID:null, Dashboard: Seek from Others,
DueDate:< >, IsAnonymous:False, Action: Seek_Approval
UserID:Writer_01, . . . Input_Given
UserID:Writer_02, Doc_Id:D001, StepID: S000, ParallelStepID:P001, Dashboard: Seek from Others,
DueDate: Dec. 15 2019, IsAnonymous:False, Action: Locked
UserID:MarkHd_01, Doc_Id:D001, StepID: S001, ParallelStepID:null, Dashboard: Seek from YOU,
DueDate: Dec. 28 2019, IsAnonymous:False, Action: Give_Approval When the marketing head seeks/receives assistance from the PR agency, the interaction management system simultaneously aggregates and records request action data and potential response action data in database tables as follows:
Request{WHO:MarkHd_01, DOCID:D001, STEPID: S001, PARALLELSTEPID:null ACTION: Seek_Assistance, WHOM:PRagt_01; PRagt_02, DueDate:Dec. 20 2019, IsAnonymous:False}
Response{WHO:MarkHd_01, DOCID:D001, STEPID: S001, PARALLELSTEPID:null ACTION: Seek_Assistance, Edit_doc:Yes, Comment_Doc:Yes, Allowed_Actions {RemoveUsers:Yes, Seek_Input: Yes, Seek_Approval:Yes, Give_MasterApproval:Yes, Approved:Yes, Approved_Cascade:Yes. Seek_opinion: Yes, Seek_opinion_optional:Yes, Rejected:Yes, Rejected_Cascade:Yes, Request_revision:yes, Request_revision_cascade:yes,Seek_Assistance:Yes}}

Furthermore, the interaction management system updates the Step table as follows:
Step [
(StepID: S000, isComplete: false, PriorStepID: < >, ParallelStepID: null, Actions[{Who:Author_01,Whom: < >,Action: ReInitial}]},
{StepID: S000, . . . }]},
{StepID: S000, . . . }]},
{StepID: S001, isComplete: false, PriorStepID: S0000, ParallelStepID: null, Actions[
{Who:Author_01, Action: Seek_Approval},
{Who: MarkHd_01, Action: Give_Approval, DueDate: Dec. 28 2019}]},
{StepID: S001, isComplete: false. PriorStepID: S001, ParallelStepID: P003, Actions[
{Who:MarkHd_01, Action: Seek_Assistance},
{Who: PRAgt_01, Action: Give_Assistance, DueDate: Dec. 20 2019}]},
{StepID: S001, isComplete: false, PriorStepID: S001, ParallelStepID: P004. Actions[
{Who:MarkHd_01, Action: Seek_Assistance},
{Who: PRAgt_02, Action: Give_Assistance, DueDate: Dec. 20 2019}]},
]

Furthermore, the interaction management system updates the Doc_Meta table as follows:
Doc_Id:D001, Doc_Status:Pending_Approval, WaterMark: Pending_Approval Furthermore, the interaction management system updates the User_Doc_Status table as follows:
UserID:Author_01, Doc_Id:D001, StepID: S000, ParallelStepID:null, Dashboard: Seek from Others,
DueDate:< >, IsAnonymous:False, Action: Seek_Approval
UserID:Writer_01, . . . Input_Given
UserID:Writer_02, . . . Locked
UserID:MarkHd_01, Doc_Id:D001, StepID: S001, ParallelStepID:null, Dashboard: Seek from Others,
DueDate: Dec. 28 2019, IsAnonymous:False, Action: Seek_Assistance
UserID: PRagt_01, Doc_Id:D001, StepID: S001, ParallelStepID:P003, Dashboard: Seek from YOU,
DueDate: Dec. 20 2019, IsAnonymous:False, Action: Give_Assistance
UserID: PRagt_02, Doc_Id:D001, StepID: S001, ParallelStepID:P004, Dashboard: Seek from YOU,
DueDate: Dec. 20 2019, IsAnonymous:False, Action: Give_Assistance When the marketing head seeks/receives assistance from the PR agency, the interaction management system simultaneously aggregates and records request action data and potential response action data in database tables as follows:
Request{WHO:PRagt_02, DOCID:D001, STEPID:S001, PARALLELSTEPID:P004 ACTION: Assistance_Given Response{WHO:PRagt_02, DOCID:D001, STEPID: S001, PARALLELSTEPID:P004, ACTION: Assistance_Given, Edit_doc:No, Comment_Doc:No, Allowed_Actions{ }}

Furthermore, the interaction management system updates the Step table as follows:

Step [
{StepID: S000, isComplete: false, PriorStepID: < >, ParallelStepID: null, Actions[{Who:Author_01,Whom: < >,Action: ReInitial}]}.
{StepID: S000, . . . }]},
{StepID: S000, . . . }]},
{StepID: S003, isComplete: false, PriorStepID: S0000, Actions[
{Who:Author_01, Action: Seek_Approval},
{Who: MarkHd_01, Action: Give_Approval, DueDate: Dec. 28 2019}]},
{StepID: S001, isComplete: false, PriorStepID: S001, ParallelStepID: P003, Actions[
{Who:MarkHd_01, Action: Seek_Assistance},
{Who: PRagt_01, Action: Give_Assistance. DueDate: Dec. 20 2019}]},
{StepID: S001, isComplete: true, PriorStepID: S001, ParallelStepID: P004, Actions[
{Who:MarkHd_01, Action: Seek_Assistance},
{Who: PRagt_02, Action: Assistance_Given, DueDate: Dec. 20 2019}]},
]

Furthermore, the interaction management system updates the Doc_Meta table as follows:

Doc_Id:D001, Doc_Status:Pending_Approval, WaterMark: Pending_Approval

Furthermore, the interaction management system updates the User_Doc_Status table as follows:

UserID:Author_01, Doc_Id:D001, StepID: S000, ParallelStepID:null, Dashboard: Seek from Others,
DueDate:< >, IsAnonymous:False, Action: Seek_Approval
UserID:Writer_01, . . . Input_Given
UserID:Writer_02 . . . Locked
UserID:MarkHd_01, Doc_Id:D001, StepID: S001, ParallelStepID:null, Dashboard: Seek from Others,
DueDate: Dec. 28 2019, IsAnonymous:False, Action: Seek_Assistance
UserID: PRagt_01, Doc_Id:D001, StepID: S001, ParallelStepID:P003, Dashboard: Seek from YOU,
DueDate: Dec. 20 2019, IsAnonymous:False, Action: Give_Assistance
UserID: PRagt_02, Doc_Id:D001, StepID: S001, ParallelStepID:P004, Dashboard: Seek from Others,
DueDate: Dec. 20 2019, IsAnonymous:False, Action: Assistance_Given When the marketing head seeks/receives opinion from the law agency, the interaction management system simultaneously aggregates and records request action data and potential response action data in database tables as follows:

Request {WHO:MarkHd_01, DOCID:D001, STEPID: S001, PARALLELSTEPID:null, ACTION: Seek_Opinion, WHOM:Lawyr_01, DueDate:Dec. 27 2019, IsAnonymous:False}
Response {WHO:MarkHd_01, DOCID:D001, STEPID: S001, PARALLELSTEPID:null, ACTION: Seek_Opinion, Edit_doc:No, Comment_Doc:No. Allowed_Actions{Seek_opinion:Yes, Seek_opinion_optional:Yes}}

Furthermore, the interaction management system updates the Step table as follows:

Step [
{StepID: S000, isComplete: false, PriorStepID: >, ParallelStepID: null,
Actions[{Who:Author_01,Whom:< >,Action: ReInitial}]},
{StepID: S000, . . . }]},
{StepID: S000, . . . }]},
{StepID: S001, isComplete: false. PriorStepID: S001, ParallelStepID: null, Actions[
{Who:Author_01, Action: Seek_Approval},
{Who: MarkHd_01, Action: Give_Approval, DueDate: Dec. 28 2019}]},
{StepID: S001, isComplete: true, PriorStepID: S001, ParallelStepID: P003, Actions[
{Who:MarkHd_01. Action: Seek_Assistance}.
{Who: PRagt_01, Action: Locked, DueDate: Dec. 20 2019}]},
{StepID: S001 . . . }]},
{StepID: S001, isComplete: false, PriorStepID: S001, ParallelStepID: P005, Actions[
{Who:MarkHd_01, Action: Seek_Opinion},
{Who: Lawyr_01, Action: Give_Opinion, DueDate: Dec. 27 2019}]},
]

Furthermore, the interaction management system updates the Doc_Meta table as follows:

Doc_Id:D001, Doc_Status:In Review, WaterMark:In Review

Furthermore, the interaction management system updates the User_Doc_Status table as follows:

UserID:Author_01, Doc_Id:D001, StepID: S000, ParallelStepID:null, Dashboard: Seek from Others,
DueDate:< >, IsAnonymous:False, Action: Seek_Approval
UserID:Writer_01, . . . Input_Given
UserID:Writer_02, . . . Locked
UserID:MarkHd_01, Doc_Id:D001, StepID: S001, ParallelStepID:null, Dashboard: Seek from Others,
DueDate: Dec. 28 2019, IsAnonymous:False, Action: Seek_Opinion
UserID: PRagt_01, Doc_Id:D001, StepID: S001, ParallelStepID:P003, Dashboard: Seek from YOU,
DueDate: Dec. 20 2019, IsAnonymous:False, Action: Locked
UserID: PRagt_02, . . . .
UserID: Lawyr_01, Doc_Id:D001, StepID: S001, ParallelStepID:P005, Dashboard: Seek from YOU,
DueDate: Dec. 20 2019, IsAnonymous:true, Action: Give_Opinion When the marketing head seeks/receives opinion from the law agency, the interaction management system simultaneously aggregates and records request action data and potential response action data in database tables as follows:

Request{WHO:Lawyr_01, DOCID:D001, STEPID: S001, PARALLELSTEPID:P005, ACTION: Opinion_Given}
Response{WHO:Lawyr_01. DOCID:D001, STEPID: S001, PARALLELSTEPID:P005, ACTION: Opinion_Given, Edit_doc:No, Comment_Doc:No, Allowed_Actions{ }}

Furthermore, the interaction management system updates the Step table as follows:
Step [
{StepID: S000, isComplete: false. PriorStepID: < >
Actions[{Who:Author_01,Whom:<       >,Action: ReInitial} ],
{StepID: S000, . . . }]},
{StepID: S000 . . . }]},
{StepID: S001, isComplete: false, PriorStepID: S000, ParallelStepID: null, Actions[
{Who:Author_01, Action: Seek_Approval},
{(Who: MarkHd_01, Action: Give_Approval, DueDate: Dec. 28 2019}]},
{StepID: S001, . . . }]},
{StepID: S001, . . . }]},
{StepID: S001, isComplete: true, PriorStepID: S003, ParallelStepID: P005, Actions[
{Who:MarkHd_01, Action: Seek_Opinion},
{Who: Lawyr_01, Action: Opinion_Given, DueDate: Dec. 27 2019}]},
Furthermore, the interaction management system updates the Doc_Meta table as follows:
Doc_Id:D001, Doc_Status:In Review, WaterMark: In Review
Furthermore, the interaction management system updates the User_Doc_Status table as follows:
UserID:Author_01, Doc_Id:D001, StepID: S000, ParallelStepID:null, Dashboard: Seek from Others,
DueDate:< >, IsAnonymous:False, Action: Seek_Approval
UserID:Writer_01, . . . Input_Given
UserID:Writer_02 . . . Locked
UserID:MarkHd_01, Doc_Id:D001, StepID: S001, ParallelStepID:null, Dashboard: Seek from Others,
DueDate: Dec. 28 2019, IsAnonymous:False, Action: Seek_Opinion
UserID: PRagt_01, . . . .
UserID: PRagt_02, . . . .
UserID: Lawyr_01, Doc_Id:D001, StepID: S001, ParallelStepID:P005, Dashboard: Seek from YOU,
DueDate: Dec. 20 2019, IsAnonymous:true, Action: Opinion_Given
When the marketing head seeks a revision from the writer and the writer seeks an approval after revision, the interaction management system simultaneously aggregates and records request action data and potential response action data in database tables as follows:
Request{WHO:MarkHd_01, DOCID:D001, STEPID: S001, PARALLELSTEPID:null,
ACTION: Request_Revision}
Response{WHO:MarkHd_01, DOCID:D001, STEPID: S001, PARALLELSTEPID:null, ACTION: Request-Revision, Edit_doc:Yes, Comment_Doc:Yes, Allowed_Actions{ }}
Furthermore, the interaction management system updates the Step table as follows:
Step [
{StepID: S000, isComplete: false, PriorStepID: < >, ParallelStepID: null,
Actions[{Who:Author_01,Whom:<       >,Action: ReInitial}]},
{StepID: S000, . . . }]},
{StepID: S000, . . . }]},
{StepID: S01, isComplete: true, PriorStepID: S000, ParallelStepID: null, Actions[
{Who:Author_01, Action: Seek_Approval},
{Who: MarkHd_01, Action: Request Revision, DueDate: Dec. 28 2019}]},
{{StepID: S001, . . . }]},
{StepID: S001 . . . }]},
{StepID: S001, . . . }]},
]
Furthermore, the interaction management system updates the Doc_Meta table as follows:
Doc_Id:D001, Doc_Status:In Revision, WaterMark: In Revision
Furthermore, the interaction management system updates the User_Doc_Status table as follows:
UserID:Author_01, Doc_Id:D001, StepID: S000, ParallelStepID:null, Dashboard: Seek from You,
DueDate: < >. IsAnonymous:False, Action: ReInitial
UserID:Writer_01, . . . Input_Given
UserID:Writer_02, . . . Locked
UserID:MarkHd_01, Doc_Id:D001, StepID: S001, ParallelStepID:null, Dashboard: Seek from Others,
DueDate: Dec. 28 2019, IsAnonymous:False, Action: Request_Revision
UserID: PRagt_01, . . . .
UserID: PRagt_02, . . . .
UserID: Lawyr_01, . . . .
When the marketing head seeks a revision from the writer and the writer seeks an approval after revision, the interaction management system simultaneously aggregates and records request action data and potential response action data in database tables as follows:
Request{WHO:Author_01, DOCID:D001, STEPID: S000, PARALLELSTEPID:null, ACTION: Seek_Approval, WHOM:MarkHd_01, DueDate:Dec. 28 2019, IsAnonymous:False}
Response{WHO:Author_01, DOCID:D001, STEPID: S000, PARALLELSTEPID:null, ACTION: Seek_Approval, Edit_doc:No, Comment_Doc:No,
Allowed_Actions{ }}
Furthermore, the interaction management system updates the Step table as follows:
Step [
{StepID: S000, isComplete: false, PriorStepID: < >, ParallelStepID: null,
Actions[{Who:Author_01,Whom:<       >,Action: ReInitial} ]},
{StepID: S000, . . . }]},
{StepID: S000 . . . }]},
{StepID: S001, isComplete: false, PriorStepID: S000, ParallelStepID: null, Actions[
{Who:Author_01, Action: Seek_Approval},
{Who: MarkHd_01, Action: Give_Approval, DueDate: Dec. 28 2019}]},
{{StepID: S001 . . . }]}
{StepID: S001, . . . }]},
{StepID: S001, . . . }]},
]
Furthermore, the interaction management system updates the Doc_Meta table as follows:
Doc_Id:D001, Doc_Status:Pending Approval, WaterMark: Pending Approval
Furthermore, the interaction management system updates the User_Doc_Status table as follows:
UserID:Author_01, Doc_Id:D001, StepID: S000, ParallelStepID:null, Dashboard: Seek from Others,
DueDate:< >, IsAnonymous:False, Action: Seek_Approval
UserID:Writer_01, . . . Input_Given
UserID:Writer_02, . . . Locked UserID:MarkHd_01, Doc_Id:D001, StepID: S001, ParallelStepID:null, Dashboard: Seek from Others,
DueDate: Dec. 28 2019, IsAnonymous:False, Action: Give_Approval
UserID: PRagt_01, . . . .
UserID: PRagt_02, . . . .
UserID: Lawyr_01 . . . .

When the marketing head approves(/rejects) and seeks publication, the interaction management system simultaneously aggregates and records request action data and potential response action data in database tables as follows:

Request{WHO:MarkHd_01, DOCID:D0, STEPID:S001. PARALLELSTEPID:null, ACTION: Approved}
Response {WHO:MarkHd_01. DOCID:D001, STEPID: S001, PARALLELSTEPID:null, ACTION: Approved, Edit_doc:Yes, Comment_Doc:Yes, Allowed_Actions{
}
}

Furthermore, the interaction management system updates the Step table as follows:
Step [
{StepID: S000, isComplete: false, PriorStepID: < >, ParallelStepID: null,
Actions[(Who:Author_01,Whom:<   >,Action: ReInitial}]},
{StepID: S000, . . . }]},
{StepID: S000, . . . }]},
{StepID: S001, isComplete: true, PriorStepID: S000, ParallelStepID: null, Actions[
{Who:Author_01, Action: Seek_Approval},
{Who: MarkHd_01, Action: Approved, DueDate: Dec. 28 2019}]},
{{StepID: S01 . . . }]},
{StepID: S001 . . . }]},
{StepID: S001, . . . }]}, Furthermore, the interaction management system updates the Doc_Meta table as follows:
Doc_Id:D001, Doc_Status:Approved, WaterMark: Approved Furthermore, the interaction management system updates the User_Doc_Status table as follows:
UserID:Author_01, Doc_Id:D001, StepID: S000, ParallelStepID:null, Dashboard: Seek from You, DueDate: < >, IsAnonymous:False, Action: Approval_Received
UserID:Writer_01, . . . Input_Given
UserID:Writer_02, . . . Locked
UserID:MarkHd_01, Doc_Id:D001, StepID: S001, ParallelStepID:null, Dashboard: Seek from Others,
DueDate: Dec. 28 2019, IsAnonymous:False, Action: Request_Revision
UserID: PRagt_01, . . . .
UserID: PRagt_02, . . . .
UserID: Lawyr_01, . . . .

When the marketing head approves(/rejects) and seeks publication, the interaction management system simultaneously aggregates and records request action data and potential response action data in database tables as follows:

Request{WHO:Author_01, DOCID:D001, STEPID: S000, PARALLELSTEPID:null, ACTION: Publish}
Response {WHO:Author_01, DOCID:D001, STEPID: S000, PARALLELSTEPID:null, ACTION: Publish, Edit_doc:No, Comment_Doc:No,
Allowed_Actions{ }}

Furthermore, the interaction management system updates the Step table as follows:
Step [
{StepID: S000, isComplete: false, PriorStepID: < >, ParallelStepID: null,
Actions[{Who:Author_01,   Whom:   <   >,Action: Publish}]},
{StepID: S000, . . . }]},
{StepID: S000, . . . }]},
{StepID: S001, . . . }]},
{StepID: S001, . . . }]},
{StepID: S001, . . . }]},
{StepID: S001, . . . }]},
]

Furthermore, the interaction management system updates the Doc_Meta table as follows:
Doc_Id:D001, Doc_Status:Published, WaterMark: Published Furthermore, the interaction management system updates the User_Doc_Status table as follows:
UserID:Author_01, Doc_Id:D001, StepID: S000, ParallelStepID:null, Dashboard: Recent Docs,
DueDate:< >, IsAnonymous:False, Action: Published
UserID:Writer_01 . . . .
UserID:Writer_02 . . . .
UserID:MarkHd_01 . . . .
UserID: PRagt_01 . . . .
UserID: PRagt_02, . . . .
UserID: Lawyr_01, . . . .

The interaction management system tracks and maps the above actions performed along the interaction path of the live document in real time, while transmitting and executing the dynamically generated permission set on the live document, until the live document reaches an intended closure and the comments reach a resolution to generate a re-deployable workflow sequence in real time. The interaction management system allows the writer to save the workflow sequence, for example, in a workflow table of at least one database, for example, a workflow database, as follows:
WorkFLOW{
[WorkFlowID: WF001, DocID: D001, PriorStepID:null, StepID:S000, ParallelStepID:null,
Action:ReInitial]
[WorkFlowID: WF001, DocID: D001, PriorStepID:S000, StepID:S000, ParallelStepID:null,
Action:Seek_Input]
[WorkFlowID: WF001, DocID: D001, PriorStepID:S000, StepID:S001, ParallelStepID:null,
Action:Seek_Approval]
[WorkFlowID: WF001, DocID: D001, PriorStepID:S000. StepID:S001. ParallelStepID:null,
Action:Seek_Assistance]
[WorkFlowID: WF001, DocID: D001. PriorStepID:S000, StepID:S001, ParallelStepID:null,
Action:Seek_Opinion]
}

FIGS. 14A-14D illustrate a database schema comprising metadata that defines what needs to be done for each action performed by a user, according to an embodiment herein. The database schema illustrated in FIGS. 14A-14D is represented in an Action_Meta table of the database. The database schema also defines permission sets comprising the permissible actions the user is allowed to perform on a document, thereby implicitly handling document permissions. For example, the interaction management system performs a lookup of the database schema to generate the permission set comprising permissible actions, for example, edit and comment actions, when a user performs actions such as seeking an input, giving an input, giving an approval, and seeking an optional opinion as illustrated in FIGS. 14A-14D. In another example, the interaction management system generates a permission set comprising a permissible action, for example, a comment only action, when a user performs an action such as giving an opinion as illustrated in FIG. 14C. The database schema further comprises a document state that starts with <null> and cannot be set to <null> once the document state takes another value, for example, seeking approval, approved, etc. The database schema further comprises a dashboard status for each action. When a user is involved in some capacity in document, the dashboard status, based on the user's last action, decides a dashboard section under which the document will be displayed. The latest open action determines the watermark shown on the display interface. For example, when the latest action is "seek approval" or "give approval", the interaction management system assigns a watermark "pending approval" to the document.

FIGS. 15A-15B illustrate a database schema comprising decision rules associated with multiple actions to be performed by a user, according to an embodiment herein. For example, if a current logged in user's action is "seek input", the interaction management system allows the user to perform actions such as "seek input", or "seek approval", or "seek opinion", or "request revision", or "seek assistance", or "publish", etc. In another example, if the current logged in user's action is "give input", the interaction management system permits the user to perform only two actions such as "locked" or "input given". The database schema illustrated in FIGS. 15A-15B is represented in an Allowed_Actions table of the database.

FIG. 16 illustrates a database schema comprising post-processing decision rules for locking a document based on a flag set in the Action_Meta table, according to an embodiment herein. The decision rules state that any user with an action state that is lockable should be "locked". Some request actions, for example, Seek_Approval, require users who have not explicitly completed a response action, for example, Give_Input, to be implicitly locked out to prevent further accidental edits. For example, when a user seeks approval, the interaction management system sets any open actions by other users such as "give input" to "locked". The database schema illustrated in FIG. 16 is represented in a Lock_Conditions table of the database.

FIG. 17 illustrates a database schema comprising post-processing decision rules for cascaded actions based on a flag set in the Action_Meta table, according to an embodiment herein. An approval is cascaded when the approval is forwarded for further approval after the first approval and so on. The database schema illustrated in FIG. 17 is represented in a Cascade_Conditions table of the database. In an embodiment, the interaction management system implements other such post processing mechanisms to provide additional functionalities.

The computer-implemented system and method disclosed herein implement one or more specific computer programs for managing interactions and automatically sequencing a workflow from a live document in real time as disclosed above. The computer-implemented system and method disclosed herein improve the functionality of a document editor and provide an improvement in document collaboration and workflow sequencing technology related to managing interactions and automatically sequencing a workflow from a live document in real time as follows: On implementing the method disclosed herein, the interaction management system simultaneously aggregates and records request action data and potential response action data through an actionable element, for example, a uniform resource locator (URL). Then, through the use of separate and autonomous computer programs and based on a correlation between the actions extracted from the request action data and the potential response action data and the codified decision rules in the database, the interaction management system dynamically generates a permission set comprising permissible actions on the live document and on comments and regions within the live document; automatically determines an anonymity requirement from the request action data and the potential response action data; and contextually anonymizes the participants invoked to act on the live document based on the anonymity requirement as disclosed in the detailed description of FIG. 1. Moreover, the interaction management system tracks and maps the actions performed along the interaction path of the live document in real time, while transmitting and executing the dynamically generated permission set on the live document, until the live document reaches an intended closure and the comments reach a resolution to generate a re-deployable workflow sequence in real time. The interaction management system captures the workflow sequence in real time and deploys the captured workflow sequence during runtime. The interaction management system anticipates and accommodates every conceivable type of the request actions into the permission set. Furthermore, the interaction management system continuously tracks and displays a status and a progress of the live document on a dashboard through the actionable element. Furthermore, the interaction management system distributes multiple controls on the regions of the live document in a suggest mode in a pre-publication stage of the live document and in a consumption mode in a post-publication stage of the document. Furthermore, the interaction management system generates and renders a unified dashboard configured to chronologically display document information, the request actions, and the response actions on a priority basis on the display interface for focusing the attention of the participants.

The focus of the computer-implemented system and method disclosed herein is on an improvement to document collaboration and workflow sequencing technology and computer functionalities for managing interactions and automatically sequencing a workflow from a live document in real time, and not on tasks for which a generic computer is used in its ordinary capacity. Rather, the computer-implemented system and method disclosed herein are directed to a specific improvement to the way processors in the system operate, embodied in, for example, dynamically generating a permission set comprising permissible actions on the live document and on comments and regions within the live document; automatically determining an anonymity requirement from the request action data and the potential response action data and contextually anonymizing the participants invoked to act on the live document based on the anonymity requirement; and tracking and mapping the actions performed along the interaction path of the live document in real time, while transmitting and executing the dynamically generated permission set on the live document, until the live document reaches an intended closure and the comments reach a resolution to generate a re-deployable workflow sequence in real time.

In the computer-implemented method disclosed herein, the design and the flow of data and interactions within the document editor embedded with the interaction management system are deliberate, designed, and directed. The interactions between the participants on a live document within the document editor allow the interaction management system to manage interactions and automatically sequence a workflow from the live document in real time. The method steps performed by the interaction management system disclosed above require seven or more separate computer programs and subprograms, the execution of which cannot be performed by a person using a generic computer with a generic program. The method steps performed by the interaction management system disclosed above are tangible, provide useful results, and are not abstract. The hardware and software implementation of the interaction management system disclosed herein and one or more processors is an improvement in document collaboration and workflow sequencing technology.

Figure 18:
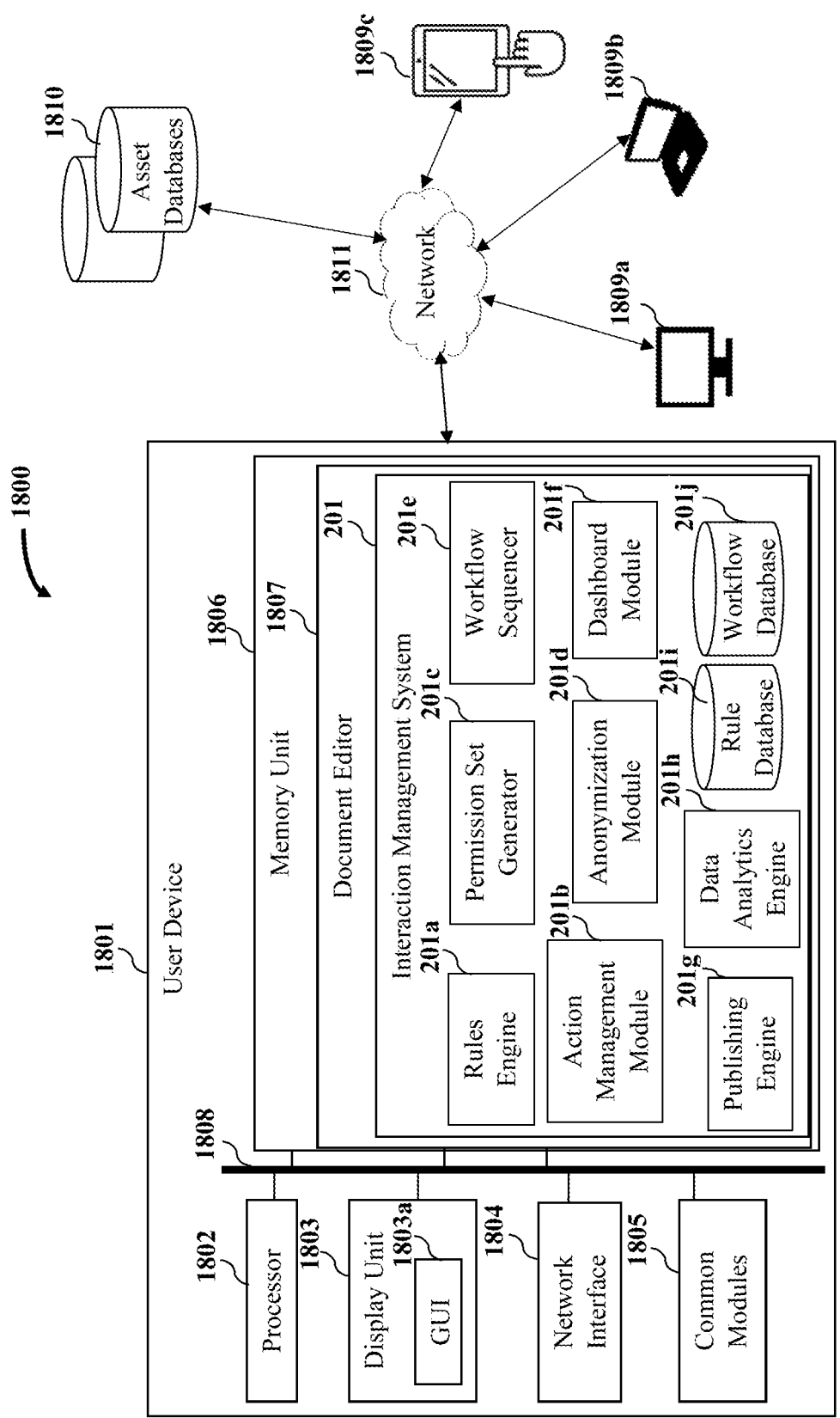
FIG. 18 illustrates an architectural block diagram of a system for managing interactions and automatically sequencing a workflow from a live document in real time, according to an embodiment herein.

FIG. 18 illustrates an architectural block diagram of a system 1800 for managing interactions and automatically sequencing a workflow from a live document in real time, according to an embodiment herein. In an embodiment, the system 1800 disclosed herein comprises the interaction management system 201 embedded within a document editor 1807 deployed in a user device 1801. In an embodiment, the document editor 1807 with the embedded interaction management system 201 is executed in a browser cache. The user device 1801 is a computer system programmable using high-level computer programming languages. The user device 1801 is, for example, one or more of a personal computer, a tablet computing device, a mobile computer, a mobile phone, a smart phone, a portable computing device, a laptop, a personal digital assistant, a touch centric device, a workstation, a server, a client device, a portable electronic device, a network enabled computing device, an interactive network enabled communication device, any other suitable computing equipment, combinations of multiple pieces of computing equipment, etc. The user device 1801 communicates with other user devices, for example, 1809a, 1809b, and 1809c via a network 1811, for example, a short-range network or a long-range network. The network 1811 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the interaction management system 201 is implemented in the user device 1801 using programmed and purposeful hardware. In an embodiment, the interaction management system 201 is implemented in a cloud computing environment. As used herein, "cloud computing environment" refers to a processing environment comprising configurable computing physical and logical resources, for example, networks, servers, storage media, virtual machines, applications, services, cloud databases such as asset databases 1810, etc., and data distributed over the network 1811. The cloud computing environment provides an on-demand network access to a shared pool of the configurable computing physical and logical resources. In an embodiment, the interaction management system 201 is a cloud computing-based platform implemented as a service for managing interactions and automatically sequencing a workflow from a live document in real time. In another embodiment, the interaction management system 201 is implemented as an on-premise platform, for example, an enterprise publishing platform, comprising on-premise software installed and run on client systems on the premises of an organization.

As illustrated in FIG. 18, the user device 1801 comprises a non-transitory, computer-readable storage medium, for example, a memory unit 1806 for storing computer program instructions defined by the document editor 1807 and modules, for example, 201a through 201j, of the interaction management system 201. As used herein, "non-transitory, computer-readable storage medium" refers to all computer-readable media, for example, non-volatile media, volatile media, and transmission media, except for a transitory, propagating signal. Non-volatile media comprise, for example, solid state drives, optical discs or magnetic disks, flash memory cards, a read-only memory (ROM), etc. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to a processor 1802. The user device 1801 further comprises a processor 1802 operably and communicatively coupled to the memory unit 1806. The memory unit 1806 is used for storing program instructions, applications, and data. In an embodiment, the memory unit 1806 is a random-access memory (RAM) or another type of dynamic storage device that stores information and instructions for execution by the processor 1802. The memory unit 1806 also stores temporary variables and other intermediate information used during execution of the instructions by the processor 1802. In an embodiment, the user device 1801 further comprises a read only memory (ROM) or other types of static storage devices that store static information and instructions for execution by the processor 1802. In an embodiment, the modules, for example, 201a through 201j, of the interaction management system 201 are stored in the memory unit 1806.

The processor 1802 is configured to execute the computer program instructions defined by the modules, for example, 201a through 201j, of the interaction management system 201 for managing interactions and automatically sequencing a workflow from a live document in real time. The processor 1802 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 1802 is implemented as a processor set comprising, for example, a programmed microprocessor and a math or graphics co-processor. The interaction management system 201 is not limited to employing the processor 1802. In an embodiment, the interaction management system 201 employs a controller or a microcontroller.

As illustrated in FIG. 18, the user device 1801 further comprises a data bus 1808, a display unit 1803, a network interface 1804, and common modules 1805. The data bus 1808 permits communications between the modules, for example, 1802, 1803, 1804, 1805, and 1806 of the user device 1801. The display unit 1803, via a graphical user interface (GUI) 1803a, displays information, images, display interfaces, user interface elements such as checkboxes, input text fields, etc., for example, for allowing participants to perform seek actions and give actions on the live document, edit the live document, enter comments, edit the comments, etc., through the document editor 1807. The document editor 1807 renders display interfaces, that is, application interfaces, on the GUI 1803a of the display unit 1803 for receiving selections, data, digital assets, etc., from the participants. The GUI 1803a comprises, for example, an online web interface, a web-based downloadable application interface, a mobile-based downloadable application interface, etc. The display unit 1803 displays the GUI 1803a.

The network interface 1804 enables connection of the document editor 1807 embedded with the interaction management system 201 in the user device 1801 to the network 1811. In an embodiment, the network interface 1804 is provided as an interface card also referred to as a line card. The network interface 1804 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 1805 of the user device 1801 comprise, for example, an input/output (I/O) controller, input devices, output devices, fixed media drives such as hard drives, removable media drives for receiving removable media, etc. Computer applications and programs are used for operating the interaction management system 201. The programs are loaded onto fixed media drives and into the memory unit 1806 via the removable media drives. In an embodiment, the computer applications and programs are loaded into the memory unit 1806 directly via the network 1811.

In an exemplary implementation illustrated in FIG. 18, the interaction management system 201 comprises a rules engine 201a, an action management module 201b, a permission set generator 201c, an anonymization module 201d, a workflow sequencer 201e, a dashboard module 201f, a publishing engine 201g, a data analytics engine 201h, a rule database 201i, and a workflow database 201j, stored in the memory unit 1806 and executed by the processor 1802 in the user device 1801. The rules engine 201a defines codified decision rules associated with multiple actions, that is, request actions and response actions, to be performed on the live document by multiple participants for generating a workflow sequence independent of a role of each of the participants. The rule database 201i stores the codified decision rules. On receiving one of the request actions from one of the participants from within the live document, the action management module 201b generates an actionable element for execution of one or more of the response actions corresponding to one of the request actions by another one or more of the participants. In an embodiment, the action management module 201b, in communication with the rules engine 201a, simultaneously aggregates and records request action data and potential response action data through the actionable element. The permission set generator 201c, in communication with the action management module 201b, anticipates and accommodates every conceivable type of the request actions into the permission set. In an embodiment, the action management module 201b automatically derives consequential actions from the request actions and the response actions for selection by the participants via a display interface. In an embodiment, the action management module 201b selectively displays comments in the live document to another one or more of the participants based on a type of each of the actions. In an embodiment, the action management module 201b distributes multiple controls, for example, a visibility control, an editability control, mandatory response options, a word limit control, etc., on the regions of the live document in a suggest mode in a pre-publication stage of the live document and in a consumption mode in a post-publication stage of the document as disclosed in the detailed description of FIG. 1. In an embodiment, the interaction management system 201 allows participants to access asset databases 1810 via the network 1811 to retrieve and insert digital assets stored therein, into the live document.

Based on a correlation between the actions extracted from the request action data and the potential response action data and the codified decision rules in the rule database 201i, the permission set generator 201c dynamically generates a permission set comprising permissible actions on the live document and on comments and regions within the live document. Furthermore, based on a correlation between the actions extracted from the request action data and the potential response action data and the codified decision rules in the rule database 201i, the anonymization module 201d automatically determines an anonymity requirement from the request action data and the potential response action data and contextually anonymizes the participants invoked to act on the live document based on the anonymity requirement. The anonymity requirement is based on a type of the request actions, for example, seeking an opinion extracted from the request action data. In an embodiment, the anonymization module 201d automatically differentiates between multiple anonymity levels comprising a user-to-user anonymity level and a user input-to-user input anonymity level, while allowing selective de-anonymization of the participants addressed to act on the live document based on preferences of the participants.

The permission set generator 201c transmits the dynamically generated permission set comprising the permissible actions for each stage along the interaction path of the live document. The workflow sequencer 201e tracks and maps the actions performed along the interaction path of the live document in real time, while transmitting and executing the dynamically generated permission set on the live document, until the live document reaches an intended closure and the comments reach a resolution to generate a re-deployable workflow sequence in real time. In an embodiment, the workflow sequencer 201e prompts the participants to enter a response time via a calendar interface rendered on the GUI 1803 by the interaction management system 201 during the tracking of the actions performed along the interaction path of the live document in real time. In an embodiment, the workflow sequencer 201e generates and renders a stepwise representation of the re-deployable workflow sequence on a display interface rendered on the GUI 1803a. The workflow database 201j stores the re-deployable workflow sequence. In an embodiment, the workflow sequencer 201e determines and renders workflow sequences analogous to the re-deployable workflow sequence in communication with the workflow database 201*j* for deployment by users.

In an embodiment, the dashboard module 201*f*, in communication with the workflow sequencer 201*e*, continuously tracks and displays a status and a progress of the live document on a dashboard through the actionable element. The actionable element is configured to render the live document in a conference mode on the dashboard by integrating multiple communication components within the document editor 1807 in a single application environment. In an embodiment, the dashboard module 201*f* generates and renders a unified dashboard configured to chronologically display document information, the request actions, and the response actions on a priority basis on the display interface as disclosed in the detailed description of FIG. 1. The dashboard module 201*f* configures the unified dashboard to focus the attention of each of the participants. The publishing engine 201*g* integrates multiple publication gateways, for example, a template center, a quarantined private archive, a public network, a private network, etc., within the document editor 1807 for publishing the live document. In an embodiment, the data analytics engine 201*h* implements artificial intelligence and machine learning for automatically generating a contribution summary by performing data analytics on quantitative contributions by the participants, for example, time spent, bytes entered, response time, assets brought in, types of participation, etc., that are deduced and summarized as disclosed in the detailed description of FIG. 1.

The rule database 201*i* and the workflow database 201*j* refer to any storage area or media that can be used for storing data, images, and files. In an embodiment, the rule database 201*i* and the workflow database 201*j* can be any of a structured query language (SQL) data store or a not only SQL (NoSQL) data store. In another embodiment, the rule database 201*i* and the workflow database 201*j* are locations on a file system. In another embodiment, the rule database 201*i* and the workflow database 201*j* are configured to be remotely accessible by the interaction management system 201 in the user device 1801 via the network 1811. In another embodiment, the rule database 201*i* and the workflow database 201*j* are configured as cloud-based databases implemented in a cloud computing environment. In another embodiment, the rule database 201*i* and the workflow database 201*j* are encrypted to maintain security of the decision rules and workflow sequences respectively.

The rules engine 201*a*, the action management module 201*b*, the permission set generator 201*c*, the anonymization module 201*d*, the workflow sequencer 201*e*, the dashboard module 201*f*, the publishing engine 201*g*, the data analytics engine 201*h*, the rule database 201*i*, and the workflow database 201*j* are disclosed above as software executed by the processor 1802. In an embodiment, the modules, for example, 201*a* through 201*j*, of the interaction management system 201 are implemented completely in hardware. In another embodiment, the modules, for example, 201*a* through 201*j*, of the interaction management system 201 are implemented by logic circuits to carry out their respective functions disclosed above. In another embodiment, the interaction management system 201 is also implemented as a combination of hardware and software and one or more processors, for example, 1802, that are used to implement the modules, for example, 201*a* through 201*j*, of the interaction management system 201.

For purposes of illustration, the detailed description refers to the modules, for example, 201*a* through 201*j*, of the interaction management system 201 being run locally on a single computer system; however the scope of the computer-implemented system 1800 and method 1800 disclosed herein is not limited to the modules, for example, 201*a* through 201*j*, of the interaction management system 201 being run locally on a single computer system via the operating system and the processor 1802, but may be extended to run remotely over the network 1811 by employing a web browser and a remote server, a mobile phone, or other electronic devices. In an embodiment, one or more portions of the system 1800 disclosed herein are distributed across one or more computer systems (not shown) coupled to the network 1811.

The non-transitory, computer-readable storage medium disclosed herein stores computer program instructions executable by the processor 1802 for managing interactions and automatically sequencing a workflow from a live document in real time. The computer program instructions implement the processes of various embodiments disclosed above and perform additional steps that may be required and contemplated for managing interactions and automatically sequencing a workflow from a live document in real time. When the computer program instructions are executed by the processor 1802, the computer program instructions cause the processor 1802 to perform the steps of the method for managing interactions and automatically sequencing a workflow from a live document in real time as disclosed in the detailed description of FIG. 1. In an embodiment, a single piece of computer program code comprising computer program instructions performs one or more steps of the computer-implemented method disclosed in the detailed description of FIG. 1. The processor 1802 retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, Java®, JavaScript®, a hypertext markup language (HTML), etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 19:
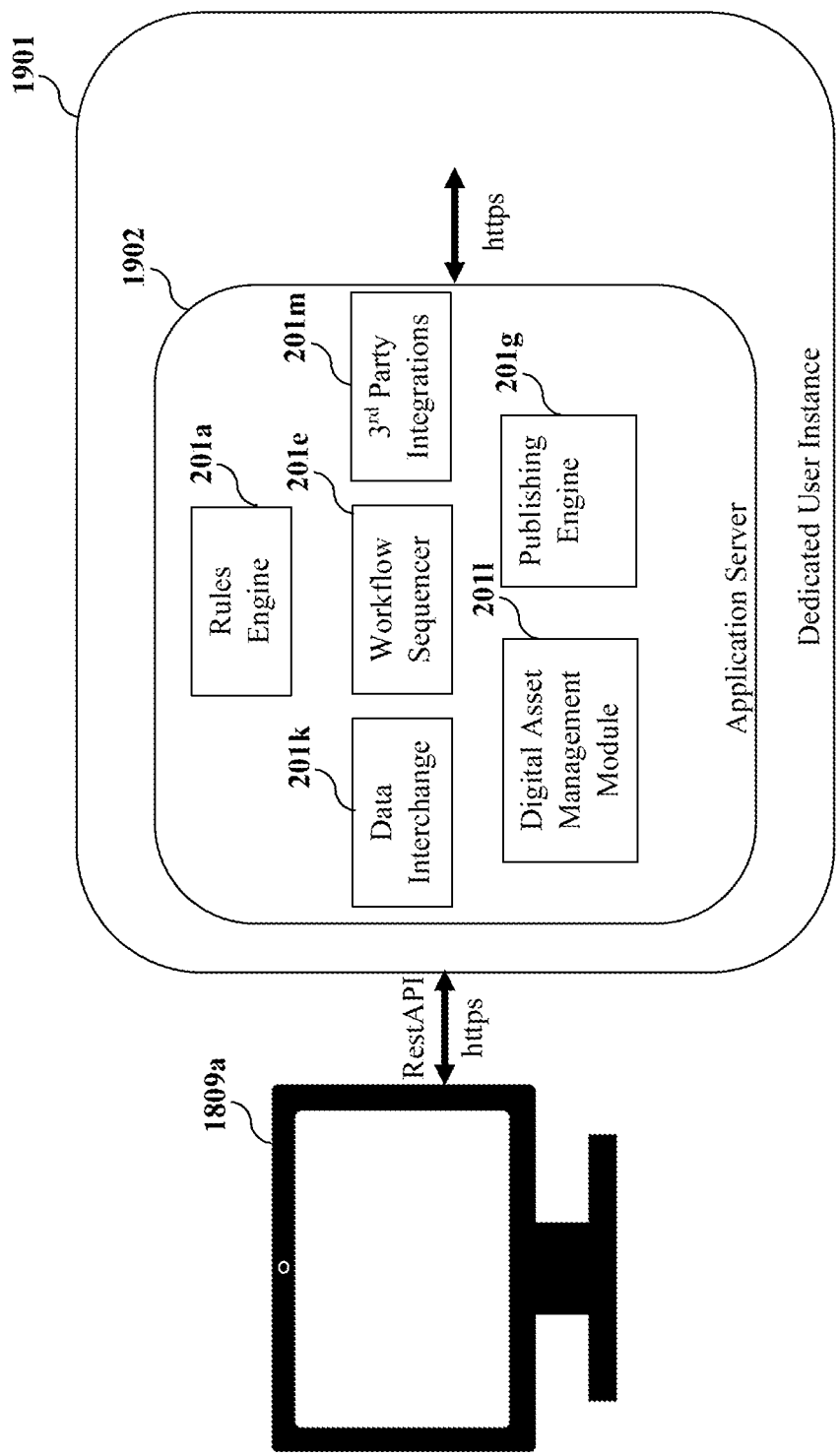
FIG. 19 illustrates a block diagram showing a dedicated user instance of the system for managing interactions and automatically sequencing a workflow from a live document in real time, according to an embodiment herein.

FIG. 19 illustrates a block diagram showing a dedicated user instance 1901 of the system 1800 shown in FIG. 18, for managing interactions and automatically sequencing a workflow from a live document in real time, according to an embodiment herein. In an embodiment, the components of the interaction management system 201 illustrated in FIG.

18, are implemented on an application server 1902. A user device 1809*a* communicates with the application server 1902 via a network, for example, the internet, using representational state transfer (REST) application programming interfaces (APIs). FIG. 19 illustrates a dedicated user instance 1901 of the system 1800, according to an embodiment herein. As illustrated in FIG. 19, the rules engine 201*a*, the workflow sequencer 201*e*, and the publishing engine 201*g* are implemented in the application server 1902. In an embodiment, the application server 1902 implements data interchange operations 201*k*, third party integrations 201*m*, and a digital asset management module 2011. The digital asset management module 2011 manages live documents and other digital assets incorporated by multiple participants in the live documents. The digital asset management module 2011 archives digital assets, for example, documents, images, data, video, audio, etc., that an individual user brings into a project into an institutional digital asset management system and makes the digital assets search-discoverable for subsequent use by other users.

In an embodiment, the application server 1902 provides a responsive asynchronous user interface to the participants for interacting with live documents. In an embodiment, the interaction management system 201 embedded in the document editor 1807 shown in FIG. 18, is compliant with open web application security project (OWASP) standards for providing high security standards. In an embodiment, the application server 1902 implements authorization protocols, for example, an oAuth2 protocol for rendering limited access to user accounts associated with the interaction management system 201 on a hypertext transfer protocol (HTTP) service. In an embodiment, the application server 1902 implements authentication protocols, for example, a security assertion markup language (SAML) for allowing identity providers to exchange authorization credentials with service providers.

Figure 20A:
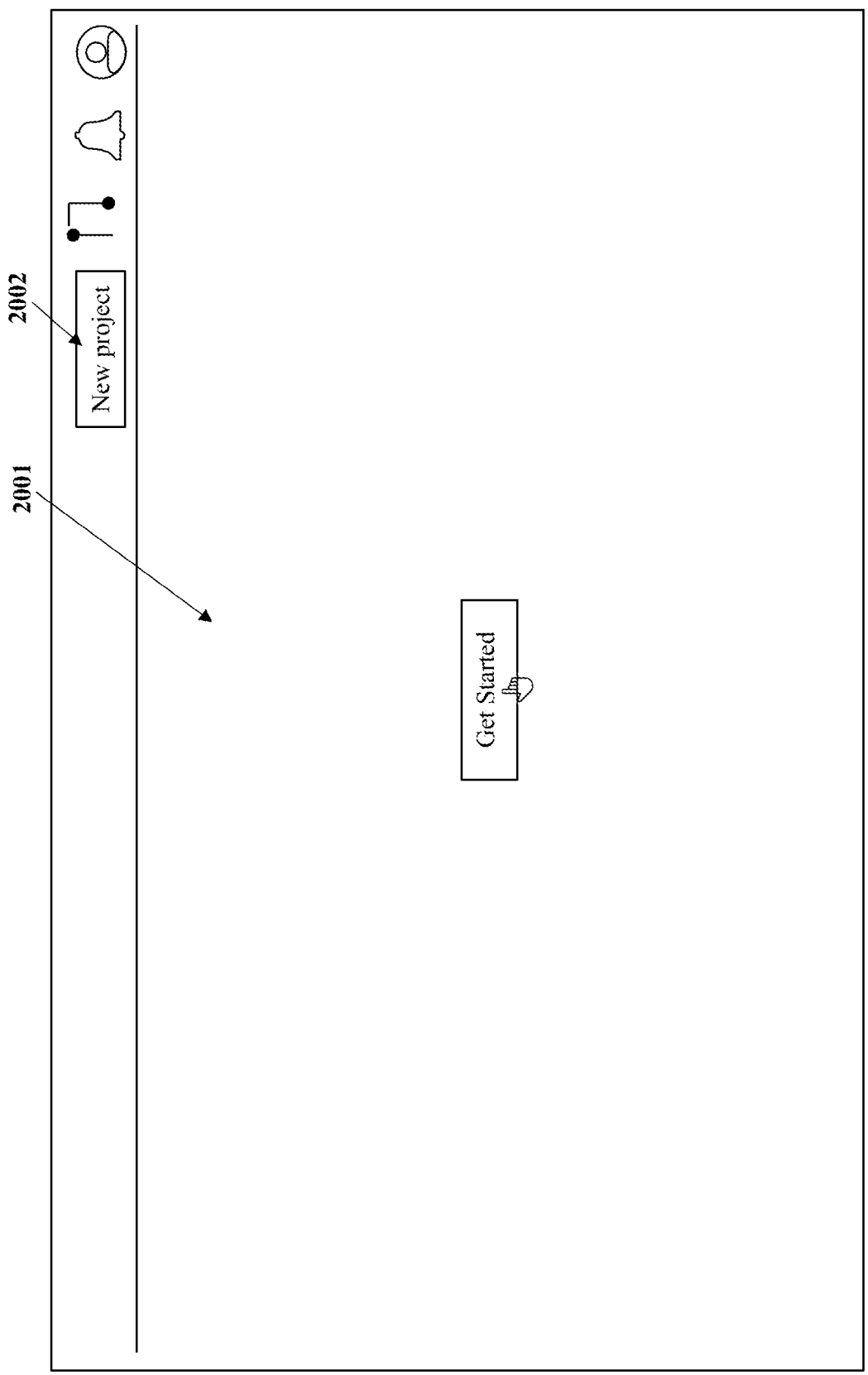
FIGS. 20A-26X illustrate screenshots of display interfaces rendered by the interaction management system for managing interactions associated with any request action and automatically sequencing a workflow from a live document in real time, according to an embodiment herein.
Figure 20B:
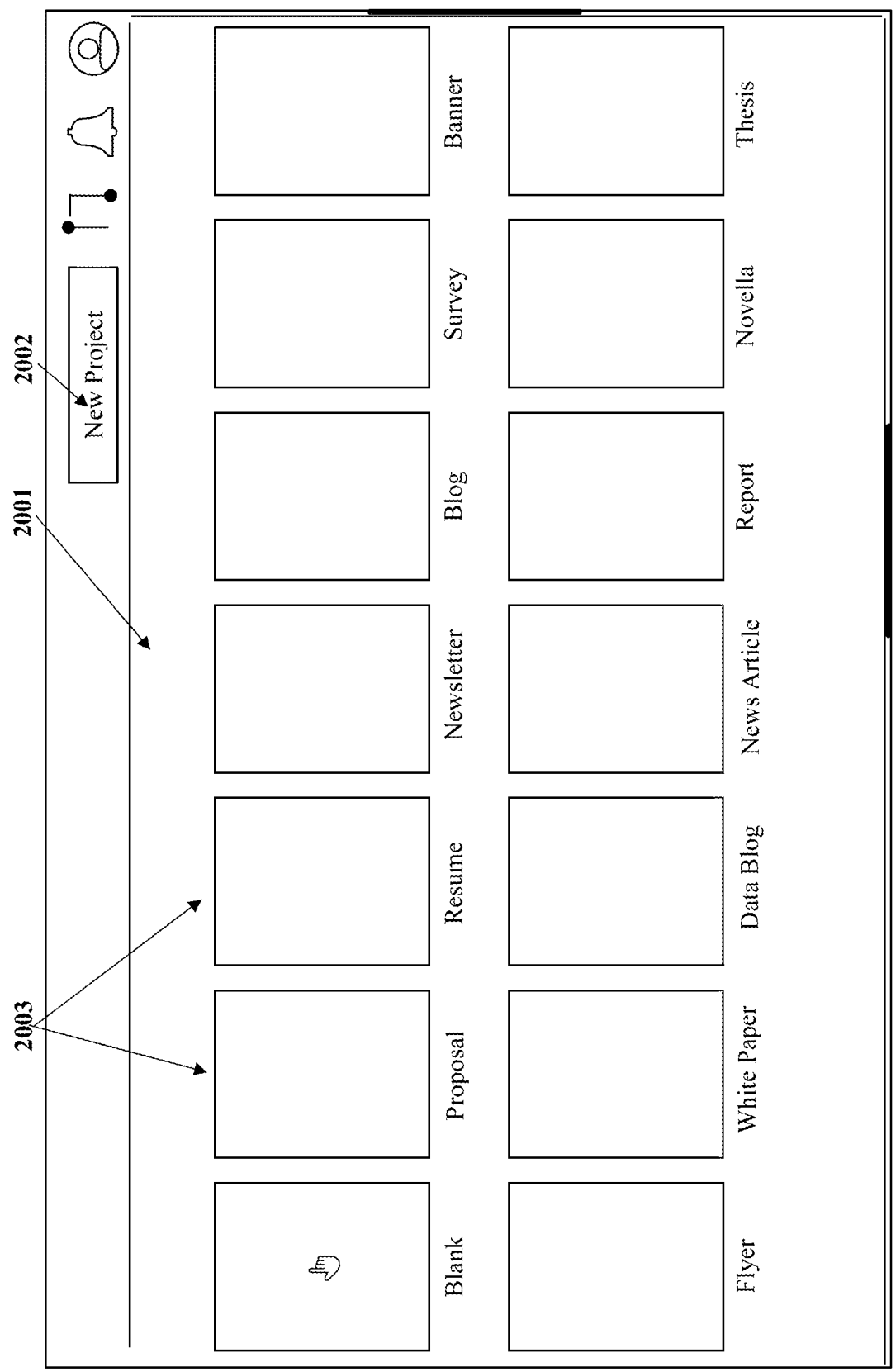

FIGS. 20A-26X illustrate screenshots of display interfaces rendered by the interaction management system for managing interactions associated with any request action and automatically sequencing a workflow from a live document in real time, according to an embodiment herein. When a user first logs into his or her user account registered with the interaction management system, for example, using an email address and a password, the interaction management system embedded in the document editor renders a dashboard 2001 on a display interface as illustrated in FIG. 20A. The dashboard 2001 allows the user to start a new project by activating an interface element, for example, a "New Project" button 2002 on the dashboard 2001. When the user clicks the "New Project" button 2002 on the dashboard 2001, the interface management system displays thumbnails 2003 representing multiple file types on the dashboard 2001 as illustrated in FIG. 20B. The file types comprise, for example, a blank document file type, a proposal file type, a resume file type, a newsletter file type, a blog file type, a survey file type, a banner file type, a flyer file type, a white paper file type, a data blog file type, a news article file type, a report file type, a novella file type, a thesis file type, etc. The interaction management system, therefore, allows a user to start or create a new document, for example, a blank document, a proposal, a resume, a newsletter, a blog, a survey, a banner, a flyer, a white paper, a data blog, a news article, a report, a novella, a thesis, etc., via the document editor by selecting one of the file types.

Figure 21A:
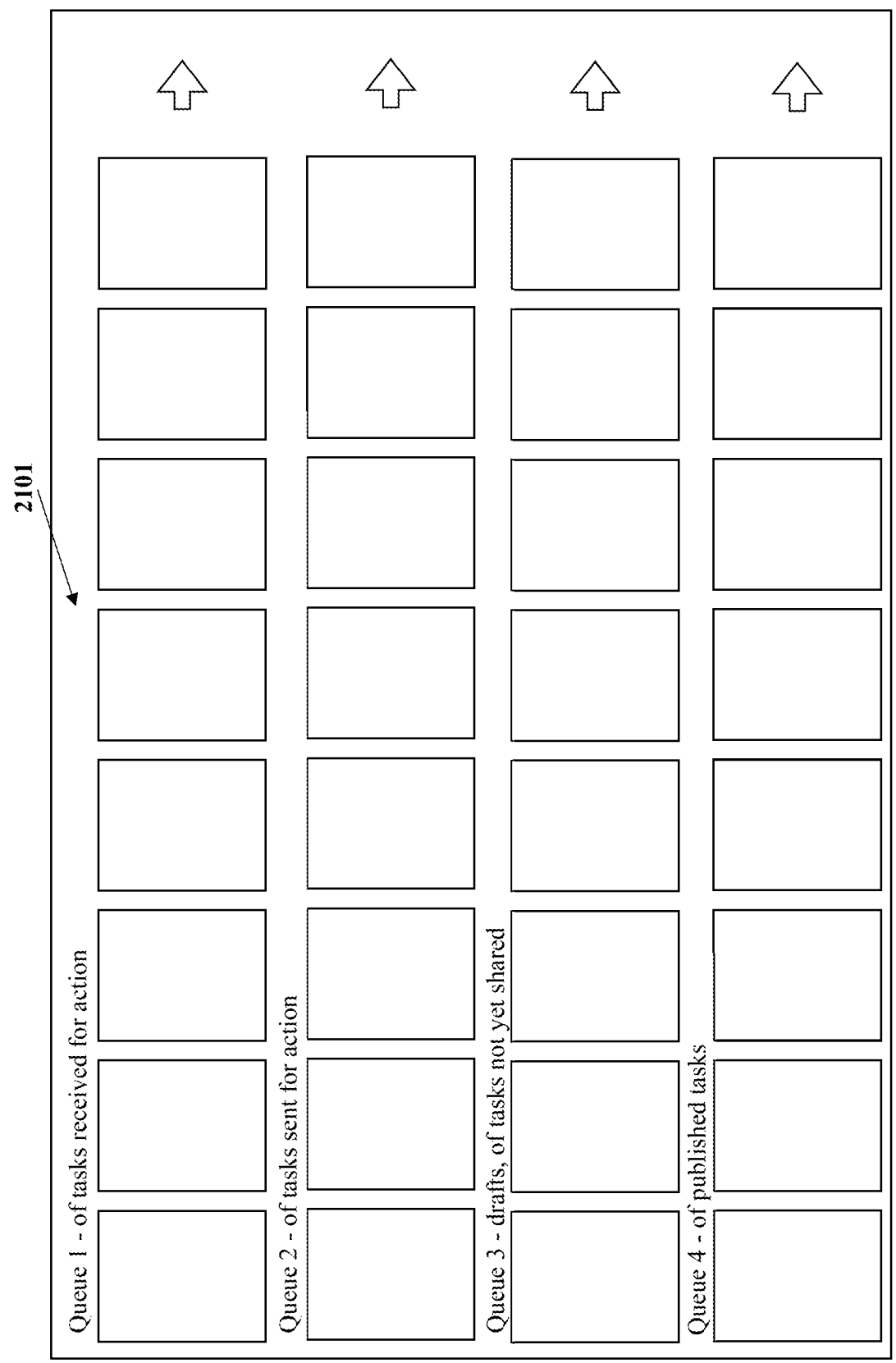
Figure 21B:
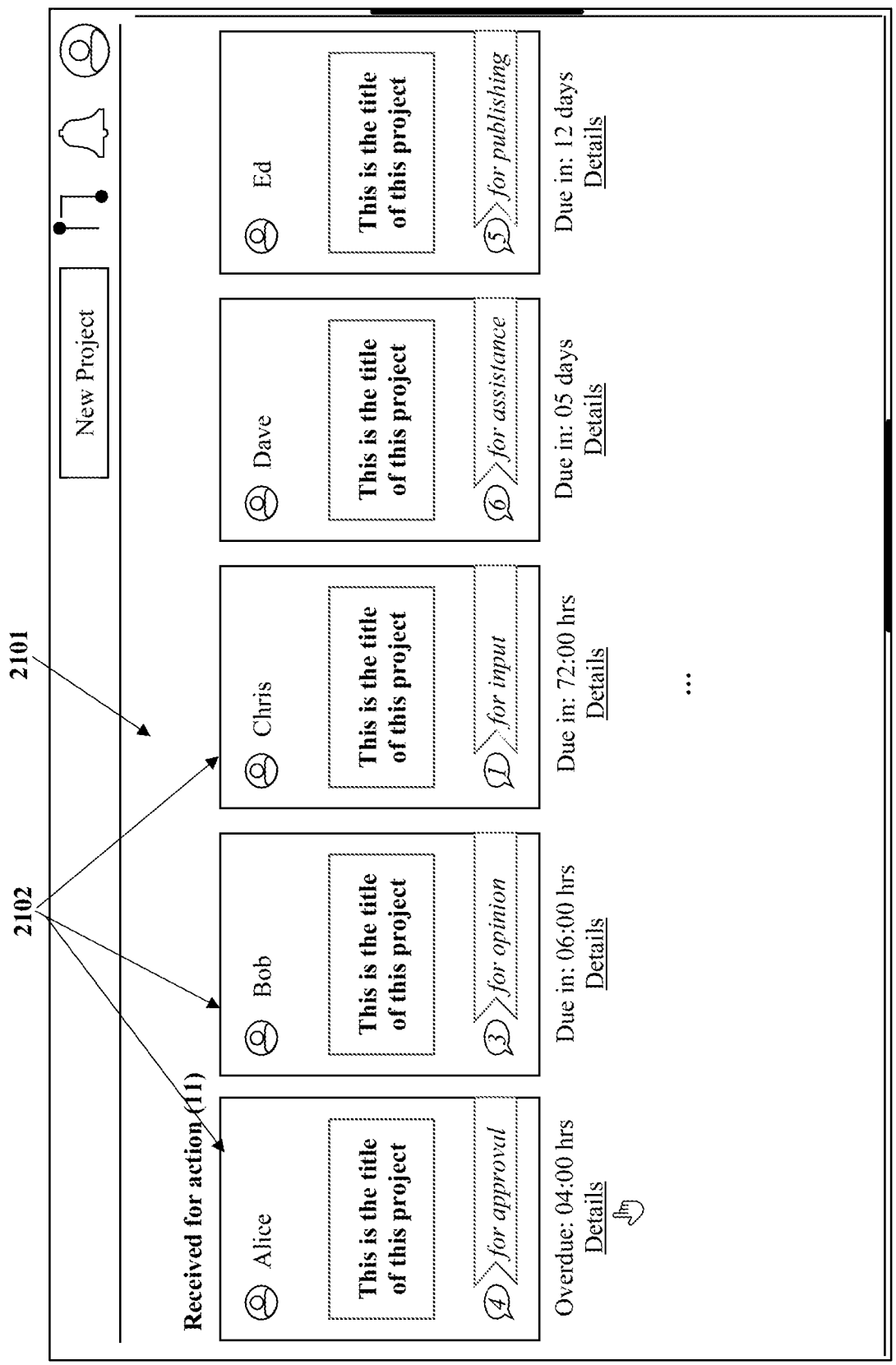

The interaction management system also renders multiple deadline-justified job queues on a unified dashboard 2101 as illustrated in FIG. 21A. The unified dashboard 2101 chronologically displays document information, request actions, and response actions on a priority basis. For example, the unified dashboard 2101 displays a queue 1 comprising tasks received for action by the user, a queue 2 comprising tasks sent for action by the user, a queue 3 comprising drafts of tasks yet to be shared by the user with other participants, a queue 4 comprising published tasks, etc. In an embodiment, the tasks refer to the live documents or projects on which the user performs request actions and/or response actions. When the user selects queue 1 on the unified dashboard 2101, the unified dashboard 2101 displays document thumbnails 2102 of the tasks received for action by the user from other users, in a queue, as illustrated in FIG. 21B. For example, the unified dashboard 2101 displays document thumbnails 2102 of live documents received by the user from other users who are seeking approval, seeking an opinion, seeking an input, seeking an assistance, seeking publication, etc., from the user. Each document thumbnail provides detailed document information comprising, for example, name of a sender, an indicator indicating a single document or multiple documents, a title of the document, a deadline for performing a response action, the response action needed, number of comments pending action, etc.

Figure 21C:
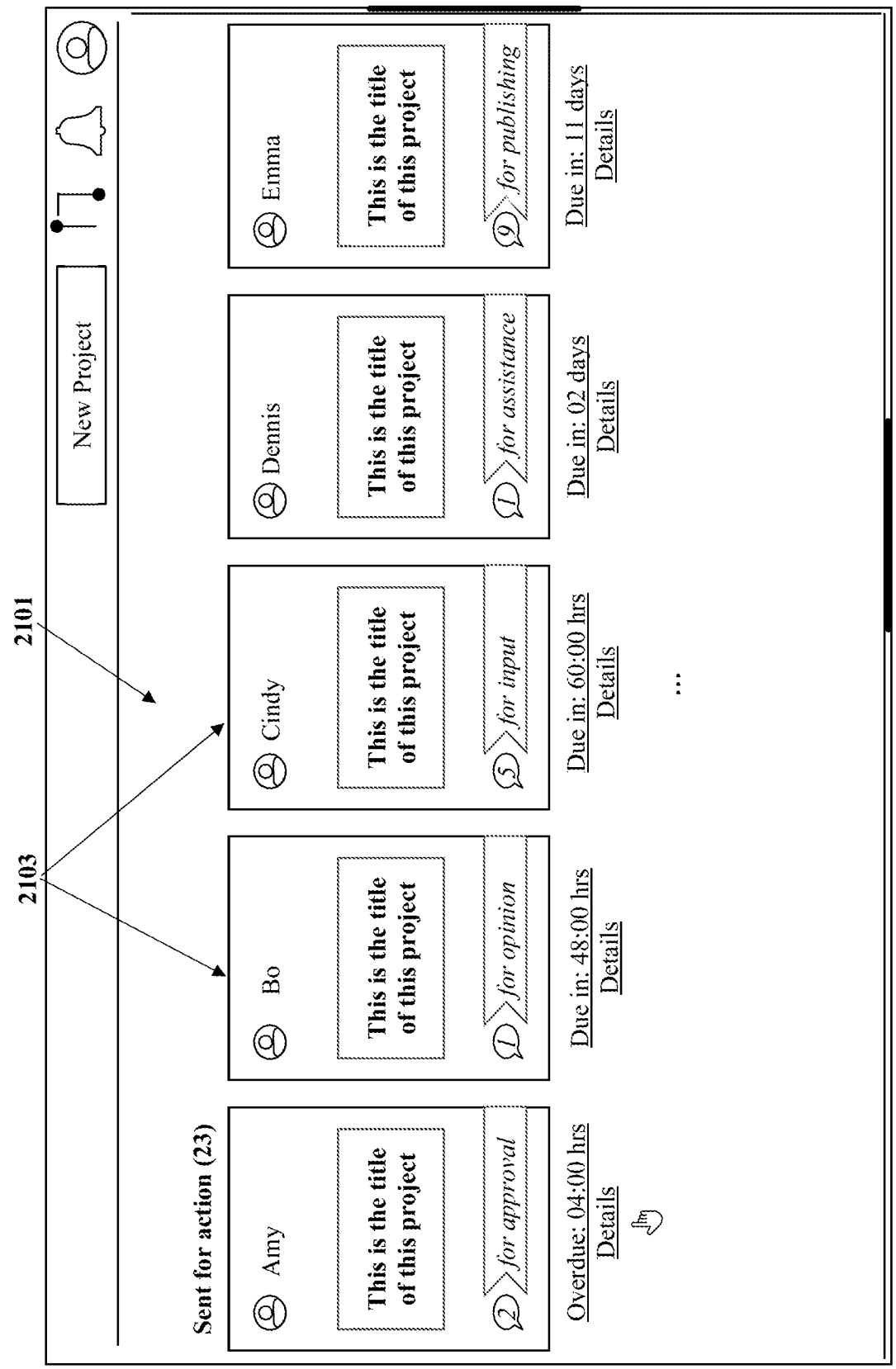
Figure 21D:
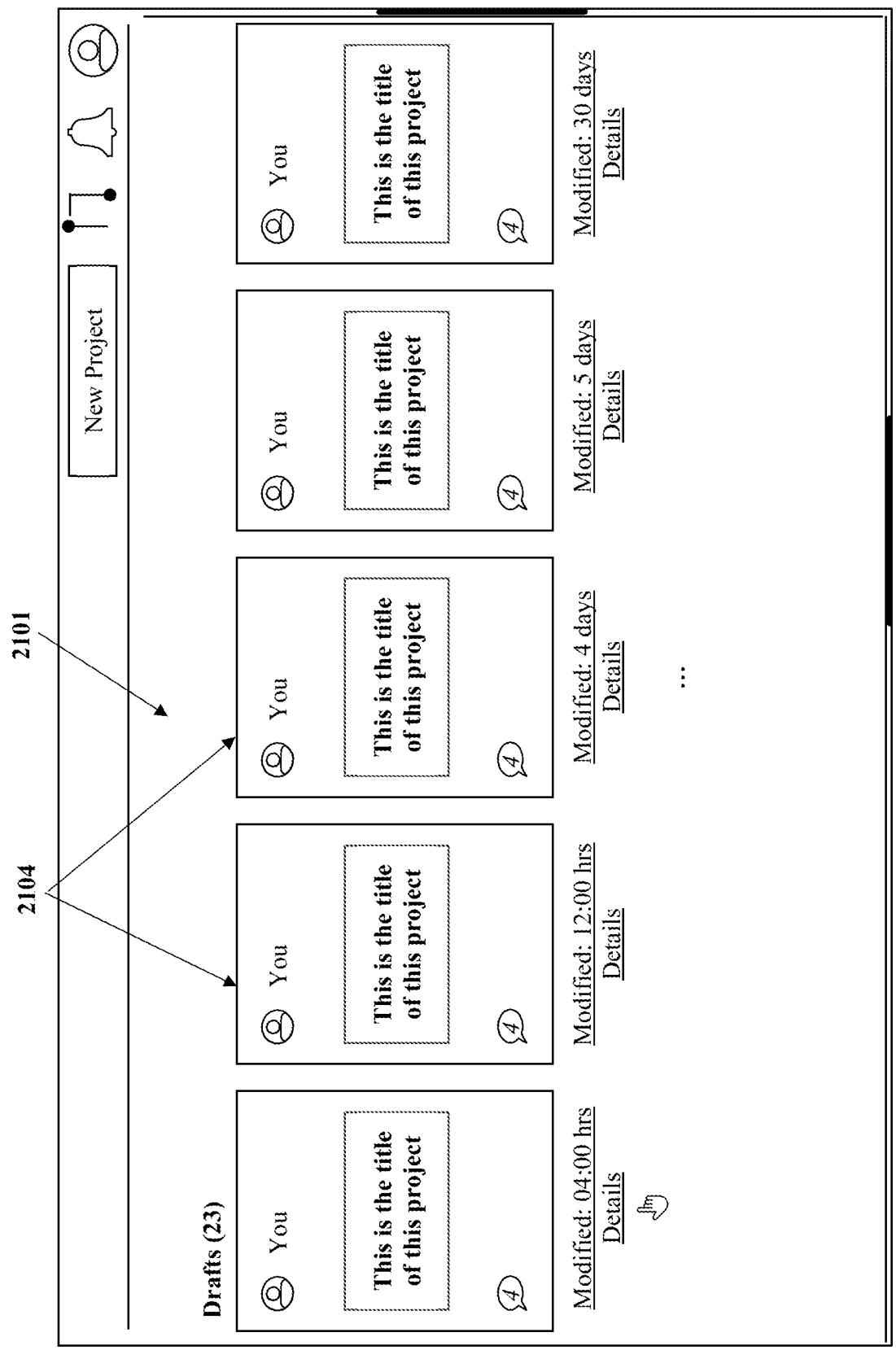
Figure 21E:
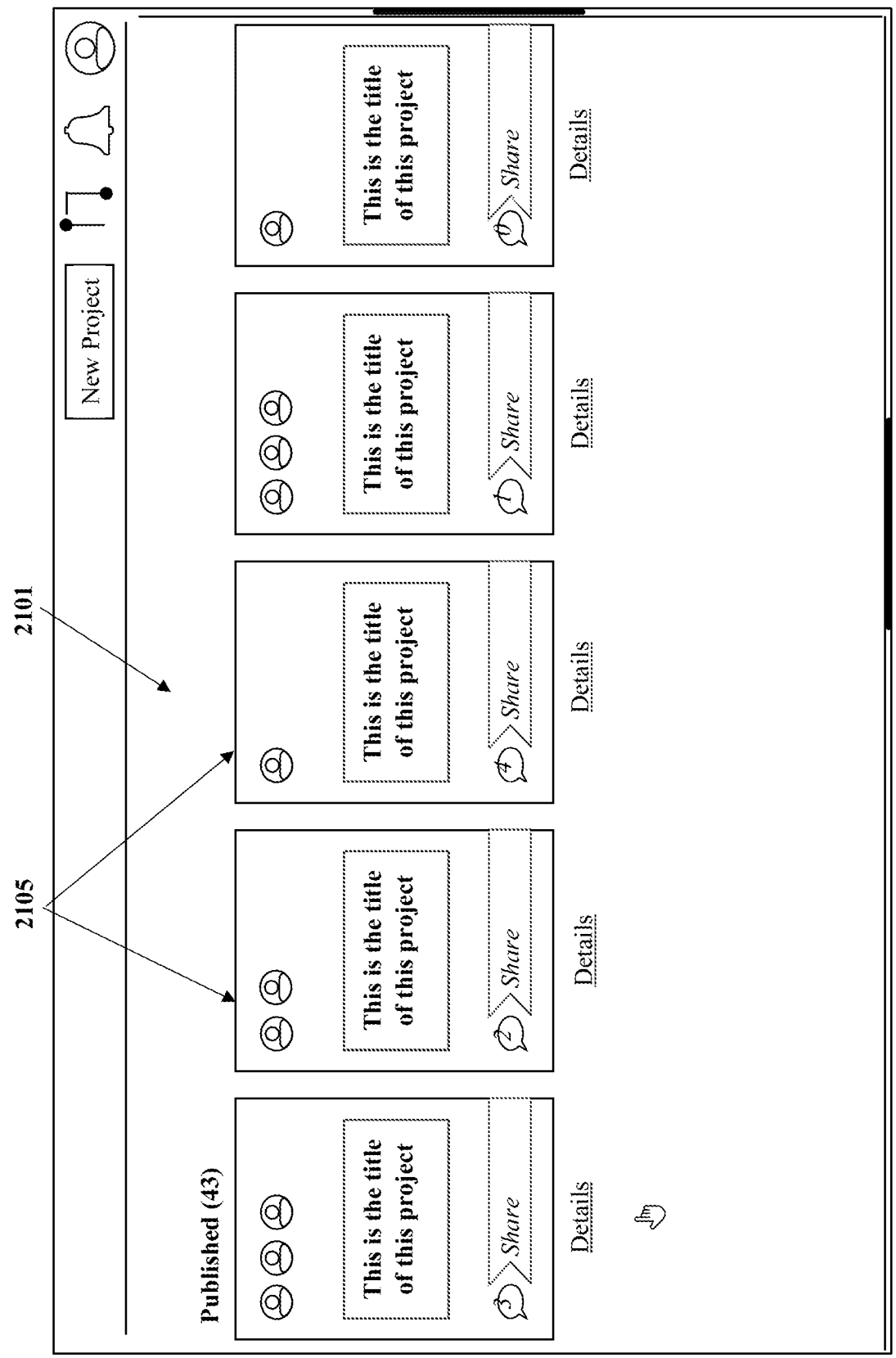

When the user selects queue 2 on the unified dashboard 2101 illustrated in FIG. 21A, the unified dashboard 2101 displays document thumbnails 2103 of the tasks sent for action by the user to other users, in a queue, as illustrated in FIG. 21C. For example, the unified dashboard 2101 displays document thumbnails 2103 of live documents sent by the user to other users for approval, for an opinion, for an input, for assistance, for publishing, etc. Each document thumbnail provides detailed document information comprising, for example, name of a sender, a title of the document, a deadline for receiving a response action, the response action needed, number of comments pending action, etc. When the user selects queue 3 on the unified dashboard 2101 illustrated in FIG. 21A, the unified dashboard 2101 displays document thumbnails 2104 of the drafts of the tasks or live documents that are created and yet to be shared by the user with other participants, in a queue, as illustrated in FIG. 21D. Each document thumbnail provides detailed document information comprising, for example, name of the user, a title of the document, time of modification, details, etc. When the user selects queue 4 on the unified dashboard 2101 illustrated in FIG. 21A, the unified dashboard 2101 displays document thumbnails 2105 of the published tasks or projects in a queue as illustrated in FIG. 21E.

Figure 22A:
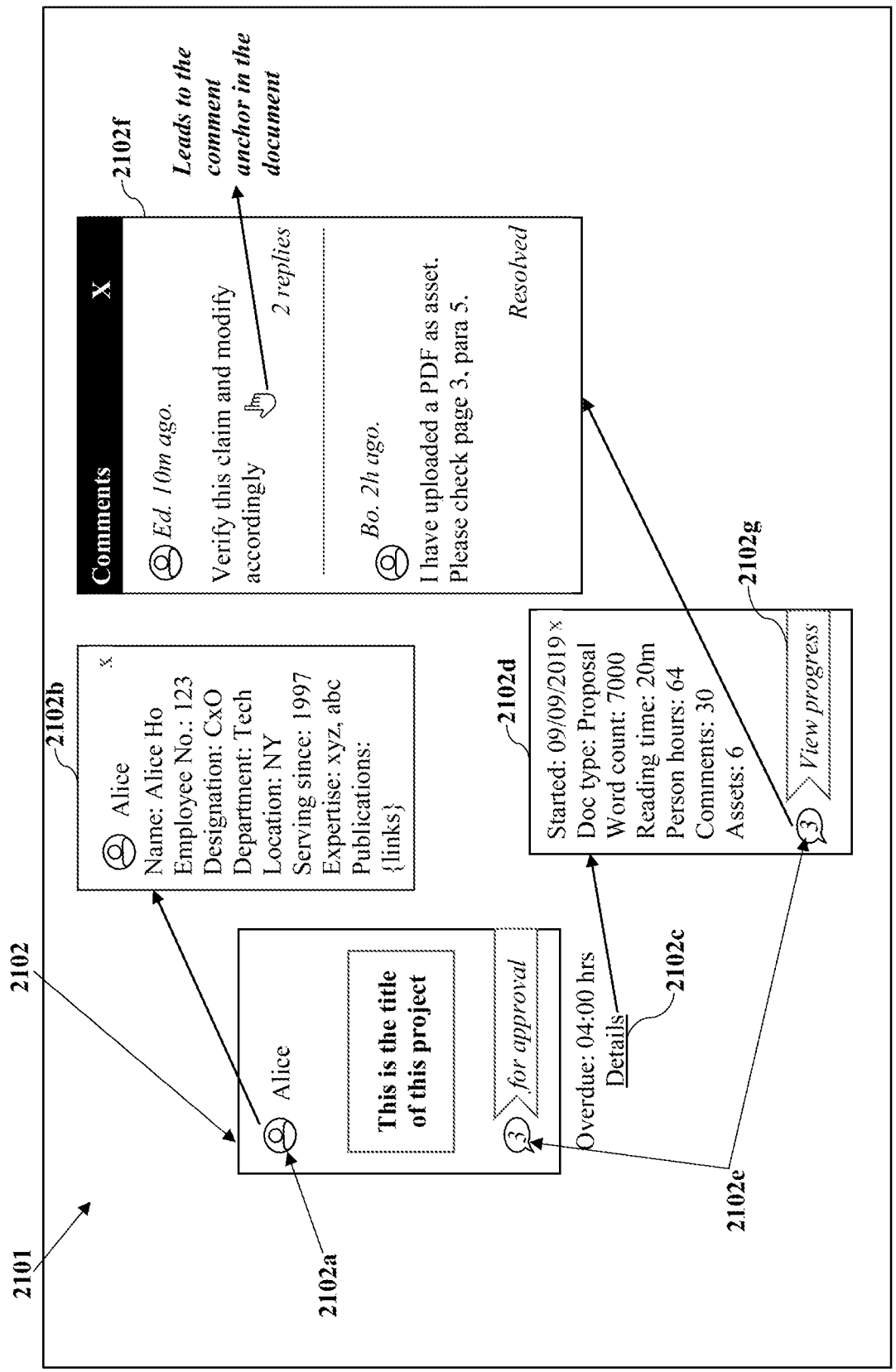

FIG. 22A illustrates a document thumbnail 2102 for a received document in progress displayed on the unified dashboard 2101 shown in FIG. 21B. FIG. 22A also illustrates metadata of the received document and an update to a workflow sequence being generated by the interaction management system. For example, when the user clicks on a user icon 2102*a* displayed on the document thumbnail 2102, the interaction management system renders information 2102*b* of the sender of the document, for example, name of the sender, a sender identifier such as employee number, designation of the sender, department, location, expertise, publications, etc., on the unified dashboard 2101. When the user clicks on a details link 2102*c* displayed below the document thumbnail 2102, the interaction management system renders details 2102*d* of the document, for example, a date of creation of the document, document type, word count, reading time, person hours, number of comments, number of assets, etc., on the unified dashboard 2101. When the user clicks on a comment icon 2102*e* displayed on the document thumbnail 2102, the interaction management system renders the comments 2102*f* of the document on the unified dashboard 2101 along with the name of the person who entered each comment, a time of entry of each comment, the status of the comments such as resolved, containing two replies, etc., on the unified dashboard 2101. When the user clicks on the comments 2102*f*, the interaction management system leads the user to a comment anchor in the document. Furthermore, when the user clicks a "View Progress" option 2102*g* provided with the details 2102*d* of the document, the interaction management system renders an aggregate of actions performed on the document up to a current action on a display interface as illustrated in FIGS. 26R-26S.

Figure 22B:
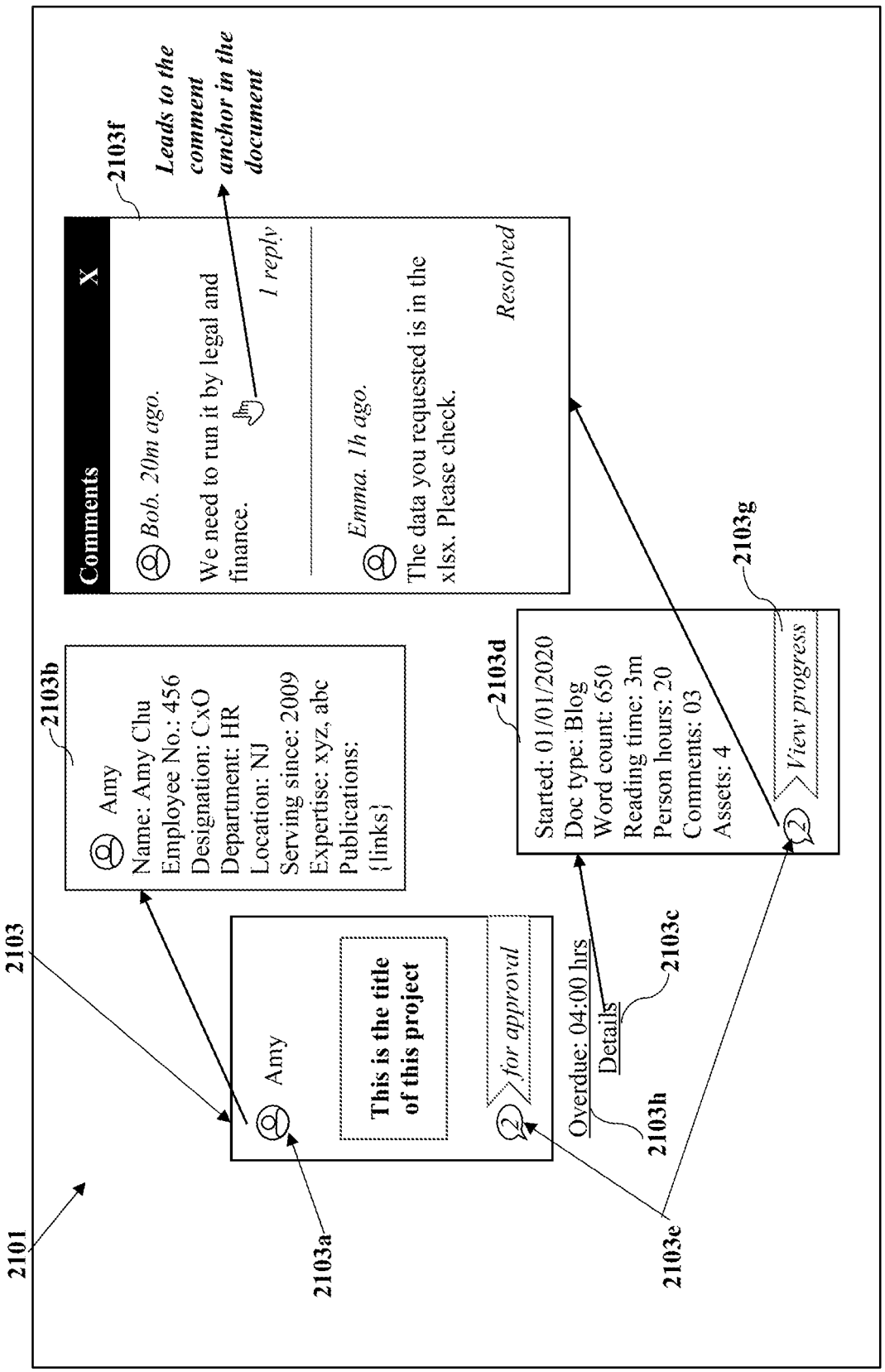
Figure 23:
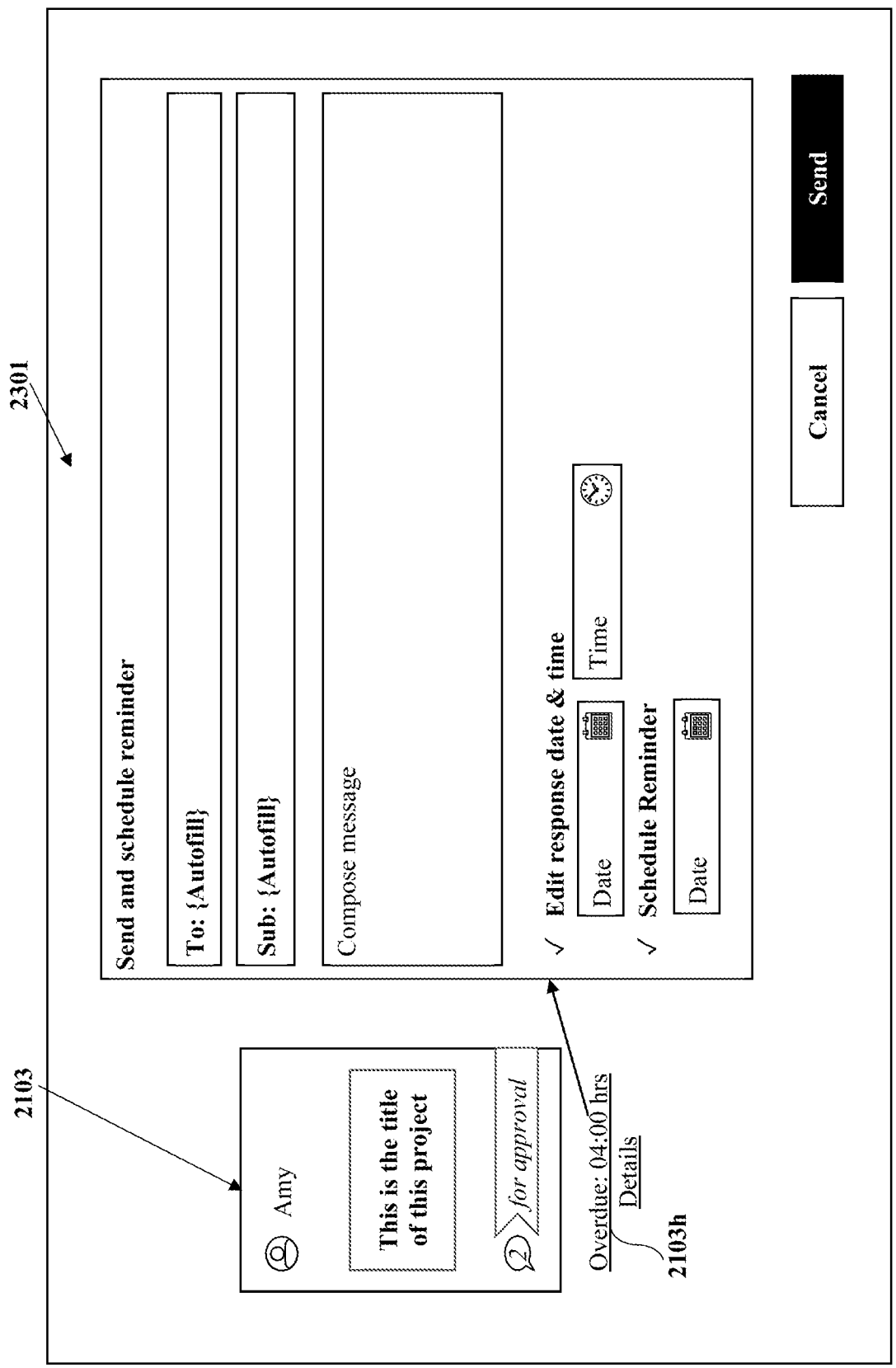

FIG. 22B illustrates a document thumbnail 2103 for a sent document in progress displayed on the unified dashboard 2101 shown in FIG. 21C. FIG. 22B also illustrates metadata of the sent document and an update to a workflow sequence being generated by the interaction management system. For example, when the user clicks on a user icon 2103*a* displayed on the document thumbnail 2103, the interaction management system renders information 2103*b* of a recipient of the document, for example, name of the recipient, a recipient identifier such as employee number, designation of the recipient, department, location, expertise, publications, etc., on the unified dashboard 2101. When the user clicks on a details link 2103*c* displayed below the document thumbnail 2103, the interaction management system renders details 2103*d* of the document, for example, a date of creation of the document, document type, word count, reading time, person hours, number of comments, number of assets, etc., on the unified dashboard 2101. When the user clicks on a comment icon 2103*e* displayed on the document thumbnail 2103, the interaction management system renders the comments 2103*f* on the unified dashboard 2101 along with the name of the person who entered each comment, a time of entry of each comment, the status of the comments such as resolved, containing a reply, etc., on the unified dashboard 2101. When the user clicks on the comments 2103*f*, the interaction management system leads the user to a comment anchor in the document. Furthermore, when the user clicks a "View Progress" option 2103*g* provided with the details 2103*d* of the document, the interaction management system renders an aggregate of actions performed on the document up to a current action on a display interface as illustrated in FIGS. 26R-26S. When the user clicks on an "Overdue" link 2103*h* displayed below the document thumbnail 2103, the interaction management system renders a display interface 2301 for composing and scheduling a reminder as illustrated in FIG. 23. The display interface 2301 allows the user to compose a message, edit a response date and time, etc., and send the reminder to the recipient of the document for performing a response action on the document. In an embodiment, the interaction management system allows the user to schedule reminders for different actions to be performed via the display interface 2301 within the document editor.

Figure 24A:
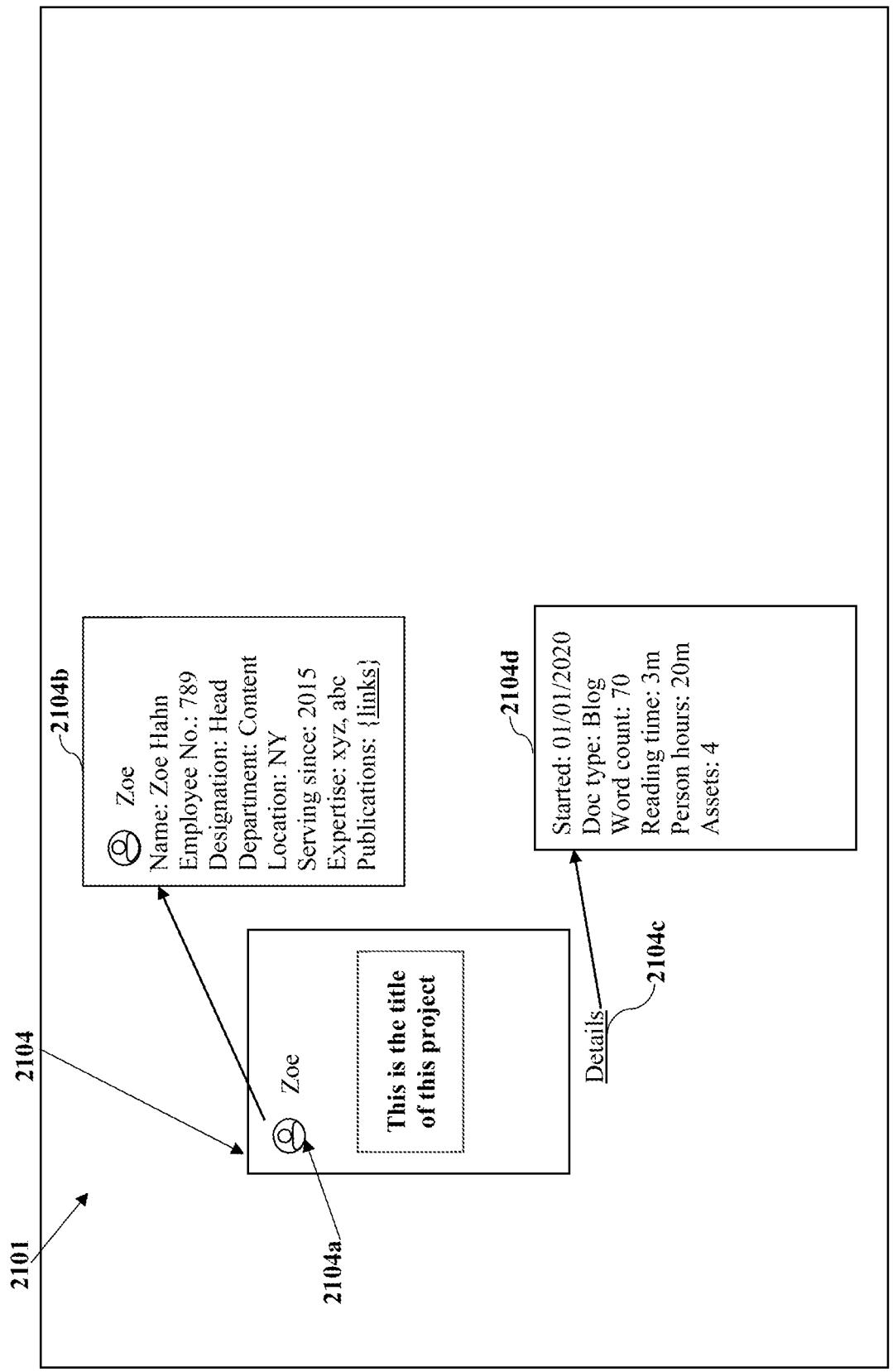

FIG. 24A illustrates a document thumbnail 2104 for a draft document or project displayed on the unified dashboard 2101 shown in FIG. 21D. FIG. 24A also illustrates metadata of the draft document. For example, when the user clicks on a user icon 2104*a* displayed on the document thumbnail 2104, the interaction management system renders information 2104*b* of the user of the document, for example, name of the user, a user identifier such as employee number, designation of the user, department, location, expertise, publications, etc., on the unified dashboard 2101. When the user clicks on a details link 2104*c* displayed below the document thumbnail 2104, the interaction management system renders details 2104*d* of the document, for example, a date of creation of the document, document type, word count, reading time, person hours, number of assets, etc., on the unified dashboard 2101.

Figure 24B:
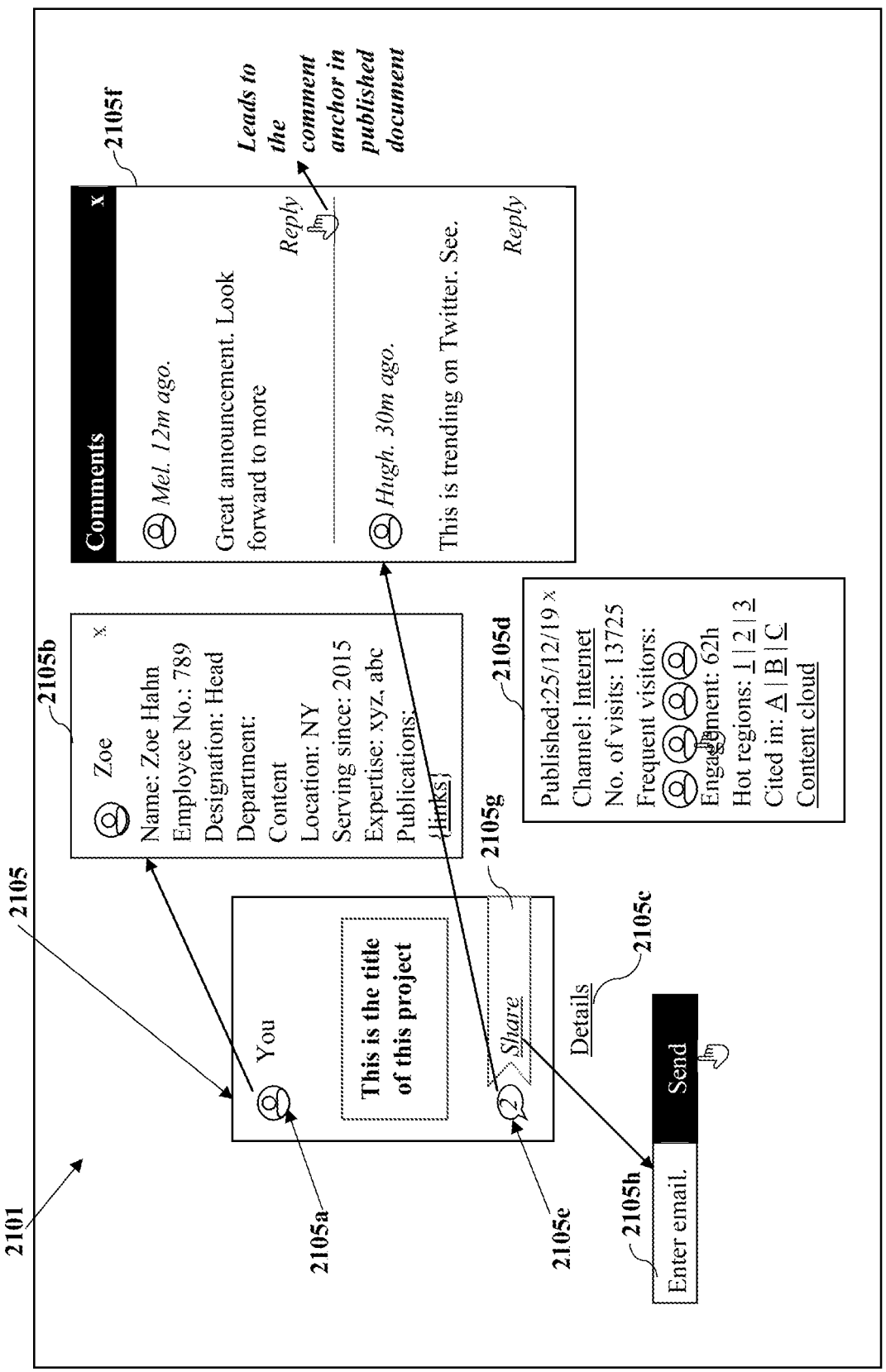

FIG. 24B illustrates a document thumbnail 2105 for a published document displayed on the unified dashboard 2101 shown in FIG. 21E. FIG. 24B also illustrates metadata of the published document and usage metrics generated by the interaction management system. For example, when the user clicks on a user icon 2105*a* displayed on the document thumbnail 2105, the interaction management system renders information 2105*b* of the user, for example, name of the user, a user identifier such as employee number, designation of the user, department, location, expertise, publications, etc., on the unified dashboard 2101. When the user clicks on a details link 2105*c* displayed below the document thumbnail 2105, the interaction management system renders details 2105*d* of the document, for example, a date of publication of the document, channel of publication, number of visits to the published document, frequent visitors, engagement time, hot regions, citations, etc., on the unified dashboard 2101. When the user clicks on a comment icon 2105*e* displayed on the document thumbnail 2105, the interaction management system renders the comments 2105*f* on the unified dashboard 2101 along with the name of the person who entered each comment, a time of entry of each comment, a reply option, etc., on the unified dashboard 2101. When the user clicks on the comments 2105*f*, the interaction management system leads the user to a comment anchor in the document. Furthermore, when the user clicks a "Share" option 2105*g* provided in the document thumbnail 2105, the interaction management system renders an interface 2105*h* that allows the user to enter an electronic mail (email) address of a person with whom the user wishes to share and send the document.

Figure 25A:
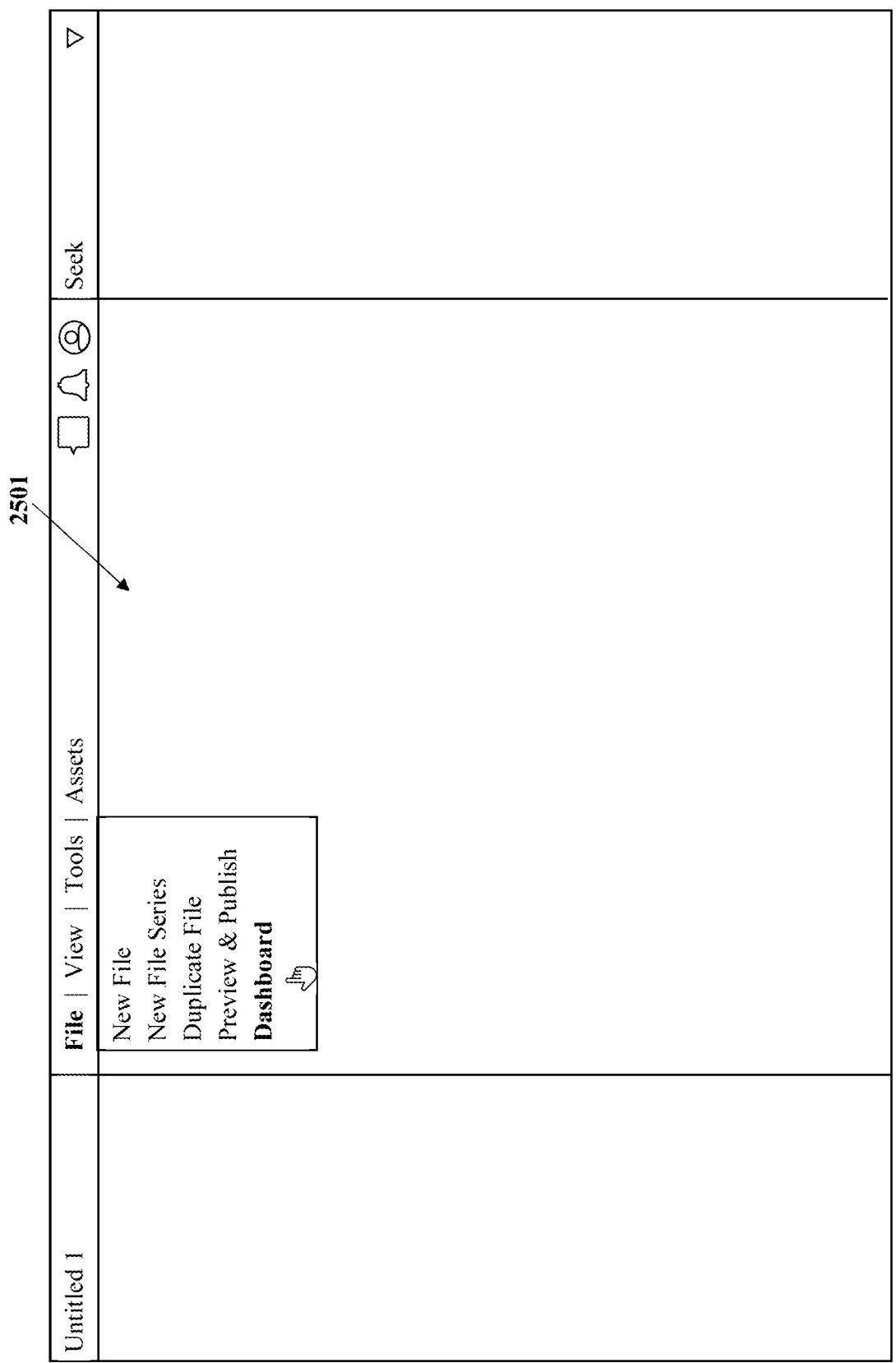
Figure 25B:
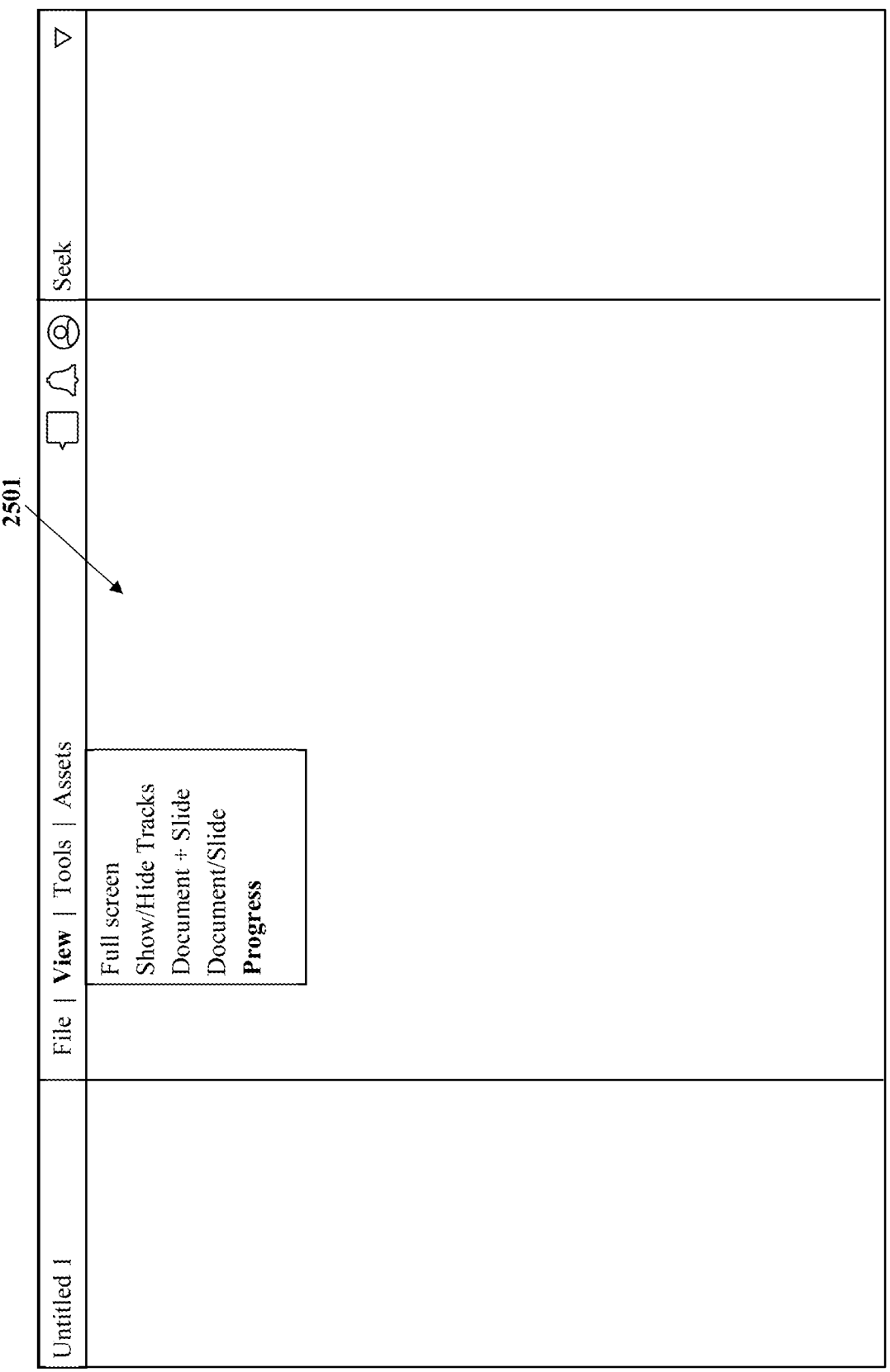

FIGS. 25A-25D illustrate screenshots of a display interface 2501 comprising multiple menu options rendered by the interaction management system. When a user starts a new document, the interaction management system renders multiple menu options, for example, a file option, a view option, a tools option, and an assets option for selection on the display interface 2501. When the user selects the file option, the interaction management system displays multiple sub-options, for example, create a new file, create a new file series, create a duplicate file, preview and publish the file or document, and return to the dashboard 2101 illustrated in FIGS. 21A-21E, on the display interface 2501 as illustrated in FIG. 25A. When the user selects the view option, the interaction management system displays multiple sub-options, for example, full screen, show/hide tracks, document+ slide presentation, document/slide presentation, progress of the document, etc., on the display interface 2501 as illustrated in FIG. 25B. In an embodiment, the document editor is a hybrid text, slide, form, table and data editor with multiple editorial enhancements. When the user selects the document+slide or document/slide sub-options of the view option on the display interface 2501 illustrated in FIG. 25B, the document editor embedded with the interaction management system automatically interprets the regions of the document and renders the regions as slides and vice versa. When the user clicks on the progress sub-option, the interaction management system renders the display interfaces illustrated in FIGS. 26R-26S.

Figure 25C:
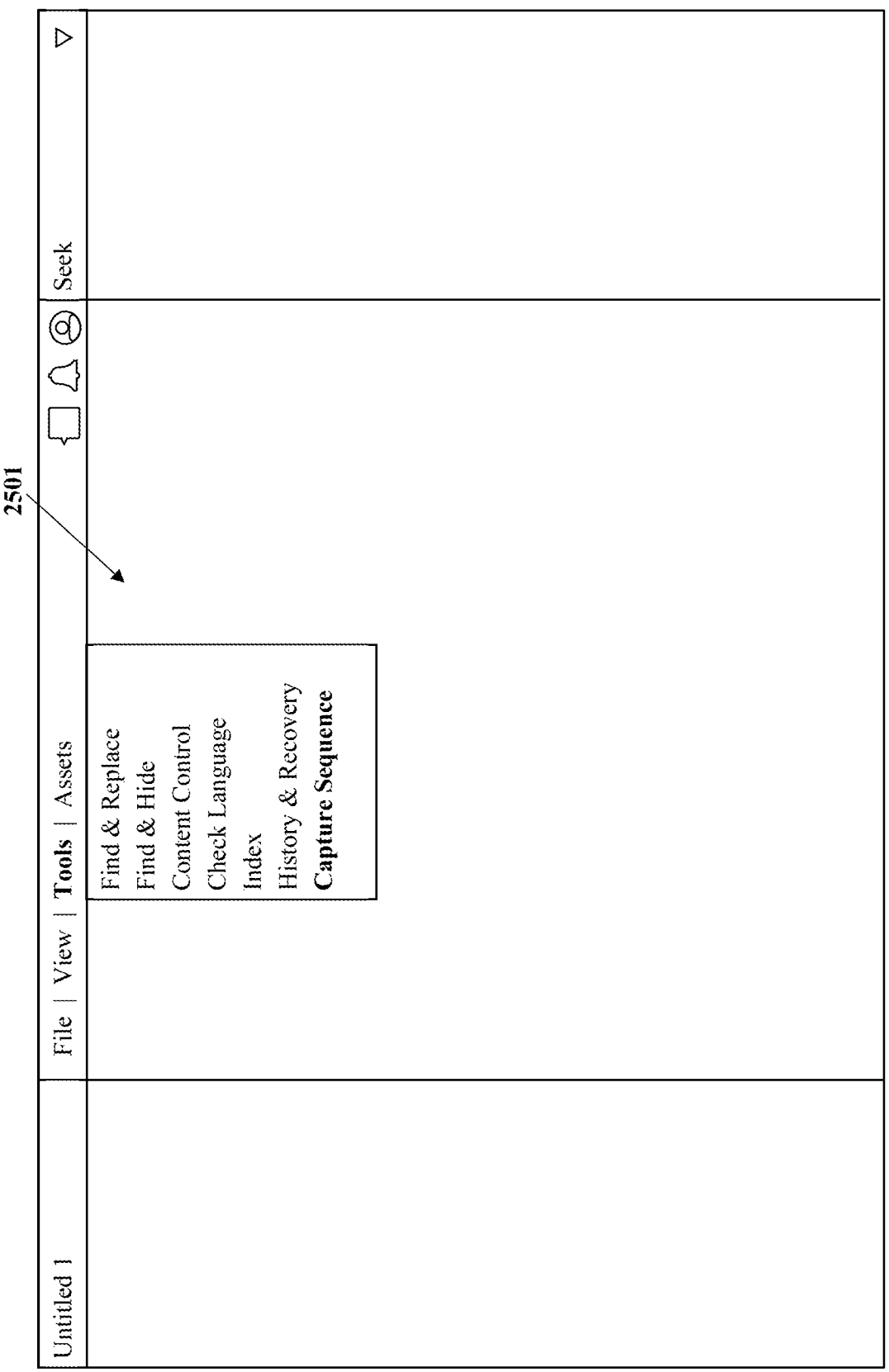
Figure 25D:
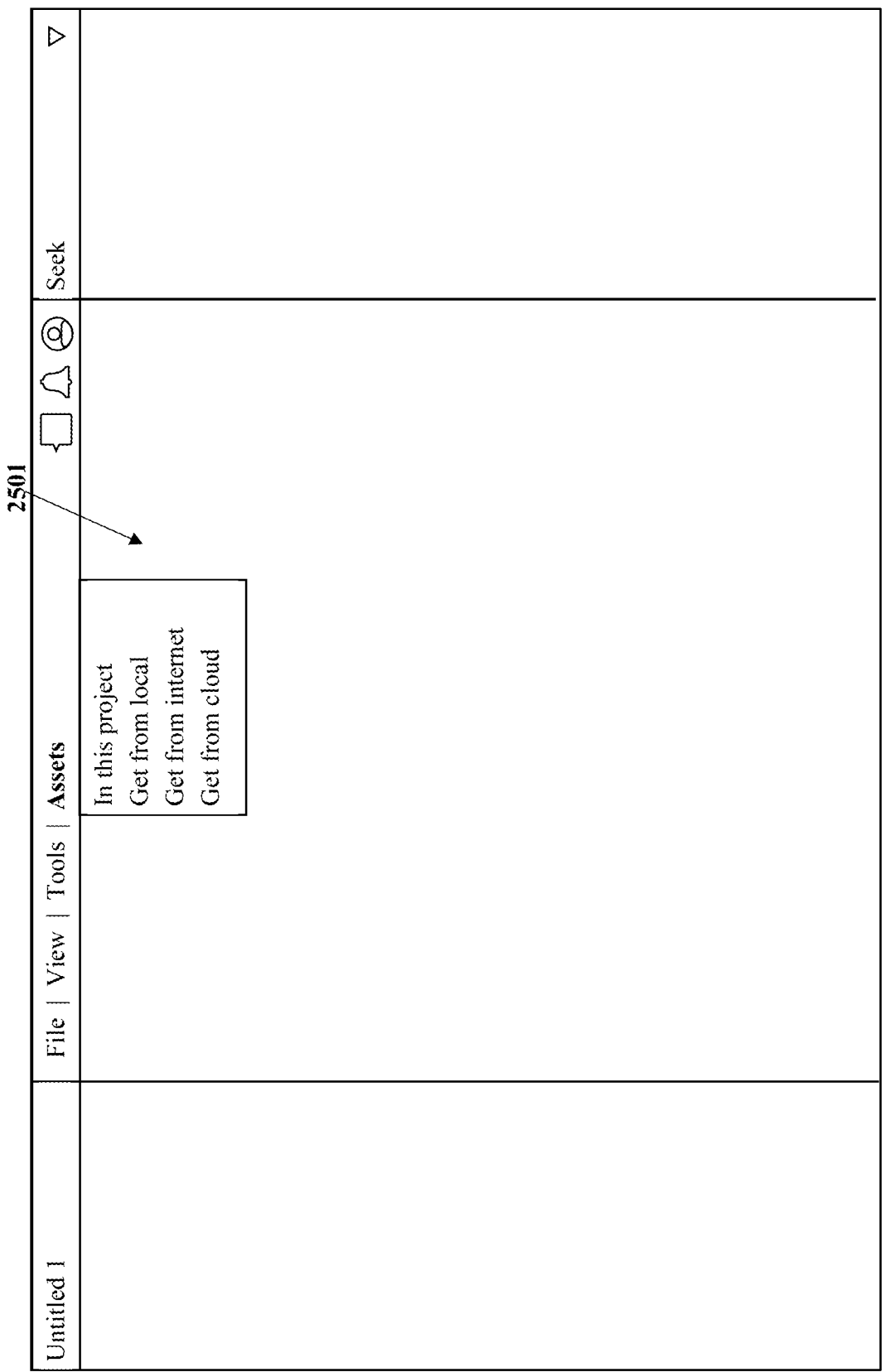

When the user selects the tools option, the interaction management system displays multiple sub-options, for example, find and replace, find and hide, content control, check language, index, history and recovery, capture sequence, etc., on the display interface 2501 as illustrated in FIG. 25C. In an embodiment, the find and hide sub-option allows a user to identify specific content or data, for example, name, gender, age, salary, etc., and hide the specific content to maintain confidentiality and privacy of the user. In an embodiment, the interaction management system binds together a single document or a series of documents, for example, a document and a survey of a project with navigation within a document and across documents. When the user clicks on the capture sequence sub-option, the interaction management system renders the display interfaces illustrated in FIG. 26T. When the user selects the assets option, the interaction management system displays multiple sub-options, for example, view assets in the project, get from a local drive, get from internet, get from cloud, etc., on the display interface 2501 as illustrated in FIG. 25D, to allow the user to view, retrieve, and add assets from a local data store, the internet, or the cloud respectively.

Figure 26A:
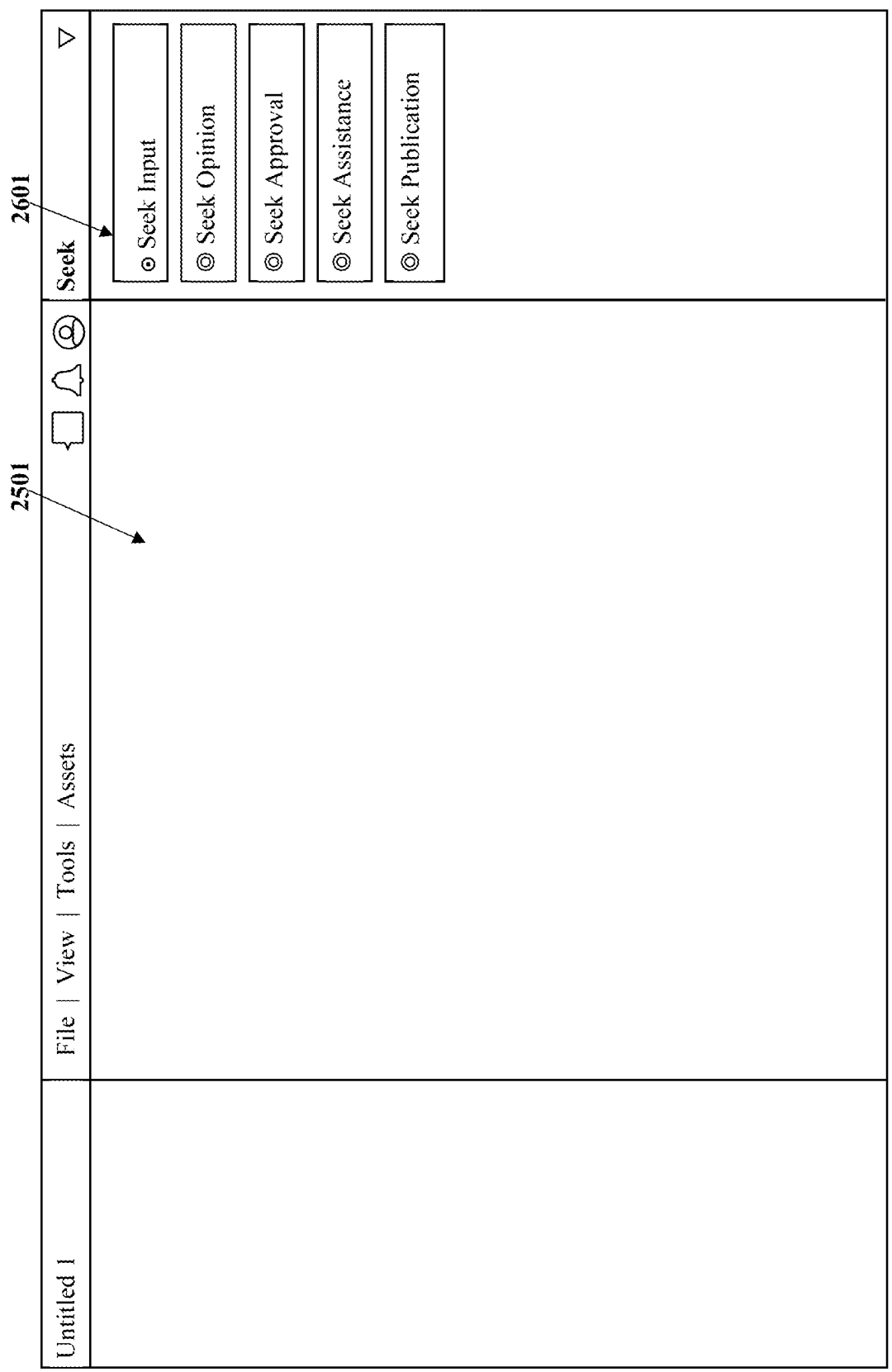
Figure 26B:
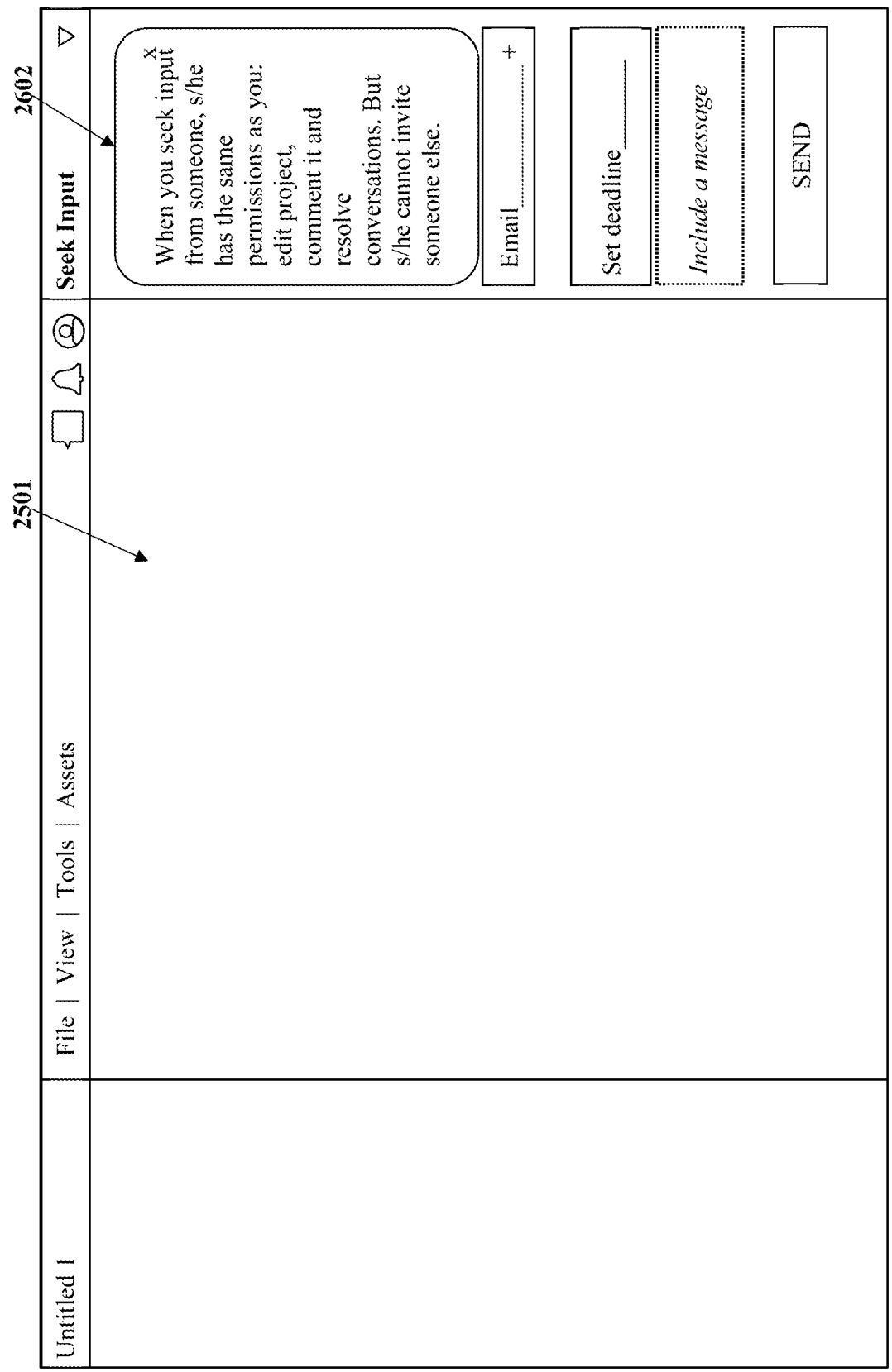

Furthermore, the interaction management system renders options to select seek actions 2601, for example, seek an input, seek an opinion, seek an approval, seek an assistance, and seek publication on the display interface 2501 as illustrated in FIG. 26A. When the user selects a "seek input" option on the display interface 2501 illustrated in FIG. 26A, the interaction management renders a "seek input" interface 2602 on the display interface 2501 as illustrated in FIG. 26B. The "seek input" interface 2602 allows the user to enter an email address of the participant from whom an input is sought, include a message, set a deadline with a response date and a response time, etc. The user may continue to work on the document after sending the "seek input" request to the participant. The "seek input" interface 2602 also allows the user to view a status of the document or the provision of the input and add or remove a participant from collaborating on the document as illustrated in FIG. 26C. When the participant logs into his or her user account, the interaction management system embedded in the document editor renders the unified dashboard 2101 on a display interface as illustrated in FIG. 21A. When the participant selects the document that requires his or her input, the interaction management system automatically renders a "give inputs" interface 2603 on the display interface 2501 as illustrated in FIG. 26D. Based on the codified decision rules, the interaction management system generates and renders the permission set comprising permissible actions, for example, edit and comment, on the document to the participant. The "give inputs" interface 2603 comprises handles for giving input and notifies the participant of the date and the time before when the input must be provided. After completing the work on the document, the participant sends a completion notice via the "give inputs" interface 2603. The "give inputs" interface 2603 also allows the participant to schedule a co-authoring session with another participant.

Figure 26E:
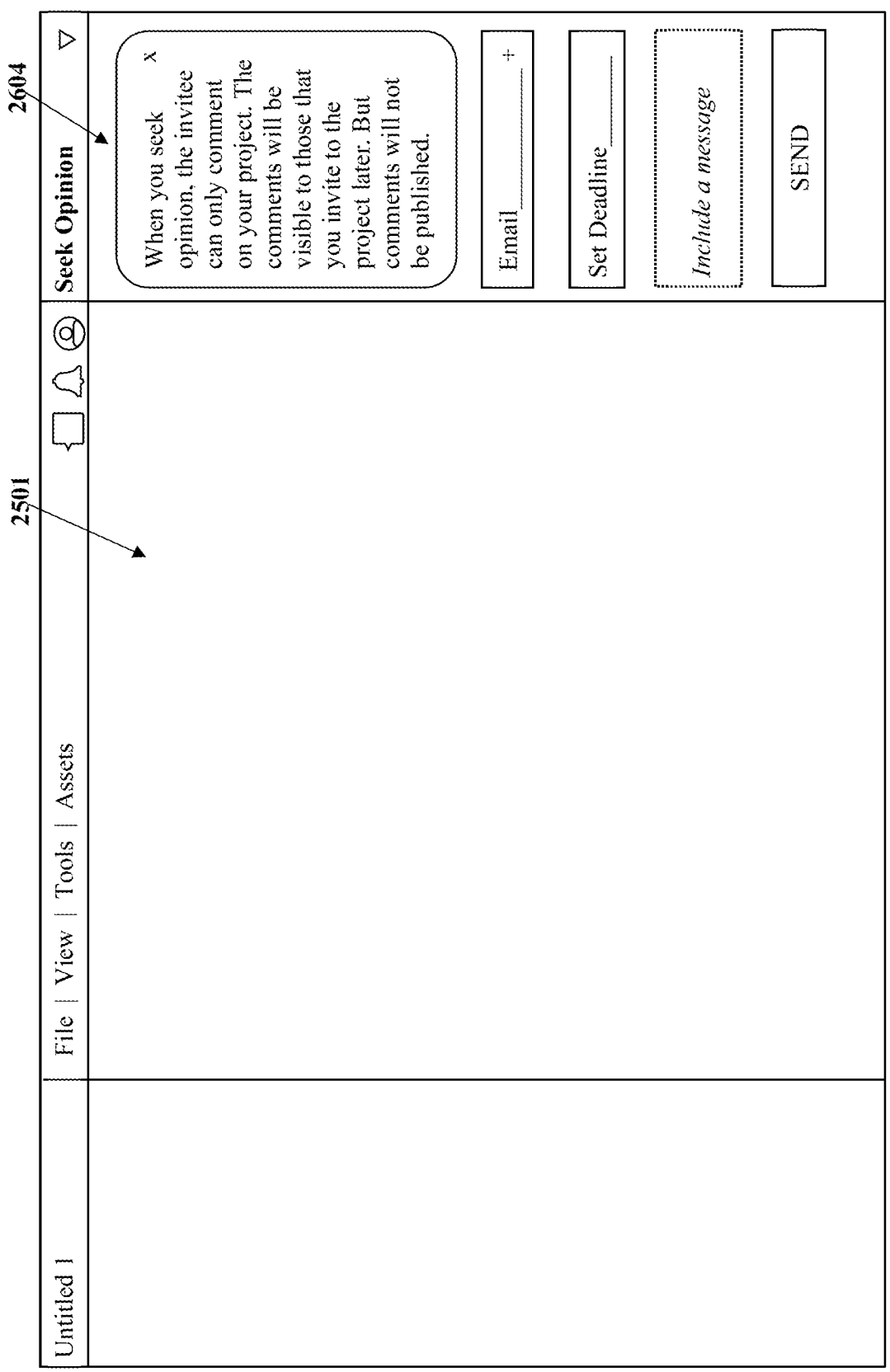
Figure 26F:
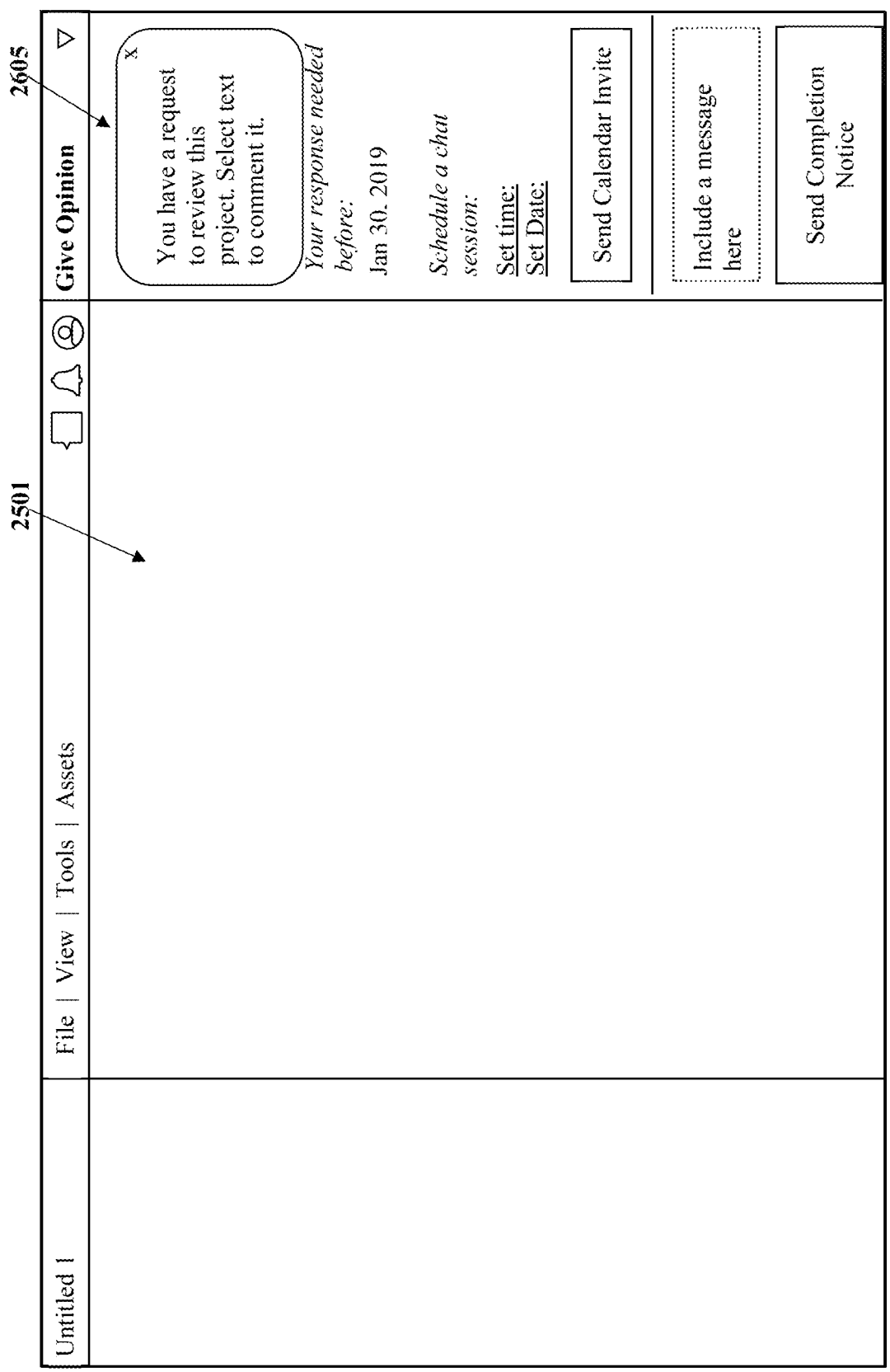

When the user selects a "seek opinion" option on the display interface 2501 illustrated in FIG. 26A, the interaction management renders a "seek opinion" interface 2604 on the display interface as illustrated in FIG. 26E. The "seek opinion" interface 2604 allows the user to reveal or hide the participant from whom an opinion is ought and his or her comments. The "seek opinion" interface 2604 allows the user to enter an email address of the participant from whom an opinion is sought, include a message, set a deadline with a response date and a response time, etc. When the participant logs into his or her user account, the interaction management system embedded in the document editor renders the unified dashboard 2101 on a display interface as illustrated in FIG. 21A. When the participant selects the document that requires his or her opinion, the interaction management system automatically renders a "give opinion" interface 2605 on the display interface 2501 as illustrated in FIG. 26F. Based on the codified decision rules, the interaction management system generates and renders the permission set comprising a permissible action, for example, a comment only action, on the document to the participant. The interaction management system automatically determines an anonymity requirement from the request action data and the potential response action data and contextually anonymizes the participant invoked to act on the live document based on the anonymity requirement. The "give opinion" interface 2605 comprises handles for giving an opinion and notifies the participant of the date and the time before when the opinion must be provided. After completing the work on the document, the participant sends a completion notice via the "give opinion" interface 2605.

Figure 26G:
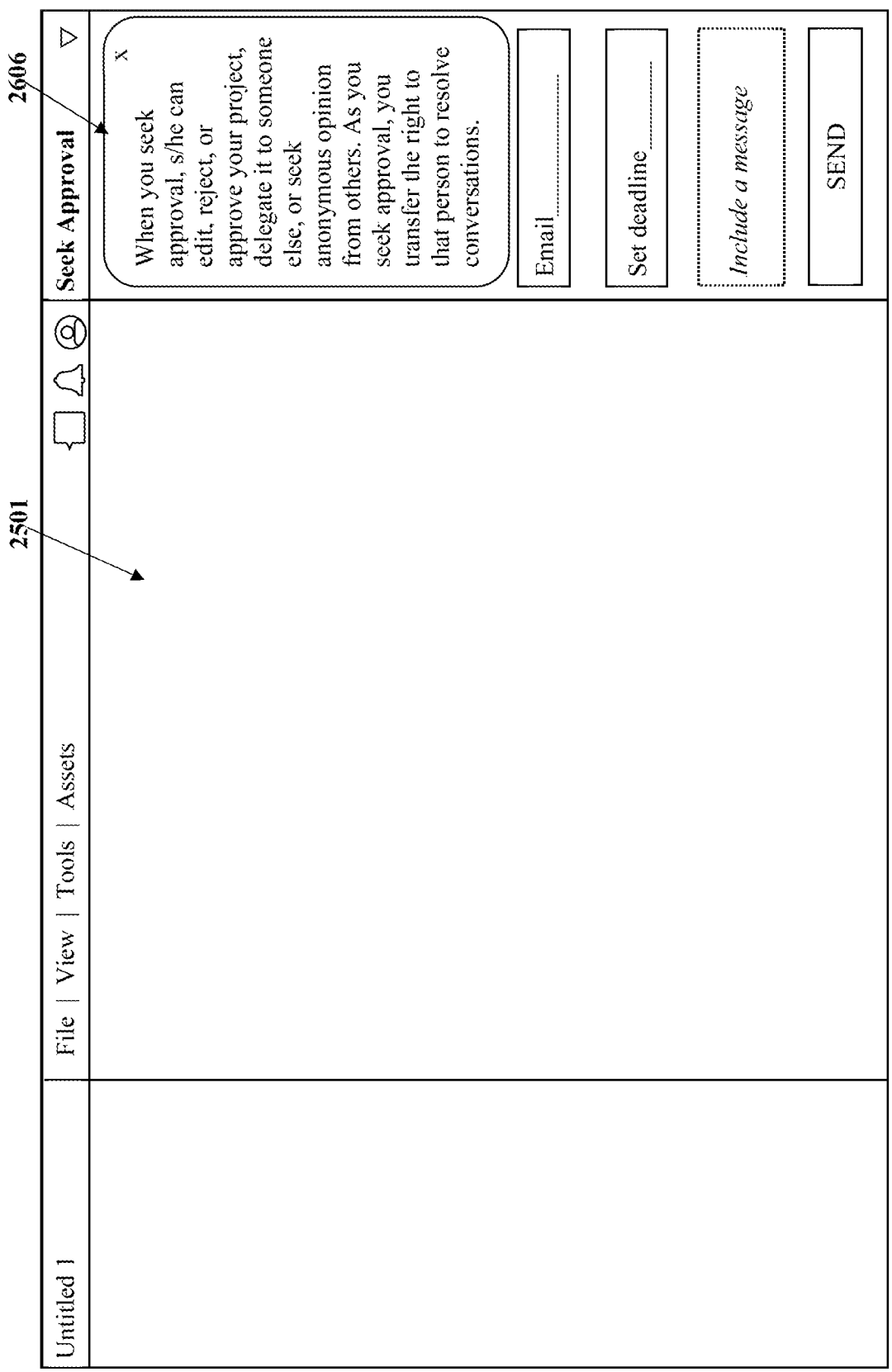
Figure 26H:
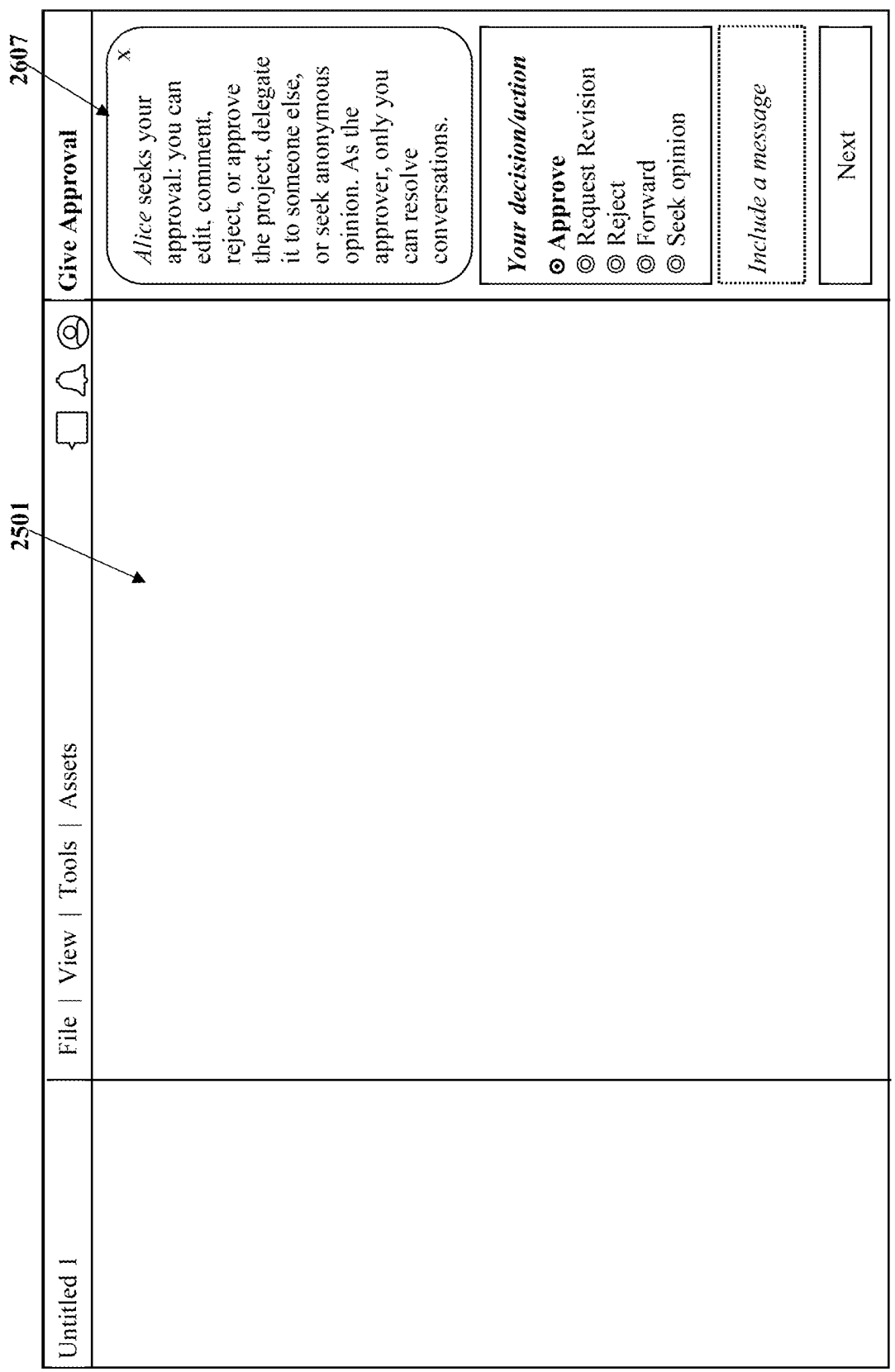
Figure 26J:
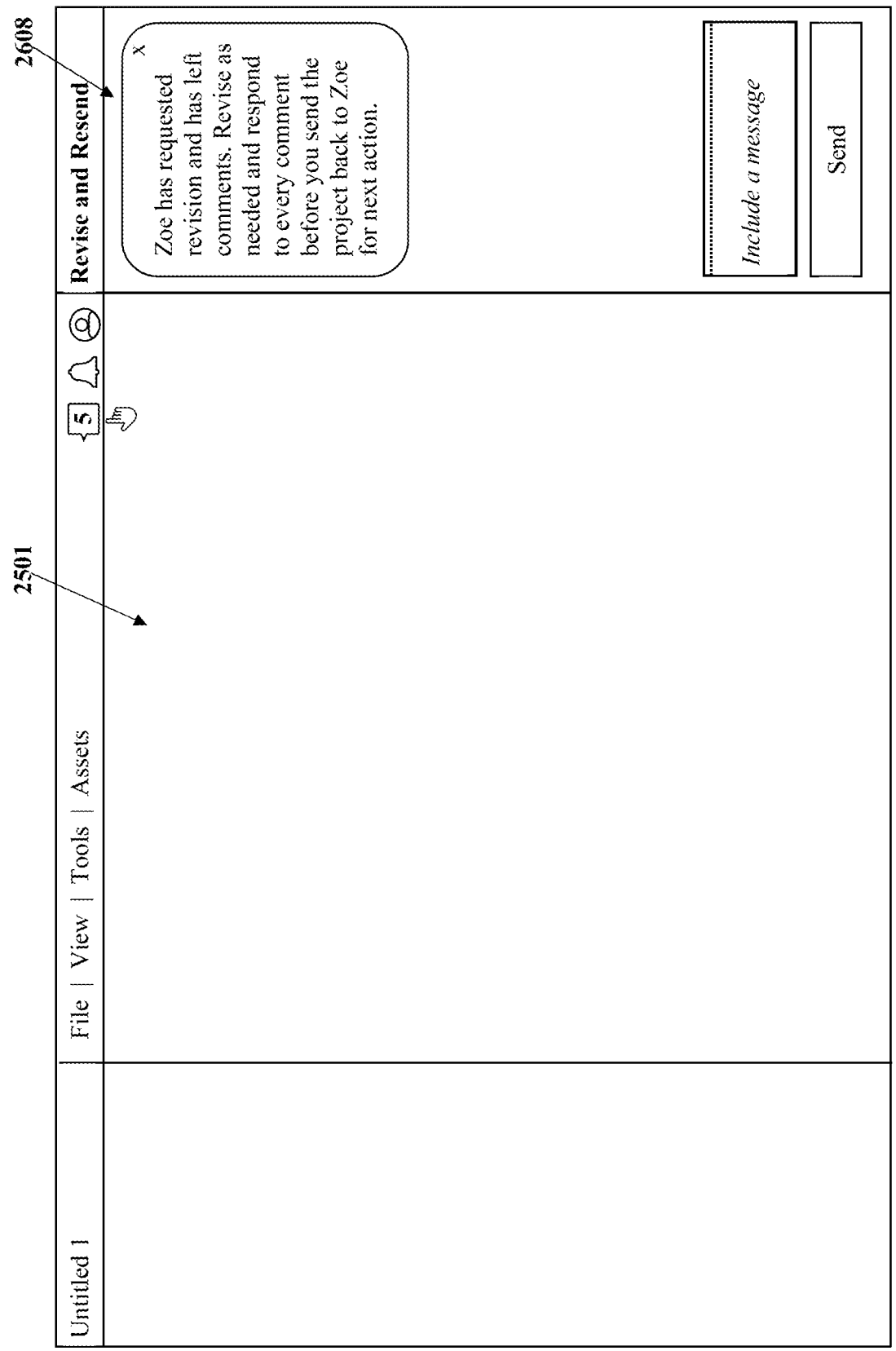
Figure 26K:
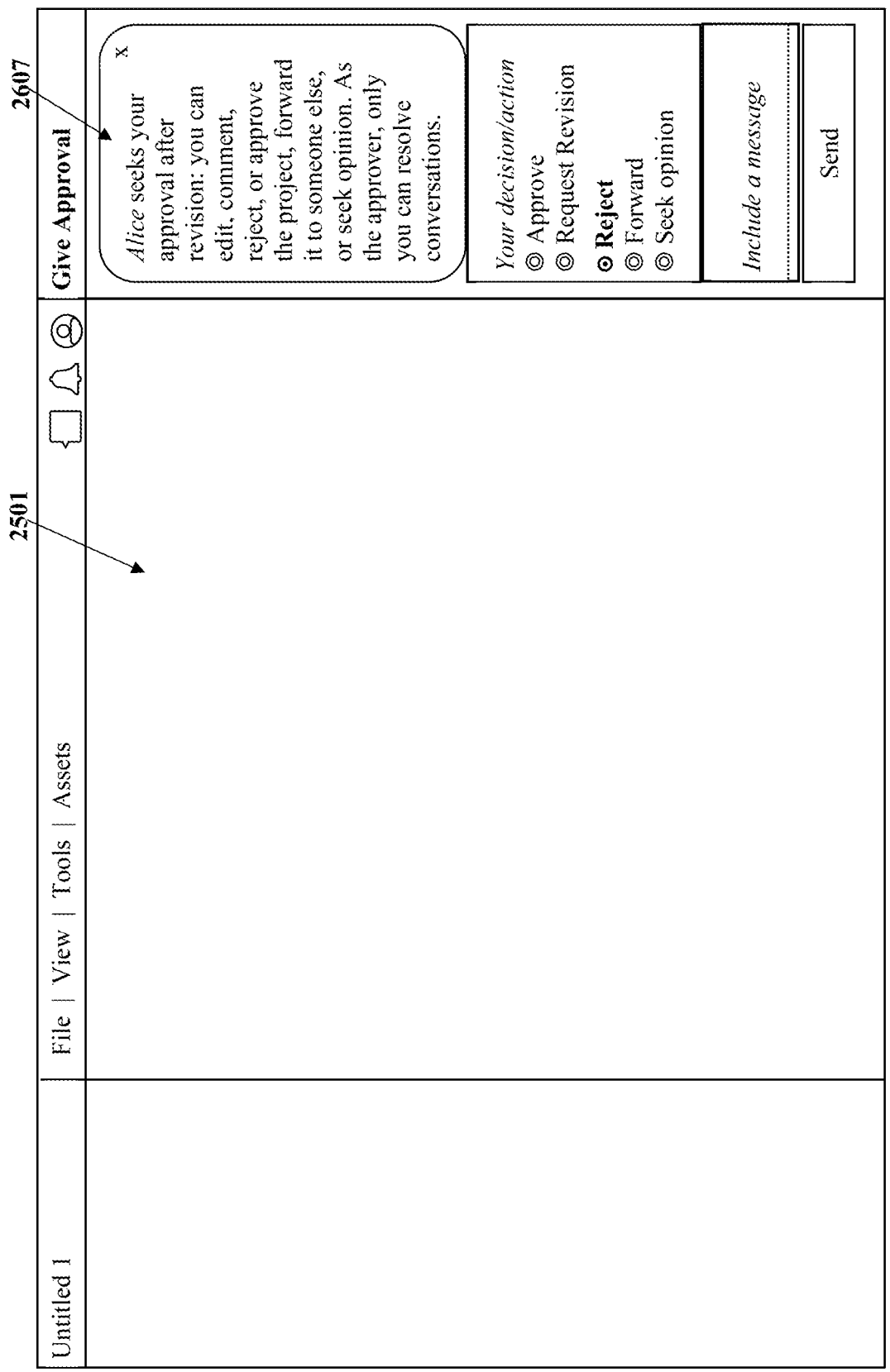
Figure 26L:
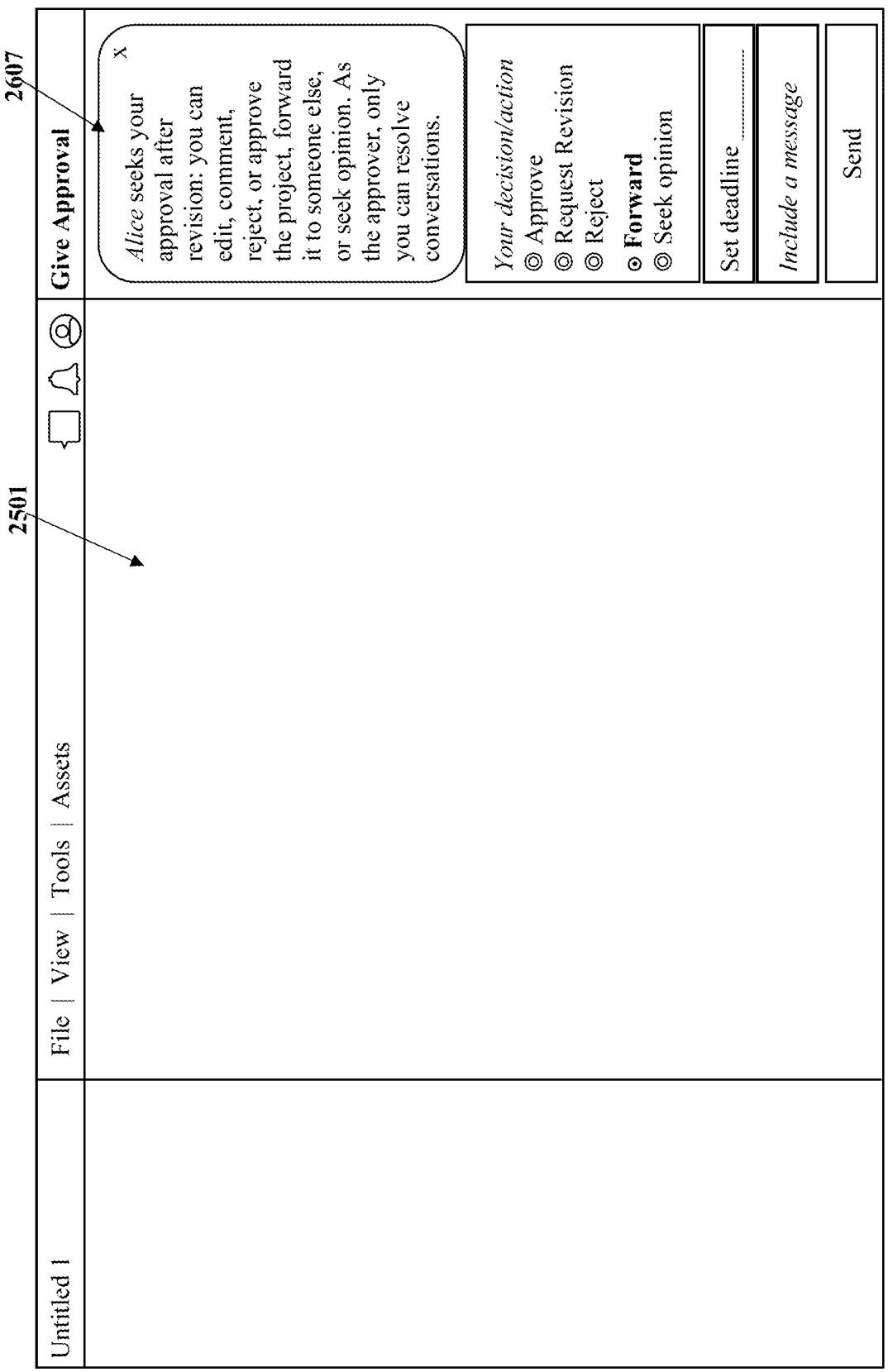

When the user selects a "seek approval" option on the display interface 2501 illustrated in FIG. 26A, the interaction management renders a "seek approval" interface 2606 on the display interface as illustrated in FIG. 26G. The "seek approval" interface 2606 allows the user to enter an email address of the participant from whom an approval is sought, include a message, set a deadline with a response date and a response time, etc. The document remains read only until the user receives an approval or rejection from the participant. On sending the approval request, the user therefore transfers his or her right to the participant to resolve conversations. When the participant logs into his or her user account, the interaction management system embedded in the document editor renders the unified dashboard 2101 on a display interface as illustrated in FIG. 21A. When the participant selects the document that requires his or her approval, the interaction management system automatically renders a "give approval" interface 2607 on the display interface 2501 as illustrated in FIGS. 26H-26I and FIGS. 26K-26L. Based on the codified decision rules, the interaction management system generates and renders the permission set comprising permissible actions, for example, edit, comment, reject, and approve the document, to the participant. The interaction management system allows the participant to approve, request a revision, reject, delegate or forward the document to another participant for additional approval, or seek an anonymous expert opinion on the "give approval" interface 2607 as illustrated in FIGS. 26H-26I and FIGS. 26K-26M. In an embodiment, the "give approval" interface 2607 notifies the participant of the date and the time before when the approval must be provided. If the participant requests for a revision of the document from the user via the "give approval" interface 2607 illustrated in FIG. 26I, the user receives this request on a "revise and resend" interface 2608 as illustrated in FIG. 26J. After revising the document and responding to the comments in the document, the user sends a revised document to the participant via the "revise and resend" interface 2608. The "give approval" interface 2607 allows the participant to delegate approval or retain rights to providing a final approval as illustrated in FIG. 26L. After completing the work on the document, the participant sends a completion notice via the "give approval" interface 2607.

Figure 26N:
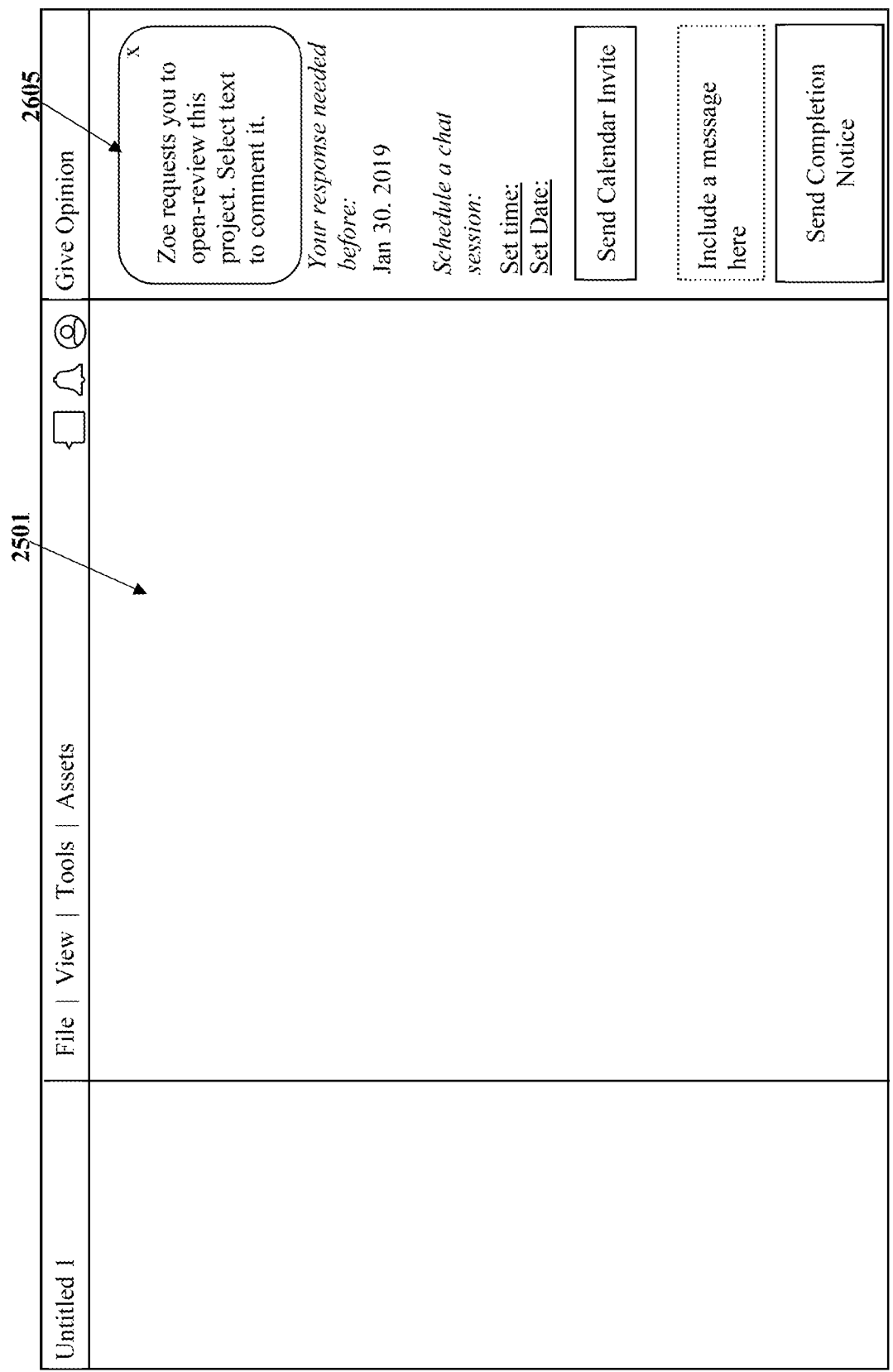
Figure 26O:
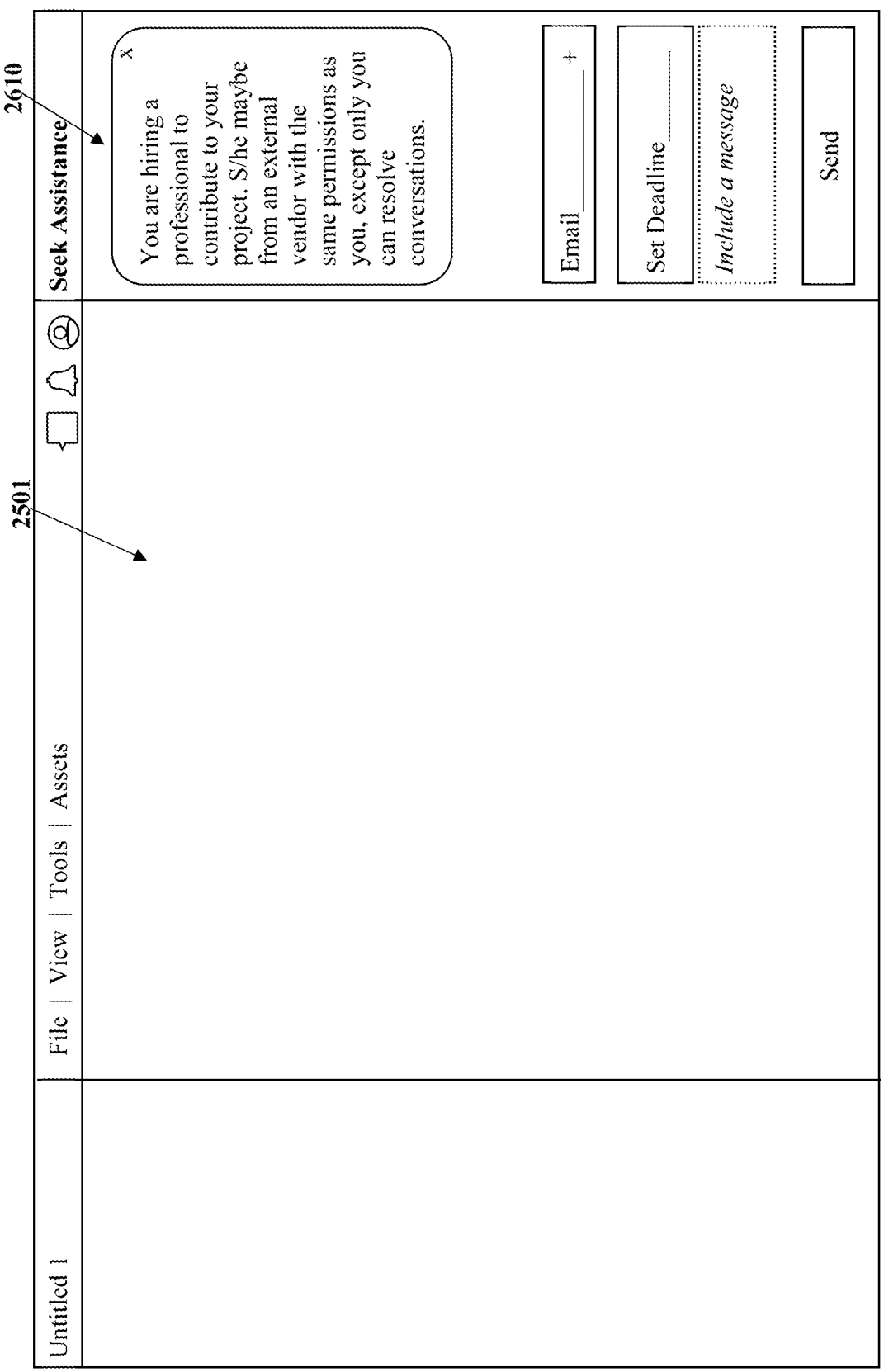
Figure 26P:
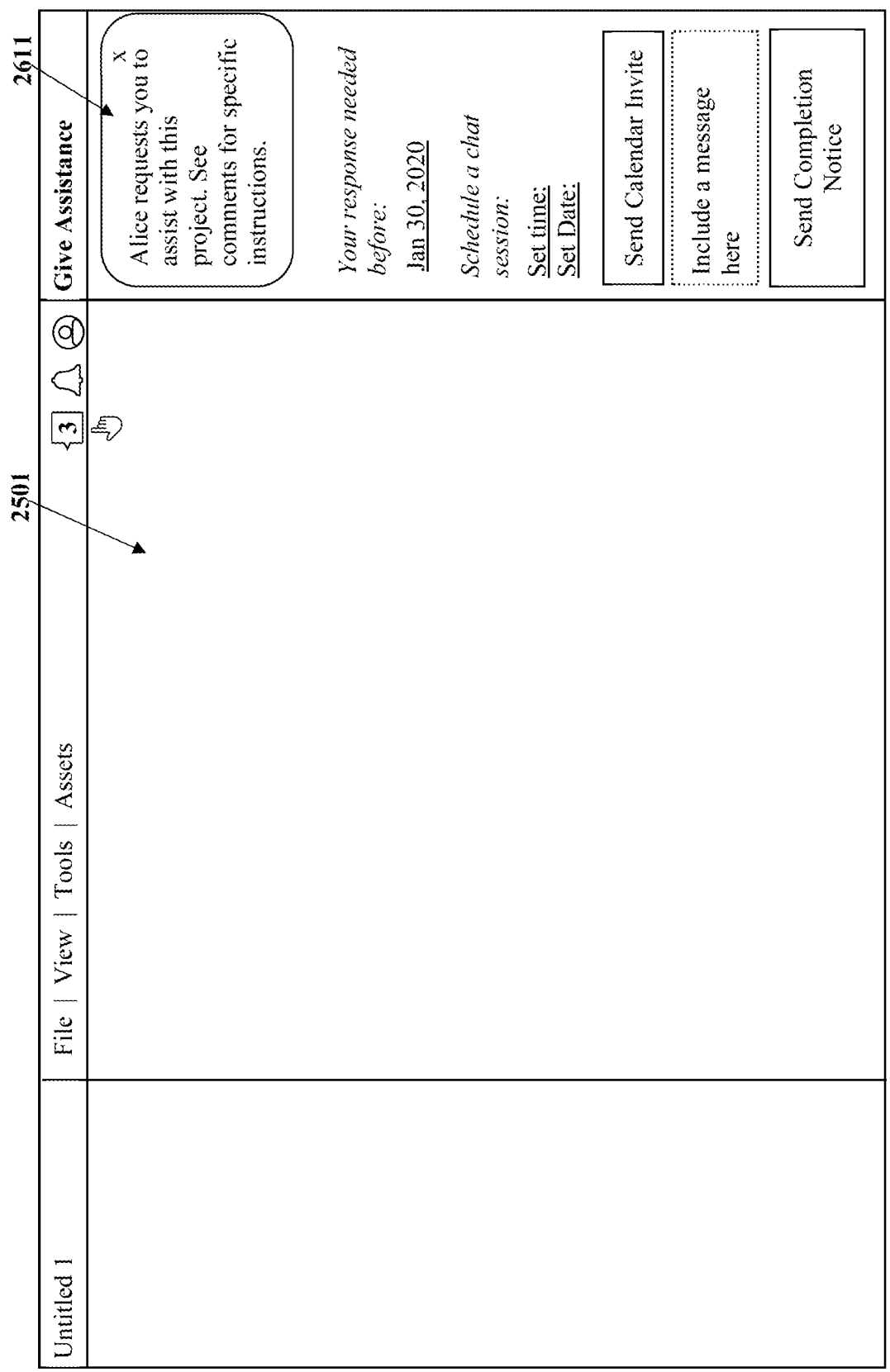
Figure 26V:
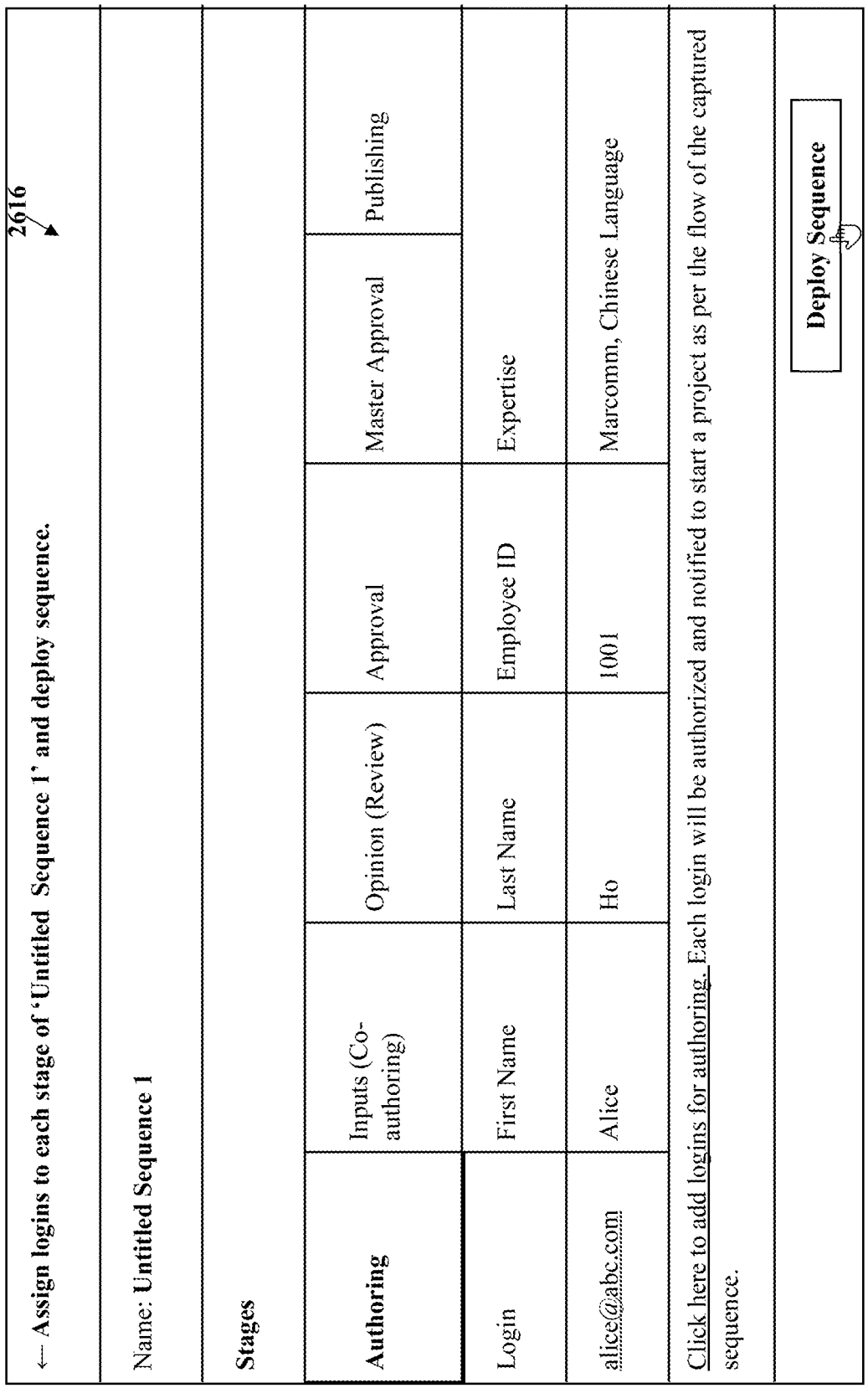

If the participant receives a request for additional approval and seeks an opinion from an expert via a "takeover approval" interface 2609 illustrated in FIG. 26M, the "takeover approval" interface 2609 displays options for revealing the expert and the expert's comments as illustrated in FIG. 26M, as the interaction management system renders the expert as anonymous by default. When the expert logs into his or her user account, the interaction management system embedded in the document editor renders the unified dashboard 2101 on a display interface as illustrated in FIG. 21A. When the expert selects the document that requires his or her opinion, the interaction management system automatically renders a "give opinion" interface 2605 on the display interface 2501 as illustrated in FIG. 26N. Based on the codified decision rules, the interaction management system generates and renders the permission set comprising permissible actions, for example, comment, on the document to the participant. The "give opinion" interface 2610 also allows the expert to schedule a chat with the participant. The "give opinion" interface 2610 notifies the expert of the date and the time before when the opinion must be provided. After completing the work on the document, the expert sends a completion notice via the "give opinion" interface 2610. When the user selects a "seek assistance" option on the display interface 2501 illustrated in FIG. 26A, the interaction management renders a "seek assistance" interface 2610 on the display interface as illustrated in FIG. 26O. The "seek assistance" interface 2610 allows the user to enter an email address of the assistant from whom an assistance is sought, include a message, set a deadline with a response date and a response time, etc. When the assistant logs into his or her user account, the interaction management system embedded in the document editor renders the unified dashboard 2101 on a display interface as illustrated in FIG. 21A. When the assistant selects the document that requires his or her assistance, the interaction management system automatically renders a "give assistance" interface 2611 on the display interface as illustrated in FIG. 26P. Based on the codified decision rules, the interaction management system generates and renders the permission set comprising permissible actions, for example, edit and comment on the document to the assistant. The "give assistance" interface 2611 notifies the assistant of the date and the time before when the assistance must be provided. After completing the work on the document, the assistant sends a completion notice via the "give assistance" interface 2611.

When the user selects a "seek publication" option on the display interface 2501 illustrated in FIG. 26A, the interaction management renders a "seek publication" interface 2612 on the display interface as illustrated in FIG. 26Q. The "seek publication" interface 2612 allows the user to publish to a template center, publish to the internet, publish to an intranet, or keep the document private and confidential. The "seek publication" interface 2612 allows the user to publish and schedule the publication of content to selected channels. The "seek publication" interface 2612 allows the user to select a channel, for example, a website, a blog, a social media link, an email, a video sharing platform, etc., for publishing the document. The "seek publication" interface 2612 also allows the user to set a publication date and a publication time. When the publisher logs into his or her user account, the interaction management system embedded in the document editor renders the unified dashboard 2101 on a display interface as illustrated in FIG. 21A. In an embodiment, when the publisher selects the document that requires publication, the interaction management system automatically renders a "publication request" interface on the display interface. Based on the codified decision rules, the interaction management system generates and renders the permission set comprising a permissible action, for example, a publish only action to the publisher. The "publication request" interface notifies the publisher of the publication date, the publication gateway, and the publication channel. The publisher publishes the document via the "publication request" interface. In an embodiment, the interaction management system allows the document to be published as both a document and a presentation.

In the above examples, the interaction management system allows any participant to whom a request action, for example, any seek action is addressed, to perform the corresponding response action with their respective permission set, regardless of the participant's role, thereby making the computer-implemented method disclosed herein role-agnostic. Being role-agnostic, the interaction management system allows a participant to assume different positions in each workflow sequence in which the participant participates. In the computer-implemented method disclosed herein, while seeking specific actions, roles are automatically assumed due to which the directions of movement of the actions also get assumed. The nature of the action sought determines the movement of the action and the status of the participant involved in a particular action.

Figure 26X:
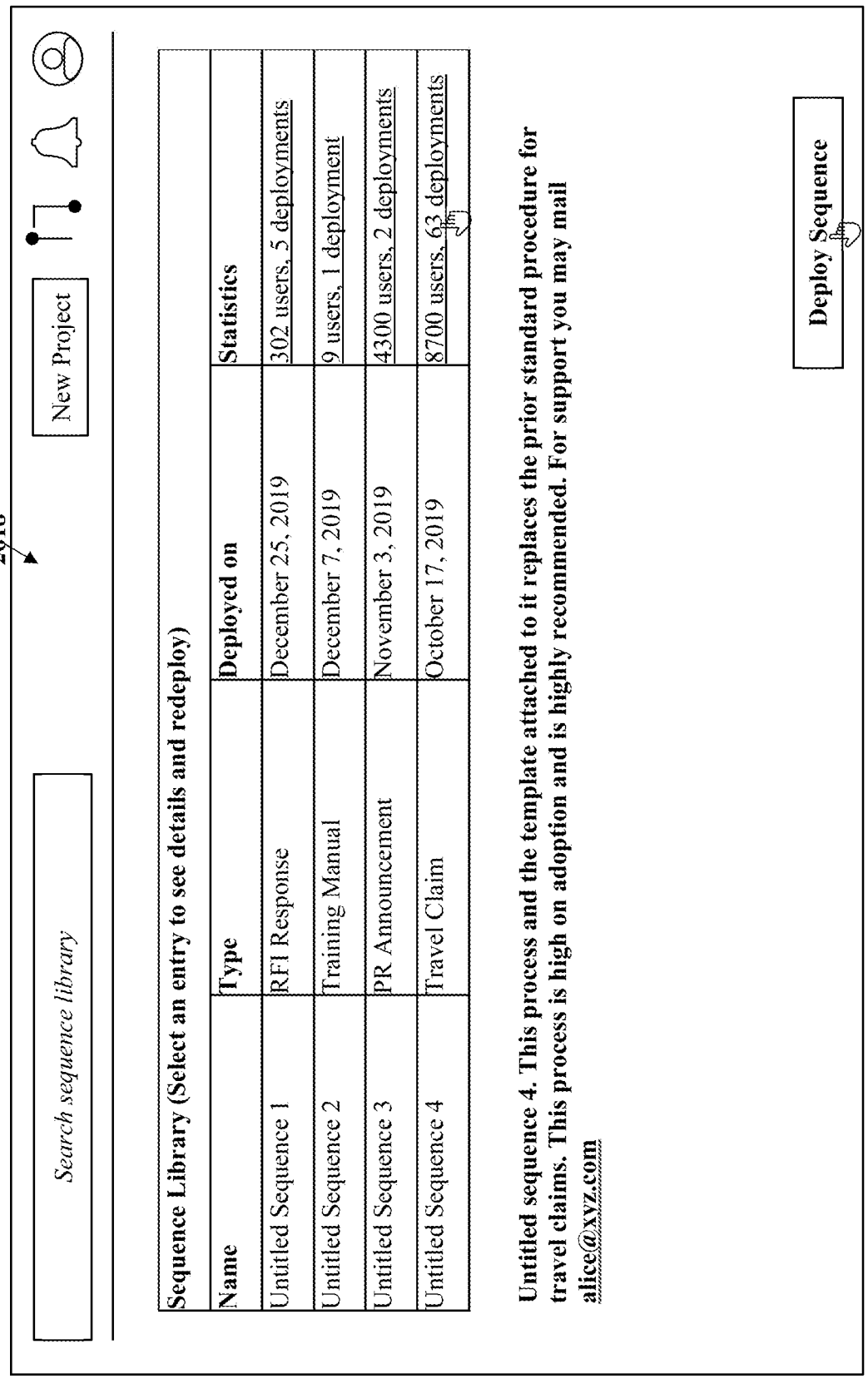

The interaction management system continuously tracks and displays a status and a progress of the live document on the dashboard 2101. When the user selects the "progress" sub-option from the "view" option on the display interface as illustrated in FIG. 25B, the interaction management system renders the progress of the live document on the display interface 2613 as illustrated in FIG. 26R. FIG. 26R illustrates an aggregate of actions up to a current action in a workflow sequence simulation in progress. The interaction management system also tracks and maps the actions performed along the interaction path of the live document in real time on the display interface 2613 as illustrated in FIG. 26S, to generate a re-deployable workflow sequence in real time and allows the user to capture the workflow sequence via the display interface 2614 illustrated in FIG. 26T. FIG. 26S illustrates an aggregate of actions up to a current action in a captured workflow sequence. FIG. 26T illustrates an aggregate of actions available for capture as a workflow sequence. The interaction management system allows the user to name, describe, tag, and enter information of the captured workflow sequence via a captured sequence interface 2615 as illustrated in FIG. 26U, for storage in the workflow database. The interaction management system also allows the user to deploy the captured workflow sequence via a "deploy sequence" interface 2616 illustrated in FIG. 26V. The "deploy sequence" interface 2616 allows the user to add logins to each stage in the captured workflow sequence for new users to start a project and follow the captured workflow sequence. The interaction management system also allows the user to set and announce the captured workflow sequence via the display interface 2617 as illustrated in FIG. 26W. Furthermore, the interaction management system allows the user to search and retrieve stored workflow sequences from the workflow database via a search interface 2618 as illustrated in FIG. 26X. The search interface 2618 displays the results of the searches conducted by the user. The user may select and view one of the stored workflow sequences and re-deploy the selected workflow sequence via the search interface 2618 illustrated in FIG. 26X.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor or a similar device. The "non-transitory, computer-readable storage media" also refer to any medium capable of storing or encoding a set of instructions for execution by a computer, a processor or a similar device and that causes a computer, a processor or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. In another embodiment, various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described such as the rule database 201i and the workflow database 201j, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be executed and changes may be made thereto, without departing from the scope and spirit of the embodiments disclosed herein.

What is claimed is:

1. A computer-implemented system for managing interactions and automatically sequencing a workflow from a live document in real time, the computer-implemented system comprising:

at least one processor;

a non-transitory, computer-readable storage medium operably and communicatively coupled to the at least one processor, the non-transitory, computer-readable storage medium configured to store computer program instructions executable by the at least one processor;

an interaction management system embedded into a document editor and executable by the at least one processor, wherein the interaction management system is configured to define and store codified decision rules associated with a plurality of actions to be performed on the live document by a plurality of participants, in a first database, for generating a workflow sequence independent of a role of each of the participants, and wherein the actions comprise request actions that anticipate any potential scenario in an interaction path of the live document and response actions performed by the participants invoked in the live document within the document editor, and wherein the interaction management system is configured to define the computer program instructions, which when executed by the at least one processor, cause the at least one processor to:

on receiving one of the request actions from one of the participants from within the live document, generate an actionable element for execution of one or more of the response actions corresponding to the one of the request actions by another one or more of the participants;

simultaneously aggregate and record request action data and potential response action data through the actionable element;

based on a correlation between the actions extracted from the request action data and the potential response action data and the codified decision rules in the first database:

dynamically generate a permission set comprising permissible actions on the live document and on comments and regions within the live document; and automatically determine an anonymity requirement from the request action data and the potential response action data and contextually anonymize the participants invoked to act on the live document based on the anonymity requirement;

track and map the actions performed along the interaction path of the live document in real time, while transmitting and executing the dynamically generated permission set on the live document, until the live document reaches an intended closure and the comments reach a resolution to generate a re-deployable workflow sequence in real time; and generate and render a representation of the re-deployable workflow sequence on a display interface; and a second database in operable communication with the interaction management system, wherein the second database is configured to store the re-deployable workflow sequence.

2. The computer-implemented system according to claim 1, wherein the interaction management system is configured to define additional computer program instructions, which when executed by the at least one processor, cause the at least one processor to anticipate and accommodate every conceivable type of the request actions into the permission set.

3. The computer-implemented system according to claim 1, wherein the request actions comprise seeking an input, seeking an opinion, seeking an approval, and seeking an assistance, and wherein the response actions comprise providing an input, providing an opinion, providing an approval, and providing an assistance.

4. The computer-implemented system according to claim 1, wherein the interaction management system is configured to define additional computer program instructions, which when executed by the at least one processor, cause the at least one processor to automatically derive consequential actions from the request actions and the response actions for selection by the participants via the display interface.

5. The computer-implemented system according to claim 1, wherein the interaction management system is configured to define additional computer program instructions, which when executed by the at least one processor, cause the at least one processor to automatically differentiate between a plurality of anonymity levels comprising a user-to-user anonymity level and a user input-to-user input anonymity level, while allowing selective de-anonymization of the participants addressed to act on the live document based on preferences of the participants, and wherein the anonymity requirement is based on a type of the request actions comprising seeking an opinion extracted from the request action data.

6. The computer-implemented system according to claim 1, wherein the interaction management system is configured to define additional computer program instructions, which when executed by the at least one processor, cause the at least one processor to selectively display the comments in the live document to the another one or more of the participants based on a type of each of the actions.

7. The computer-implemented system according to claim 1, wherein one or more of the computer program instructions, which when executed by the at least one processor, cause the at least one processor to prompt the participants to enter a response time via a calendar interface rendered by the interaction management system during the tracking of the actions performed along the interaction path of the live document in real time.

8. The computer-implemented system according to claim 1, wherein the interaction path comprising one or more of a plurality of stages, wherein the stages comprise an edit stage, an approval stage, a revision stage, an opinion stage, and a subsequent approval stage.

9. The computer-implemented system according to claim 1, wherein the actionable element comprises the live document and handles configured to invoke the request actions and accommodate the response actions.

10. The computer-implemented system according to claim 1, wherein the interaction management system is configured to define additional computer program instructions, which when executed by the at least one processor, cause the at least one processor to continuously track and display a status and a progress of the live document on a dashboard through the actionable element, and wherein the actionable element is configured to render the live document in a conference mode on the dashboard by integrating a plurality of communication components within the document editor in a single application environment.

11. The computer-implemented system according to claim 1, wherein the interaction management system is configured to define additional computer program instructions, which when executed by the at least one processor, cause the at least one processor to distribute a plurality of controls on the regions of the live document in a suggest mode in a pre-publication stage of the live document and in a consumption mode in a post-publication stage of the document, wherein the suggest mode is configured to allow fellow participants to modify the controls, and wherein the consumption mode is configured to allow subordinate participants to perform one of the response actions corresponding to one of the request actions within confines of the controls, and wherein the controls comprise a visibility control, an editability control, mandatory response options, and a word limit control in accordance with the editability control.

12. The computer-implemented system according to claim 1, wherein the interaction management system is configured to define additional computer program instructions, which when executed by the at least one processor, cause the at least one processor to determine and render workflow sequences analogous to the re-deployable workflow sequence in communication with the second database for deployment by users.

13. The computer-implemented system according to claim 1, wherein the interaction management system is configured to define additional computer program instructions, which when executed by the at least one processor, cause the at least one processor to generate and render a unified dashboard configured to chronologically display document information, the request actions, and the response actions on a priority basis on the display interface, and wherein the document information comprises a title, a participant identifier, a type of each of the request actions, a deadline for each of the response actions, number of comments that remain open for resolution, a word count, a potential involvement time based on the word count, total engagement based on prior involvement of time and resource, a duplicated document, and a docket of a group of documents, and wherein the unified dashboard is configured to focus attention of each of the participants.

14. The computer-implemented system according to claim 1, wherein the interaction management system is configured to define additional computer program instructions, which when executed by the at least one processor, cause the at least one processor to integrate a plurality of publication gateways within the document editor for publishing the live document, and wherein the publication gateways comprise a template center, a quarantined private archive, a public network, and a private network.

15. A computer-implemented method for managing interactions and automatically sequencing a workflow from a live document in real time, the computer-implemented method comprising:
    embedding an interaction management system into a document editor, wherein the interaction management system is configured to define and store codified decision rules associated with a plurality of actions to be performed on the live document by a plurality of participants, in a first database, for generating a workflow sequence independent of a role of each of the participants, and wherein the actions comprise request actions that anticipate any potential scenario in an interaction path of the live document and response actions performed by the participants invoked in the live document within the document editor;
    on receiving one of the request actions from one of the participants from within the live document, generating an actionable element by the interaction management system for execution of one or more of the response actions corresponding to the one of the request actions by another one or more of the participants;
    simultaneously aggregating and recording request action data and potential response action data through the actionable element by the interaction management system;
    based on a correlation between the actions extracted from the request action data and the potential response action data and the codified decision rules in the first database:
        dynamically generating a permission set comprising permissible actions on the live document and on comments and regions within the live document by the interaction management system; and
        automatically determining an anonymity requirement from the request action data and the potential response action data and contextually anonymizing the participants invoked to act on the live document based on the anonymity requirement by the interaction management system;
    tracking and mapping the actions performed along the interaction path of the live document in real time, while transmitting and executing the dynamically generated permission set on the live document, by the interaction management system, until the live document reaches an intended closure and the comments reach a resolution to generate a re-deployable workflow sequence in real time, wherein the re-deployable workflow sequence is stored in a second database; and
    generating and rendering a representation of the re-deployable workflow sequence on a display interface by the interaction management system.

16. The computer-implemented method according to claim 15, wherein the interaction management system is configured to anticipate and accommodate every conceivable type of the request actions into the permission set.

17. The computer-implemented method according to claim 15, wherein the request actions comprise seeking an input, seeking an opinion, seeking an approval, and seeking an assistance, and wherein the response actions comprise providing an input, providing an opinion, providing an approval, and providing an assistance.

18. The computer-implemented method according to claim 15, further comprising automatically deriving consequential actions from the request actions and the response actions by the interaction management system for selection by the participants via the display interface.

19. The computer-implemented method according to claim 15, further comprising automatically differentiating between a plurality of anonymity levels comprising a user-to-user anonymity level and a user input-to-user input anonymity level by the interaction management system, while allowing selective de-anonymization of the participants addressed to act on the live document by the interaction management system based on preferences of the participants, wherein the anonymity requirement is based on a type of the request actions comprising seeking an opinion extracted from the request action data.

20. The computer-implemented method according to claim 15, further comprising selectively displaying the comments in the live document to the another one or more of the participants by the interaction management system based on a type of each of the actions.

21. The computer-implemented method according to claim 15, wherein the tracking of the actions performed along the interaction path of the live document in real time comprises prompting the participants to enter a response time via a calendar interface rendered by the interaction management system.

22. The computer-implemented method according to claim 15, wherein the interaction path comprising one or more of a plurality of stages, wherein the stages comprise an edit stage, an approval stage, a revision stage, an opinion stage, and a subsequent approval stage.

23. The computer-implemented method according to claim 15, wherein the actionable element comprises the live document and handles configured to invoke the request actions and accommodate the response actions.

24. The computer-implemented method according to claim 15, further comprising continuously tracking and displaying a status and a progress of the live document on a dashboard by the interaction management system through the actionable element, wherein the actionable element is configured to render the live document in a conference mode on the dashboard by integrating a plurality of communication components within the document editor in a single application environment.

25. The computer-implemented method according to claim 15, further comprising distributing a plurality of controls on the regions of the live document in a suggest mode in a pre-publication stage of the live document and in a consumption mode in a post-publication stage of the document by the interaction management system, wherein the suggest mode is configured to allow fellow participants to modify the controls, and wherein the consumption mode is configured to allow subordinate participants to perform one of the response actions corresponding to one of the request actions within confines of the controls, and wherein the controls comprise a visibility control, an editability control, mandatory response options, and a word limit control in accordance with the editability control.

26. The computer-implemented method according to claim 15, further comprising determining and rendering workflow sequences analogous to the re-deployable workflow sequence by the interaction management system in communication with the second database for deployment by users.

27. The computer-implemented method according to claim 15, further comprising generating and rendering a unified dashboard configured to chronologically display document information, the request actions, and the response actions on a priority basis on the display interface by the interaction management system, wherein the document information comprises a title, a participant identifier, a type of each of the request actions, a deadline for each of the response actions, number of comments that remain open for resolution, a word count, a potential involvement time based on the word count, total engagement based on prior involvement of time and resource, a duplicated document, and a docket of a group of documents, and wherein the unified dashboard is configured to focus attention of each of the participants.

28. The computer-implemented method according to claim 15, further comprising integrating a plurality of publication gateways within the document editor by the interaction management system for publishing the live document, wherein the publication gateways comprise a template center, a quarantined private archive, a public network, and a private network.

29. A non-transitory, computer-readable storage medium having embodied thereon, an interaction management system embedded into a document editor and computer program instructions executable by at least one processor for managing interactions and automatically sequencing a workflow from a live document in real time, the computer program instructions when executed by the at least one processor cause the at least one processor to:
define and store codified decision rules associated with a plurality of actions to be performed on the live document by a plurality of participants, in a first database, for generating a workflow sequence independent of a role of each of the participants, wherein the actions comprise request actions that anticipate any potential scenario in an interaction path of the live document and response actions performed by the participants invoked in the live document within the document editor;
on receiving one of the request actions from one of the participants from within the live document, generate an actionable element for execution of one or more of the response actions corresponding to the one of the request actions by another one or more of the participants;
simultaneously aggregate and record request action data and potential response action data through the actionable element;
based on a correlation between the actions extracted from the request action data and the potential response action data and the codified decision rules in the first database:
dynamically generate a permission set comprising permissible actions on the live document and on comments and regions within the live document; and
automatically determine an anonymity requirement from the request action data and the potential response action data and contextually anonymize the participants invoked to act on the live document based on the anonymity requirement;
track and map the actions performed along the interaction path of the live document in real time, while transmitting and executing the dynamically generated permission set on the live document, until the live document reaches an intended closure and the comments reach a resolution to generate a re-deployable workflow sequence in real time, wherein the re-deployable workflow sequence is stored in a second database; and
generate and render a representation of the re-deployable workflow sequence on a display interface.

30. The non-transitory, computer-readable storage medium according to claim 29, wherein the request actions comprise seeking an input, seeking an opinion, seeking an approval, and seeking an assistance, and wherein the response actions comprise providing an input, providing an opinion, providing an approval, and providing an assistance.

31. The non-transitory, computer-readable storage medium according to claim 29, wherein the computer program instructions when executed by the at least one processor further cause the at least one processor to automatically differentiate between a plurality of anonymity levels comprising a user-to-user anonymity level and a user input-to-user input anonymity level, while allowing selective de-anonymization of the participants addressed to act on the live document based on preferences of the participants, and wherein the anonymity requirement is based on a type of the request actions comprising seeking an opinion extracted from the request action data.

32. The non-transitory, computer-readable storage medium according to claim 29, wherein the actionable element comprises the live document and handles configured to invoke the request actions and accommodate the response actions.

33. The non-transitory, computer-readable storage medium according to claim 29, wherein the computer program instructions when executed by the at least one processor further cause the at least one processor to continuously track and display a status and a progress of the live document on a dashboard through the actionable element, and wherein the actionable element is configured to render the live document in a conference mode on the dashboard by integrating a plurality of communication components within the document editor in a single application environment.

34. The non-transitory, computer-readable storage medium according to claim 29, wherein the computer program instructions when executed by the at least one processor further cause the at least one processor to distribute a plurality of controls on the regions of the live document in a suggest mode in a pre-publication stage of the live document and in a consumption mode in a post-publication stage of the document, wherein the suggest mode is configured to allow fellow participants to modify the controls, and wherein the consumption mode is configured to allow subordinate participants to perform one of the response actions corresponding to one of the request actions within confines of the controls, and wherein the controls comprise a visibility control, an editability control, mandatory response options, and a word limit control in accordance with the editability control.

35. The non-transitory, computer-readable storage medium according to claim 29, wherein the computer program instructions when executed by the at least one processor further cause the at least one processor to generate and render a unified dashboard configured to chronologically display document information, the request actions, and the response actions on a priority basis on the display interface, and wherein the document information comprises a title, a participant identifier, a type of each of the request actions, a deadline for each of the response actions, number of comments that remain open for resolution, a word count, a potential involvement time based on the word count, total engagement based on prior involvement of time and resource, a duplicated document, and a docket of a group of documents, and wherein the unified dashboard is configured to focus attention of each of the participants.

* * * * *